(12) United States Patent
Harif

(10) Patent No.: US 10,124,412 B2
(45) Date of Patent: Nov. 13, 2018

(54) CUTTING INSERT WITH INTERNAL COOLING

(71) Applicant: NO SCREW LTD., Holon (IL)

(72) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 362 days.

(21) Appl. No.: 14/901,514

(22) PCT Filed: Jun. 26, 2014

(86) PCT No.: PCT/IL2014/050573
§ 371 (c)(1),
(2) Date: Dec. 28, 2015

(87) PCT Pub. No.: WO2014/207747
PCT Pub. Date: Dec. 31, 2014

(65) Prior Publication Data
US 2016/0368061 A1    Dec. 22, 2016

(30) Foreign Application Priority Data

Jun. 27, 2013 (IL) .......................................... 227228

(51) Int. Cl.
*B23B 27/10* (2006.01)
*B23C 5/20* (2006.01)
(Continued)

(52) U.S. Cl.
CPC ............ *B23B 27/10* (2013.01); *B23B 27/145* (2013.01); *B23B 51/048* (2013.01); *B23C 5/207* (2013.01);
(Continued)

(58) Field of Classification Search
CPC ....... B23B 27/10; B23B 27/04; B23B 27/145; B23B 51/06
See application file for complete search history.

(56) References Cited

U.S. PATENT DOCUMENTS 4,544,517 A * 10/1985 Ohno ........................ B28B 3/10
264/113
5,237,894 A * 8/1993 Lindeke .................. B23B 27/10
407/11
(Continued)

FOREIGN PATENT DOCUMENTS

DE   102006034489    1/2008
EP      0791420      8/1997
(Continued)

*Primary Examiner* — Will Fridie, Jr.
(74) *Attorney, Agent, or Firm* — Dorsey & Whitney LLP

(57) ABSTRACT

A cutting element (50) having a front face (52T), an opposite rear face (52B) and at least one side (52S) face extending therebetween, and comprising a cooling cavity (60) defined by a cavity surface. The cutting element (50) comprises at least one shell-like cutting zone defined by an external surface (54, 56, 58) and an internal surface. The external surface (54, 56, 58) is constituted by a cutting edge (54) defined at the intersection between the front face (52T) and the at least one side face (52S) and corresponding rake (56) and relief (58) surfaces constituted by portions of the front face (52T) and at least one side face (52S) respectively. The internal surface is constituted by a portion of the cavity surface (60), wherein the maximal distance between the cavity surface (60) and the external surface (54, 56, 58) at the cutting zone is considerably smaller than the distance between the front face (52T) and the opposite rear face (52B). The cooling cavity (60) is configured for receiving therein a cooling fluid for cooling the inner surface and thereby withdrawing heat from the cutting edge (54).

27 Claims, 82 Drawing Sheets

(51) Int. Cl.
*B23C 5/28* (2006.01)
*B23B 27/14* (2006.01)
*B23B 51/04* (2006.01)

(52) U.S. Cl.
CPC ............ *B23C 5/28* (2013.01); *B23B 2205/12* (2013.01); *B23B 2205/16* (2013.01); *B23B 2250/12* (2013.01); *B23C 2210/168* (2013.01); *B23C 2250/12* (2013.01); *B25D 2217/0057* (2013.01)

(56) References Cited

U.S. PATENT DOCUMENTS

| | | | |
|---|---|---|---|
| 5,346,335 A | 9/1994 | Harpas et al. | |
| 5,775,854 A | 7/1998 | Wertheim | |
| 5,901,623 A | 5/1999 | Hong | |
| 6,053,669 A * | 4/2000 | Lagerberg | B23B 27/10 407/11 |
| 6,705,805 B2 | 3/2004 | Lagerberg | |
| 7,634,957 B2 | 12/2009 | Ghosh et al. | |
| 7,934,891 B2 * | 5/2011 | Jonsson | B23B 27/10 407/114 |
| 7,959,384 B2 | 6/2011 | Breisch | |
| 7,997,832 B2 | 8/2011 | Prichard et al. | |
| 8,328,471 B2 | 12/2012 | Nelson et al. | |
| 9,656,323 B2 * | 5/2017 | Harif | B23B 27/04 |
| 2001/0007215 A1 * | 7/2001 | Murata | B23B 27/10 83/16 |
| 2002/0172569 A1 * | 11/2002 | Nakamura | B23B 27/007 408/144 |
| 2004/0086415 A1 * | 5/2004 | Gubanich | B22F 3/03 419/38 |
| 2004/0240949 A1 * | 12/2004 | Pachao-Morbitzer | B23B 27/065 407/11 |
| 2007/0042217 A1 * | 2/2007 | Fang | B22F 7/062 428/655 |
| 2010/0272529 A1 | 10/2010 | Rozzi et al. | |
| 2011/0027021 A1 * | 2/2011 | Nelson | B23C 5/109 407/11 |
| 2013/0078043 A1 * | 3/2013 | Henry | B23B 27/10 407/11 |
| 2013/0108383 A1 * | 5/2013 | Scheicher | B23B 27/145 407/113 |
| 2013/0251463 A1 | 9/2013 | Harif | |
| 2013/0266681 A1 * | 10/2013 | Cripps | B22F 3/03 425/234 |
| 2014/0079495 A1 * | 3/2014 | Chen | B23B 27/10 407/11 |
| 2014/0086695 A1 * | 3/2014 | Jameson | B22F 3/02 407/64 |
| 2015/0139744 A1 * | 5/2015 | Harif | B23B 51/02 407/69 |
| 2017/0368612 A1 * | 12/2017 | Imai | B23B 27/10 |

FOREIGN PATENT DOCUMENTS

| | | |
|---|---|---|
| JP | 333005 | 4/1991 |
| WO | 2012/070046 | 5/2012 |

* cited by examiner

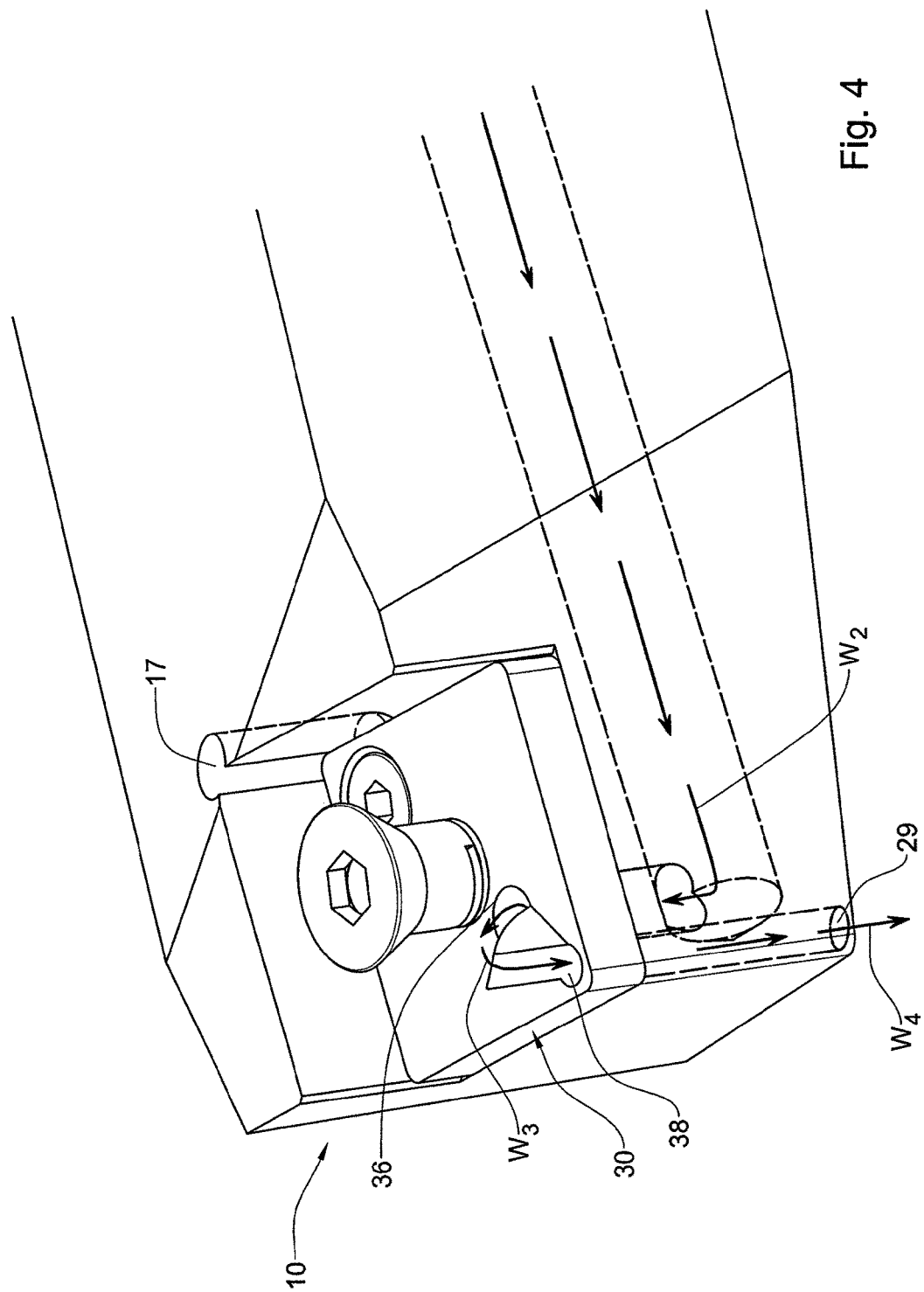

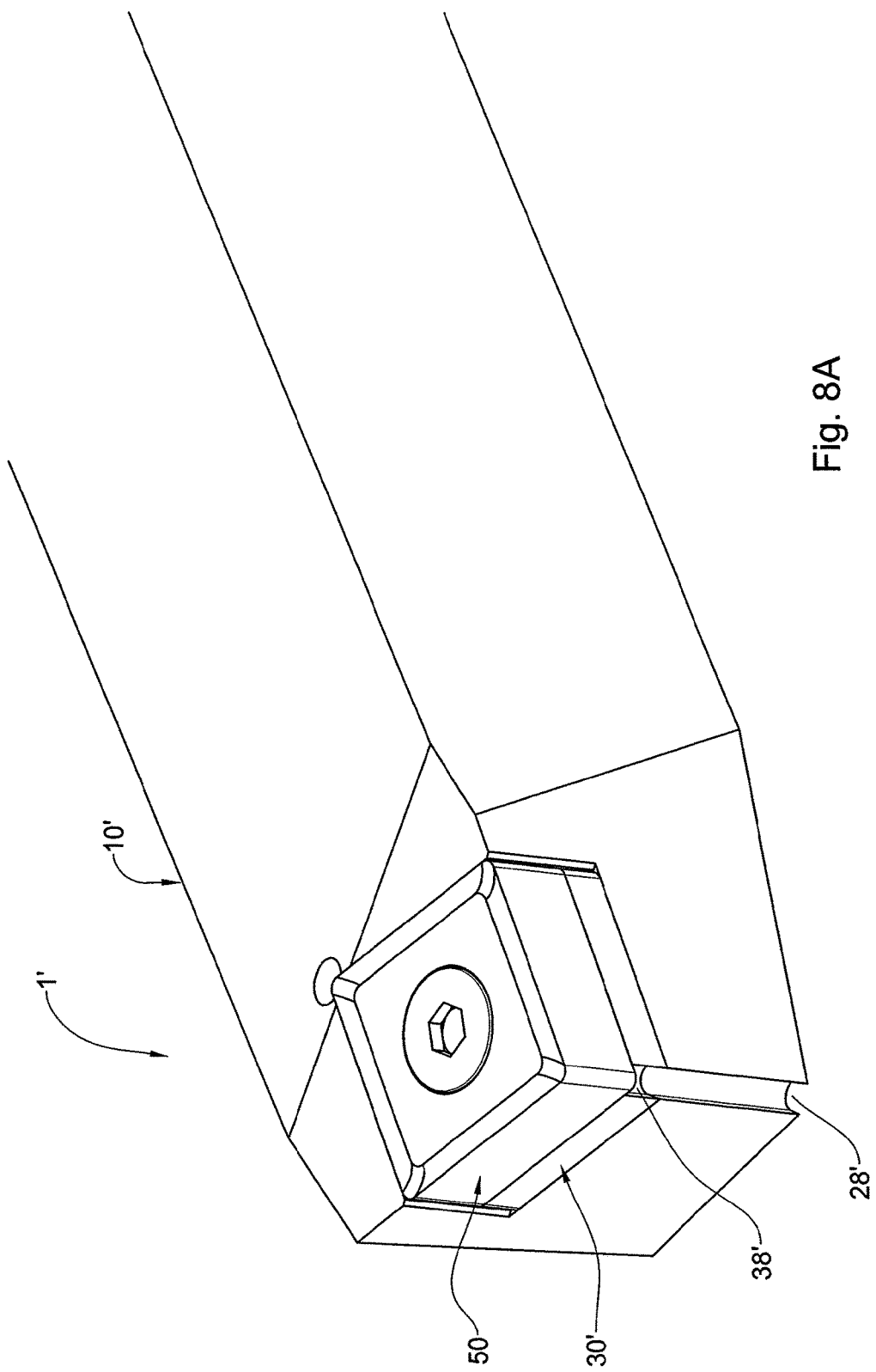

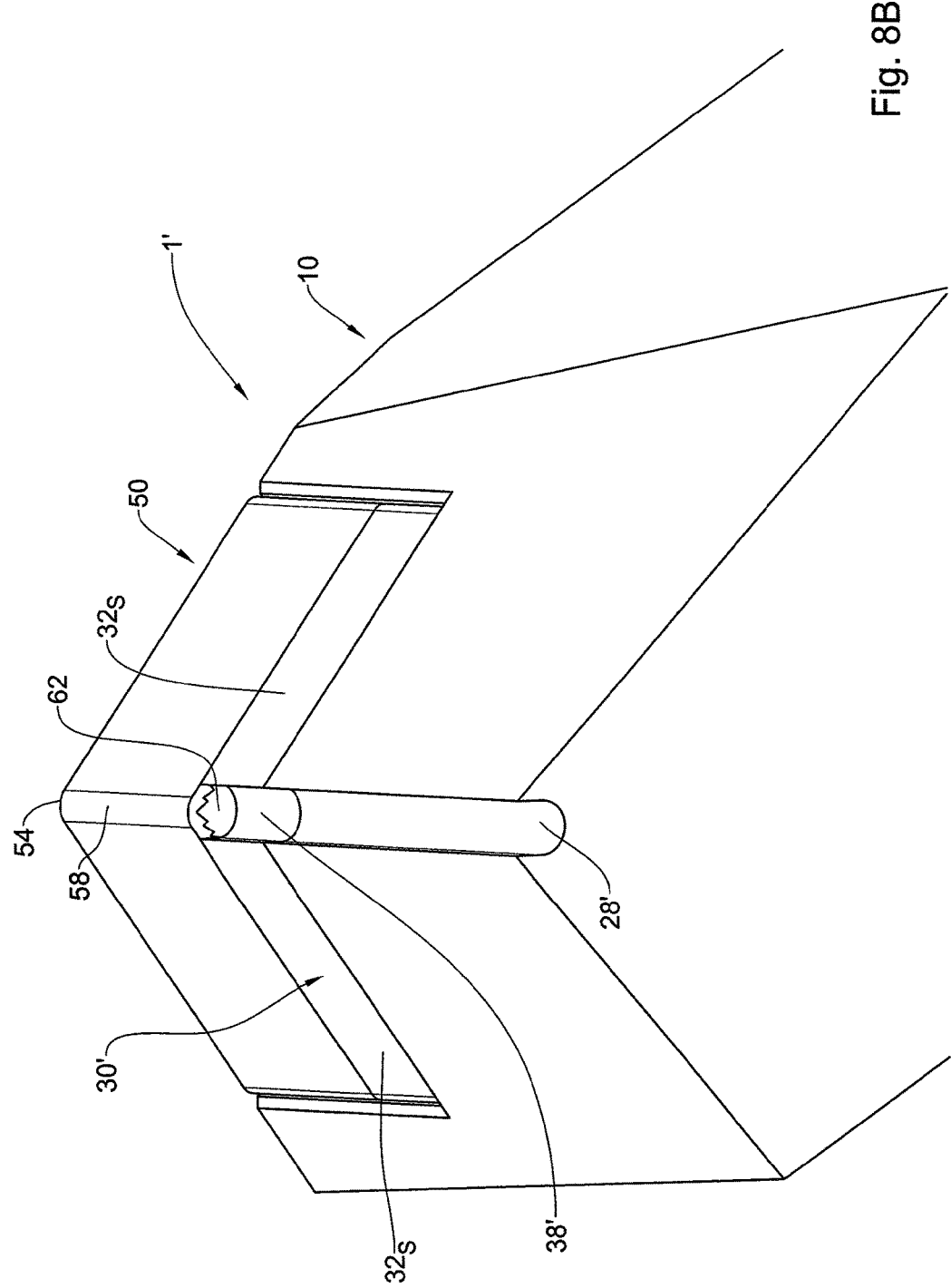

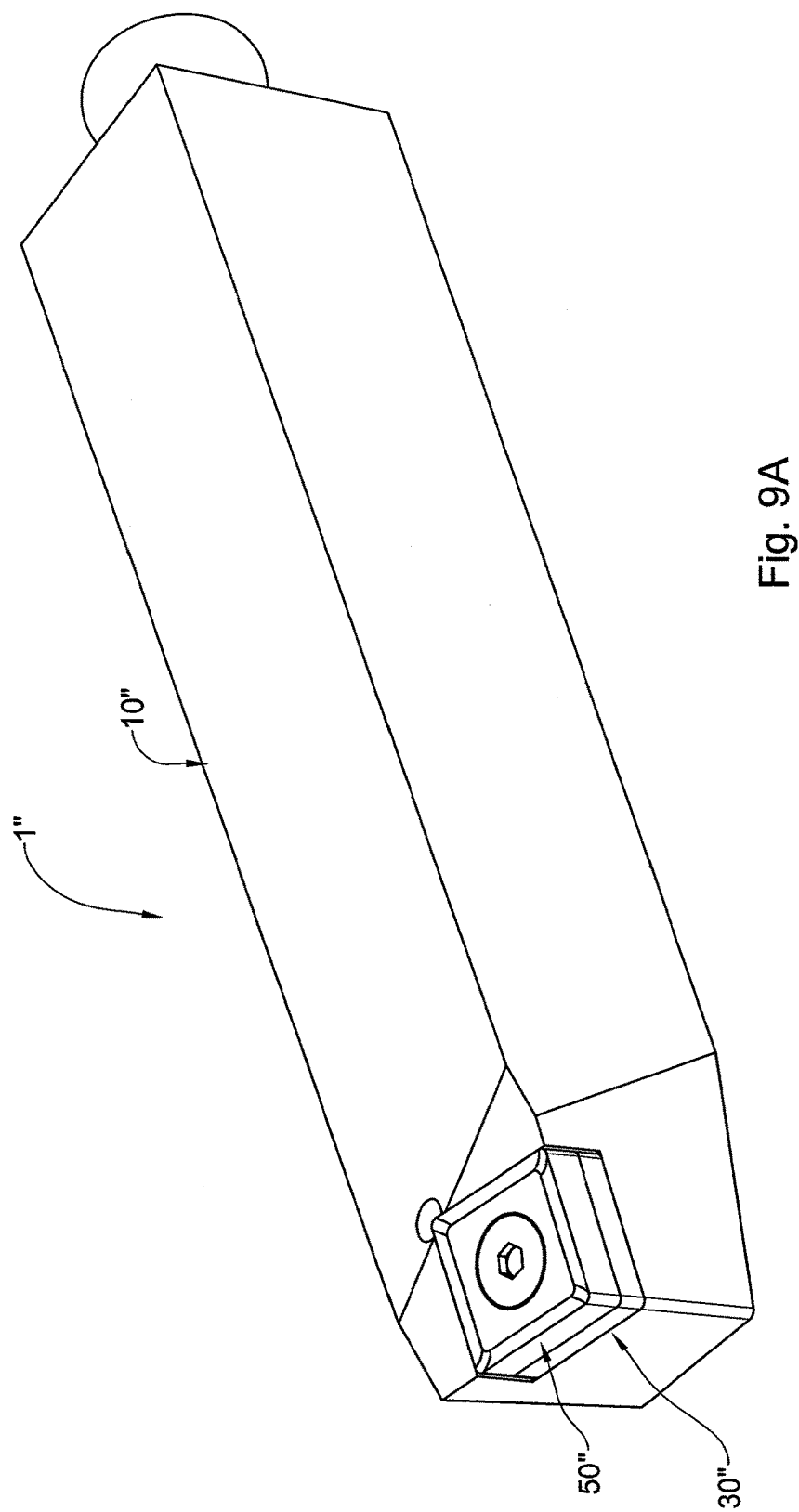

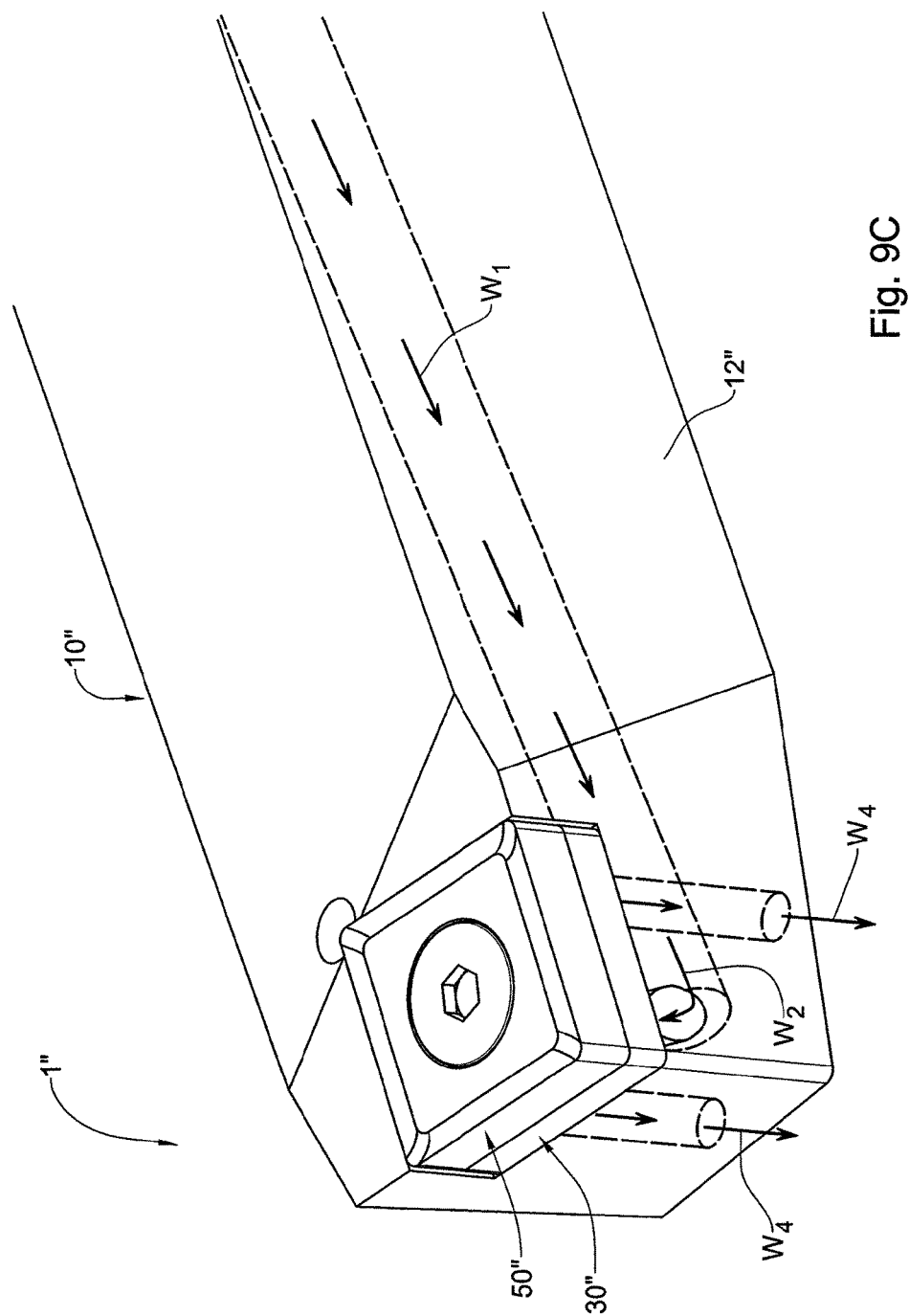

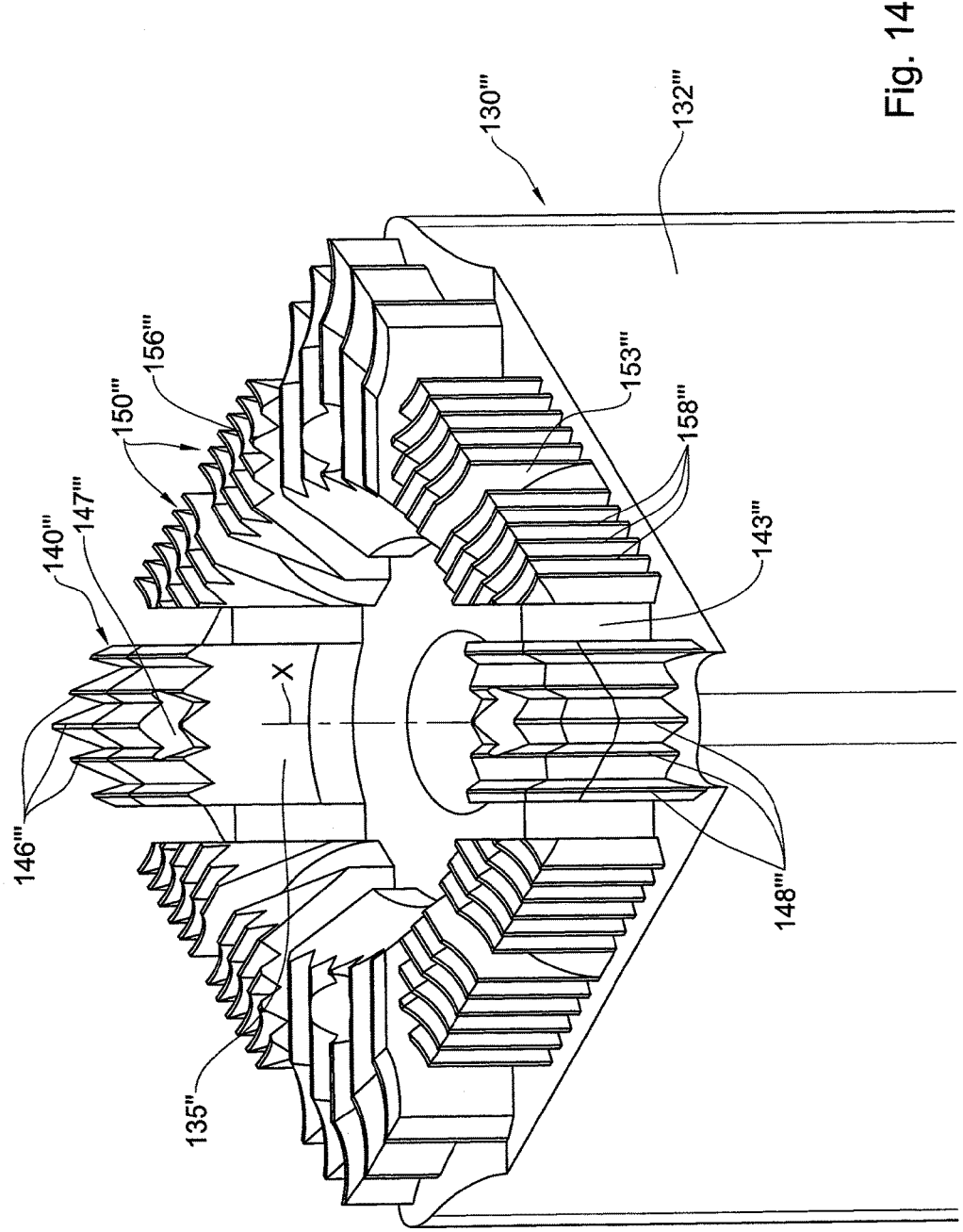

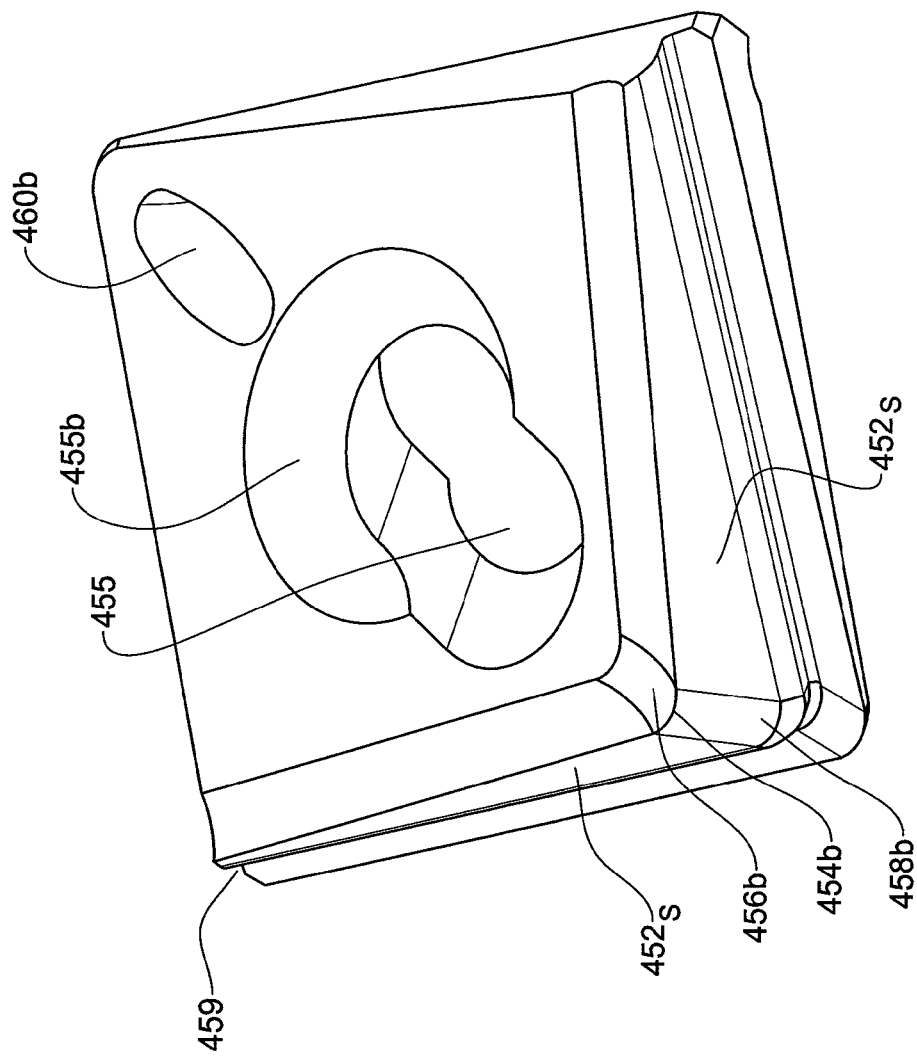

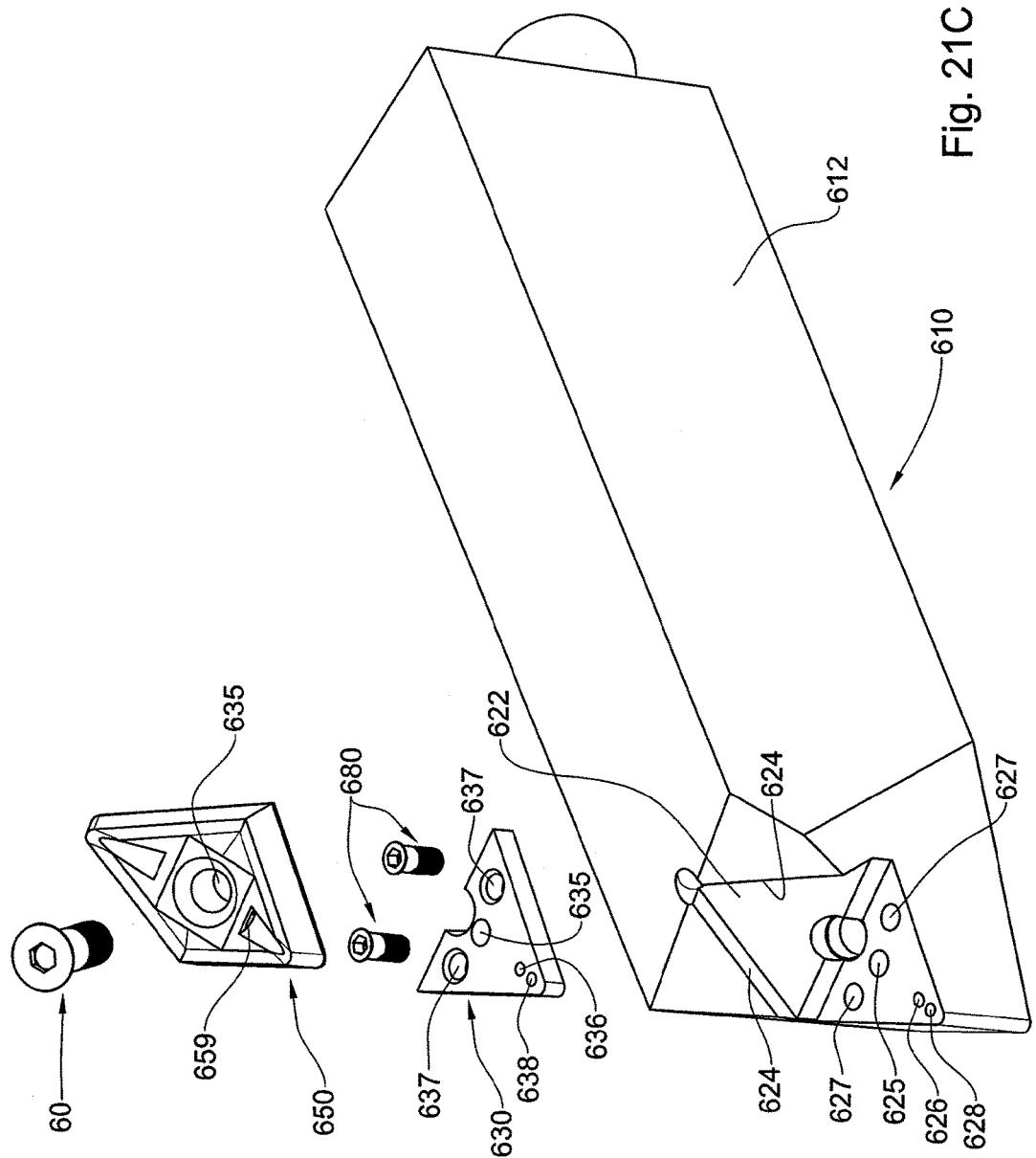

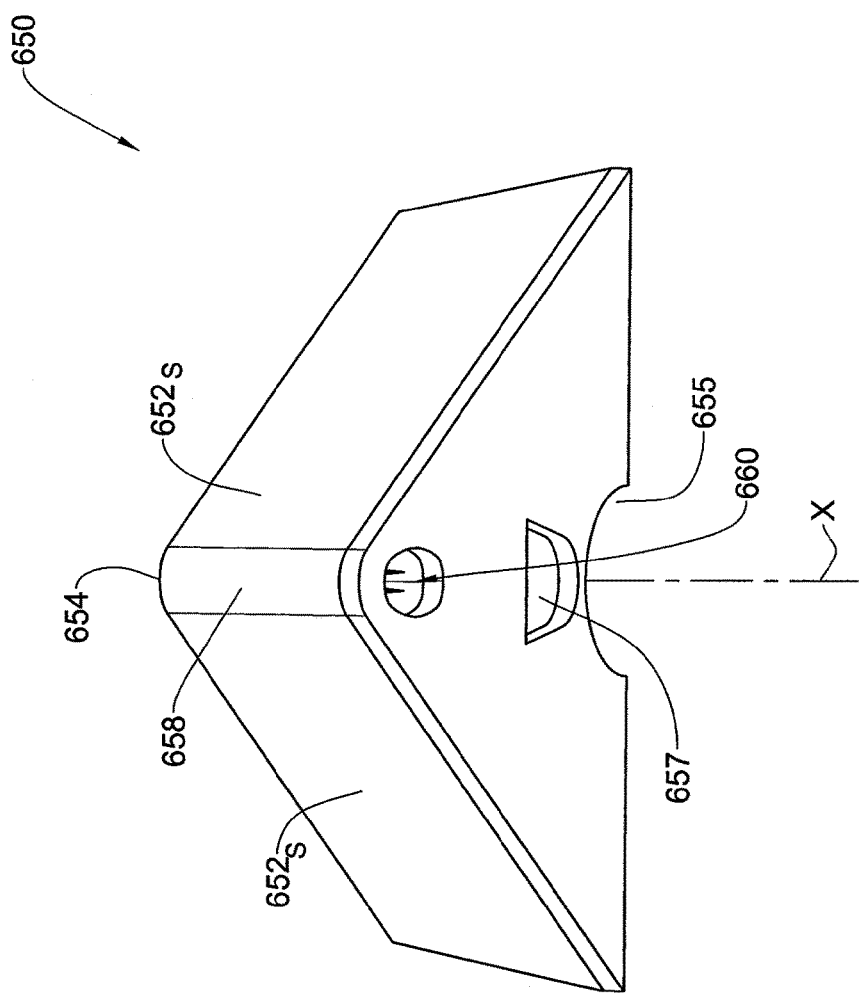

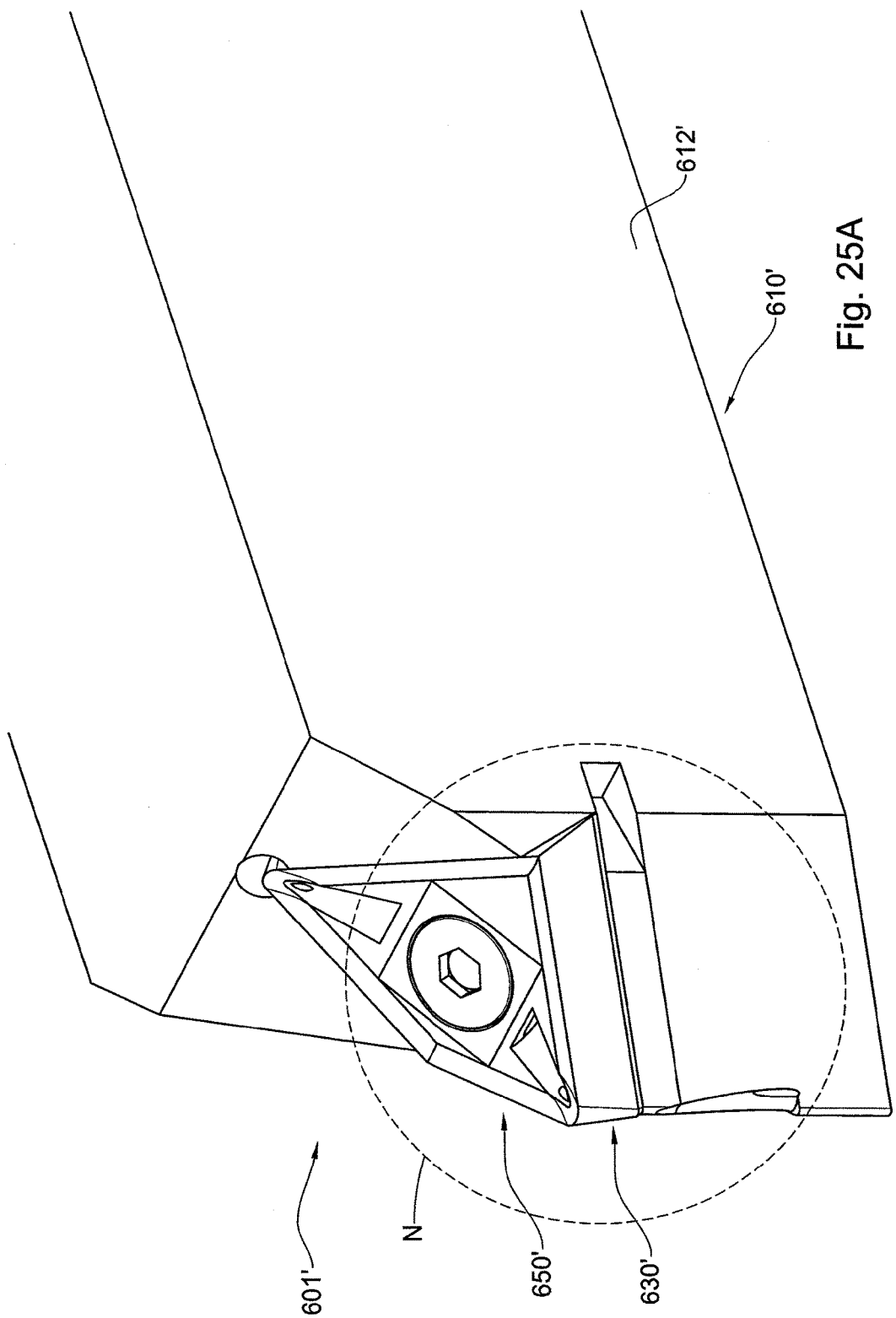

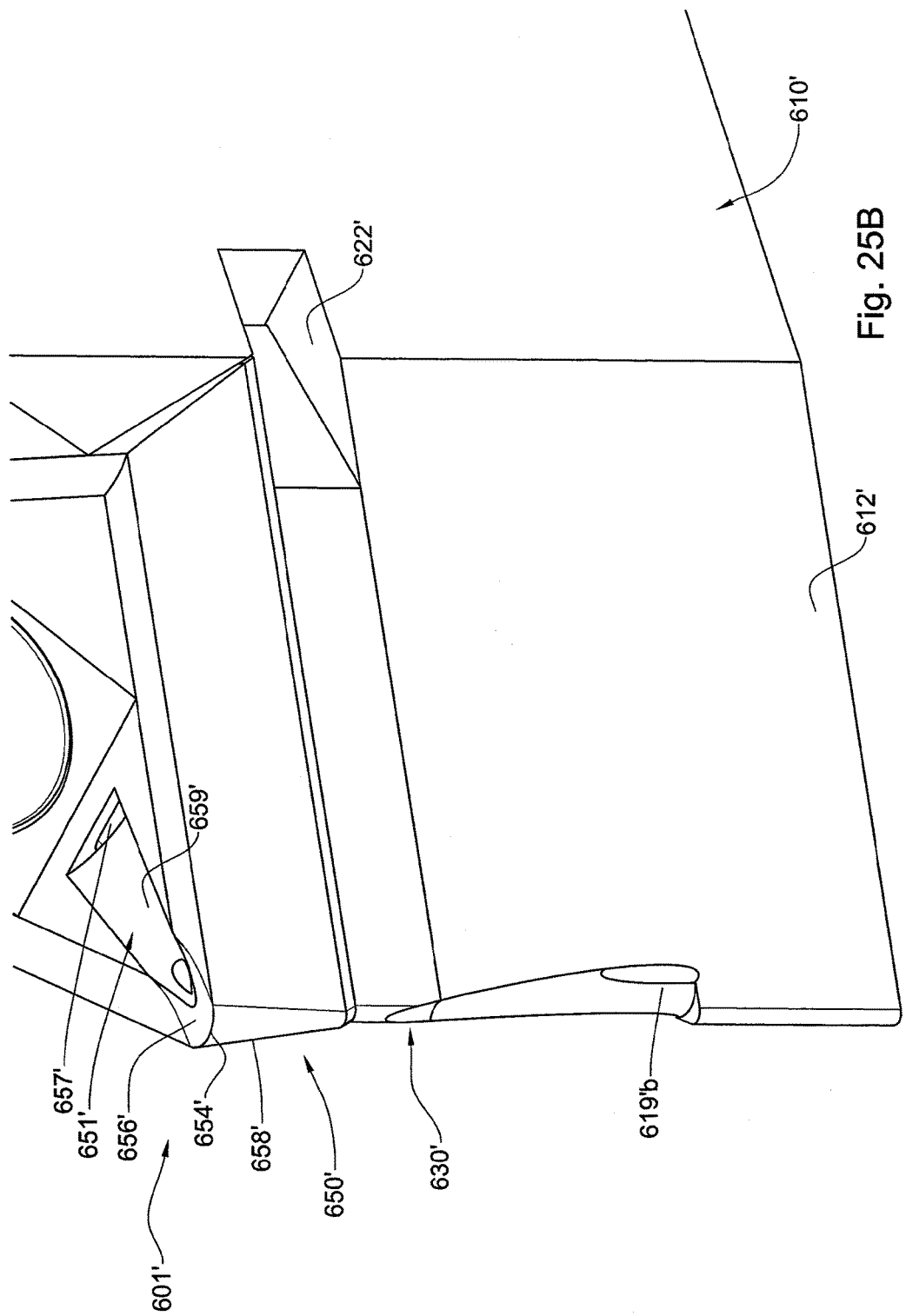

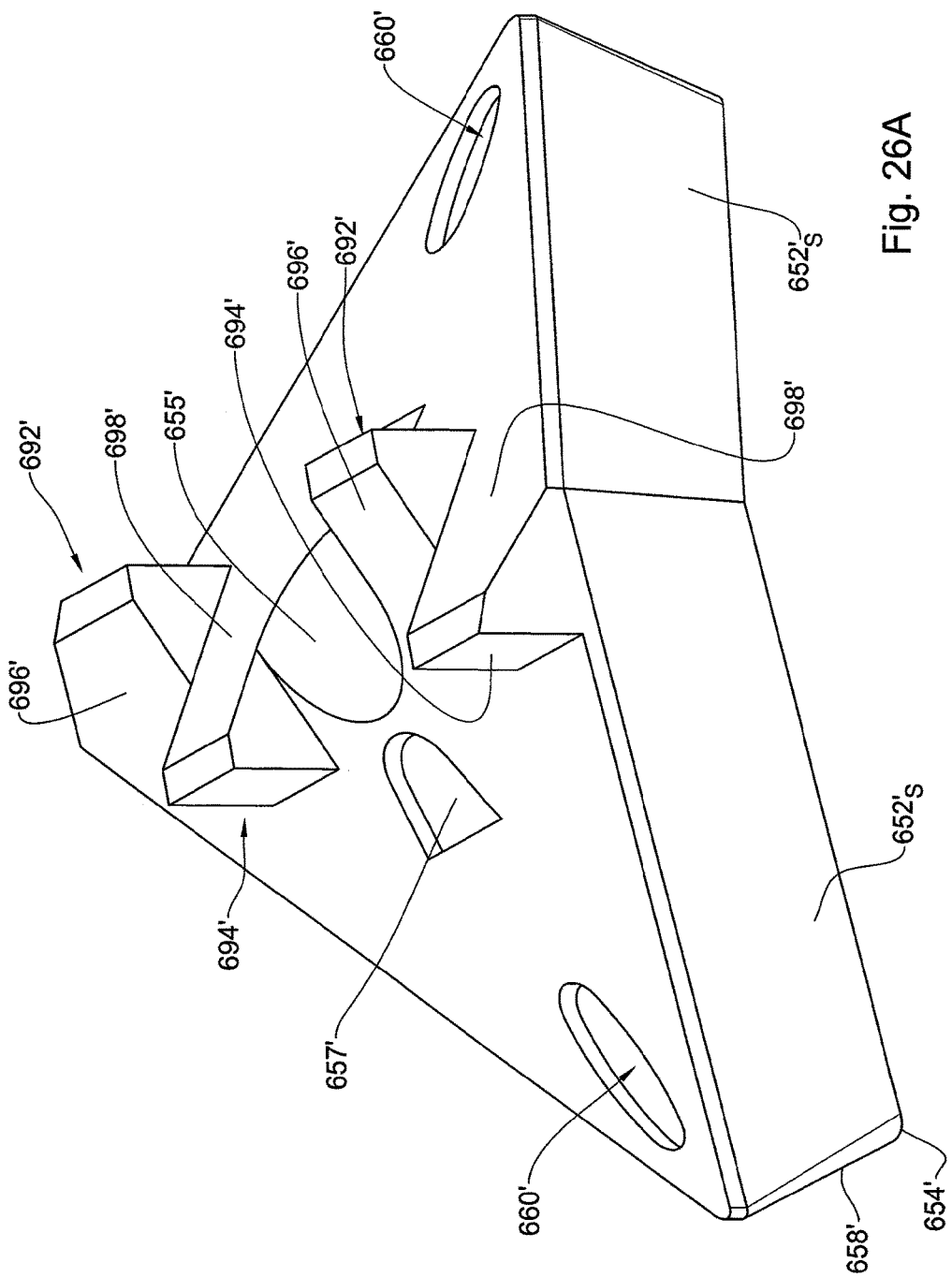

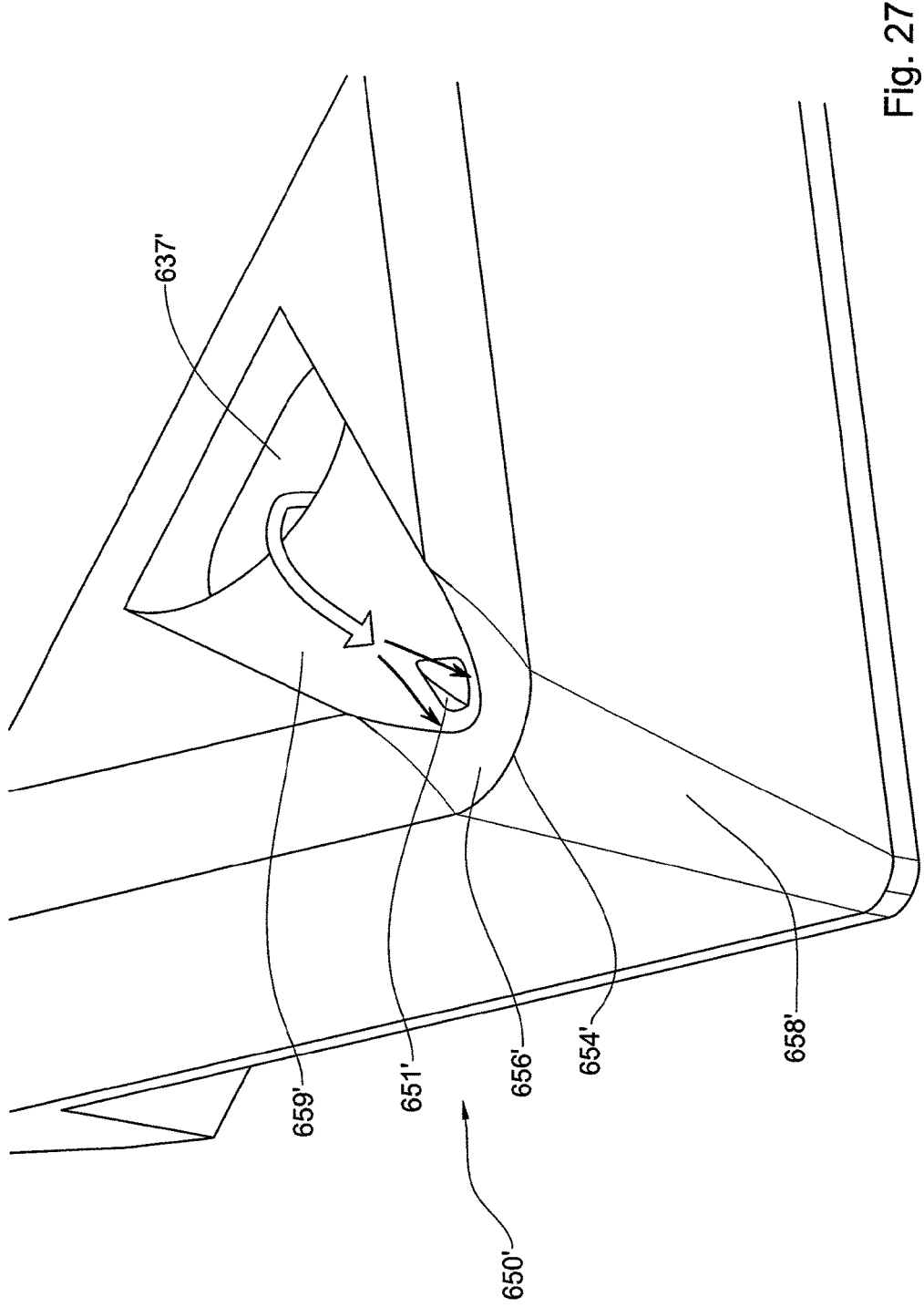

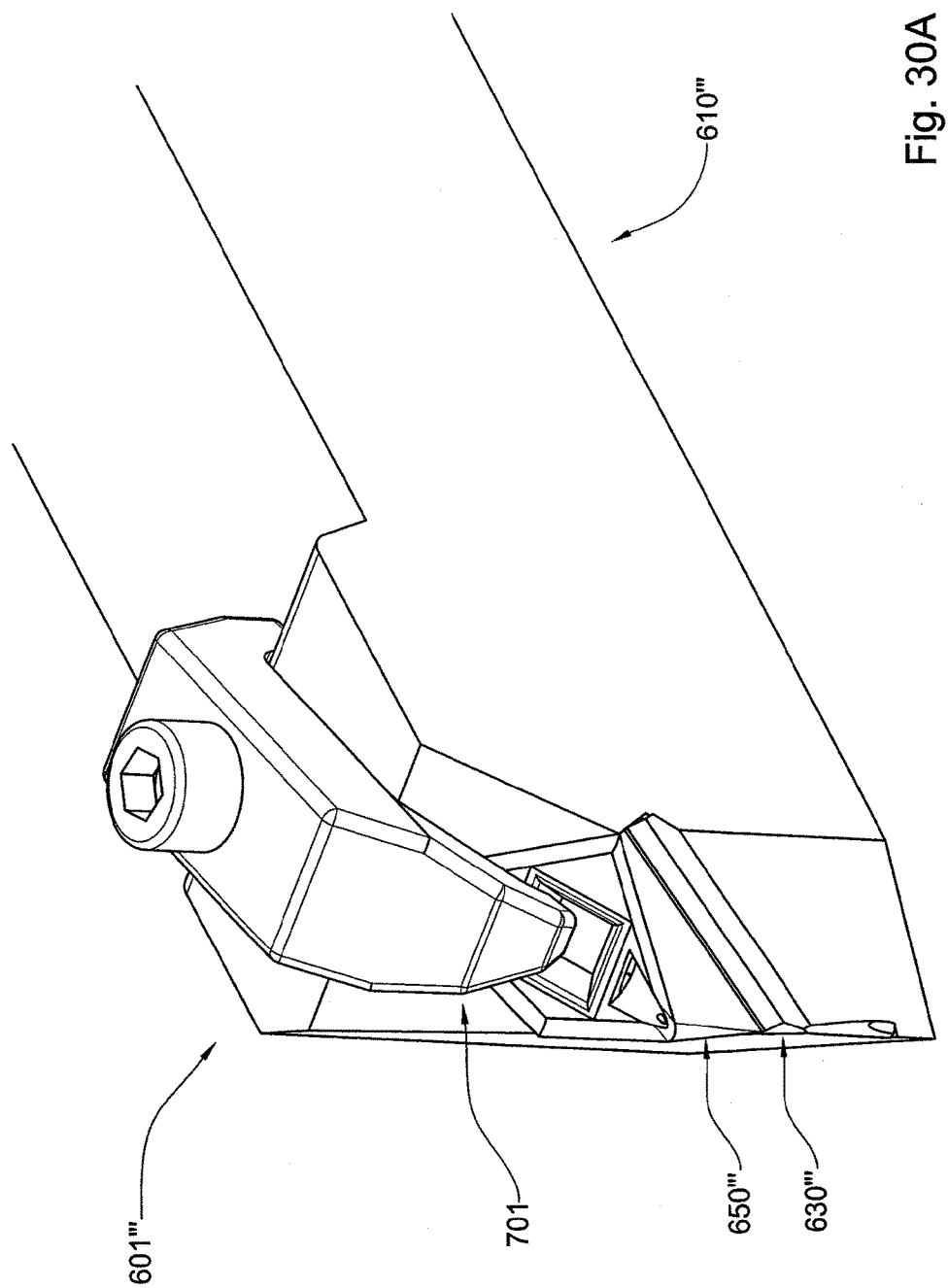

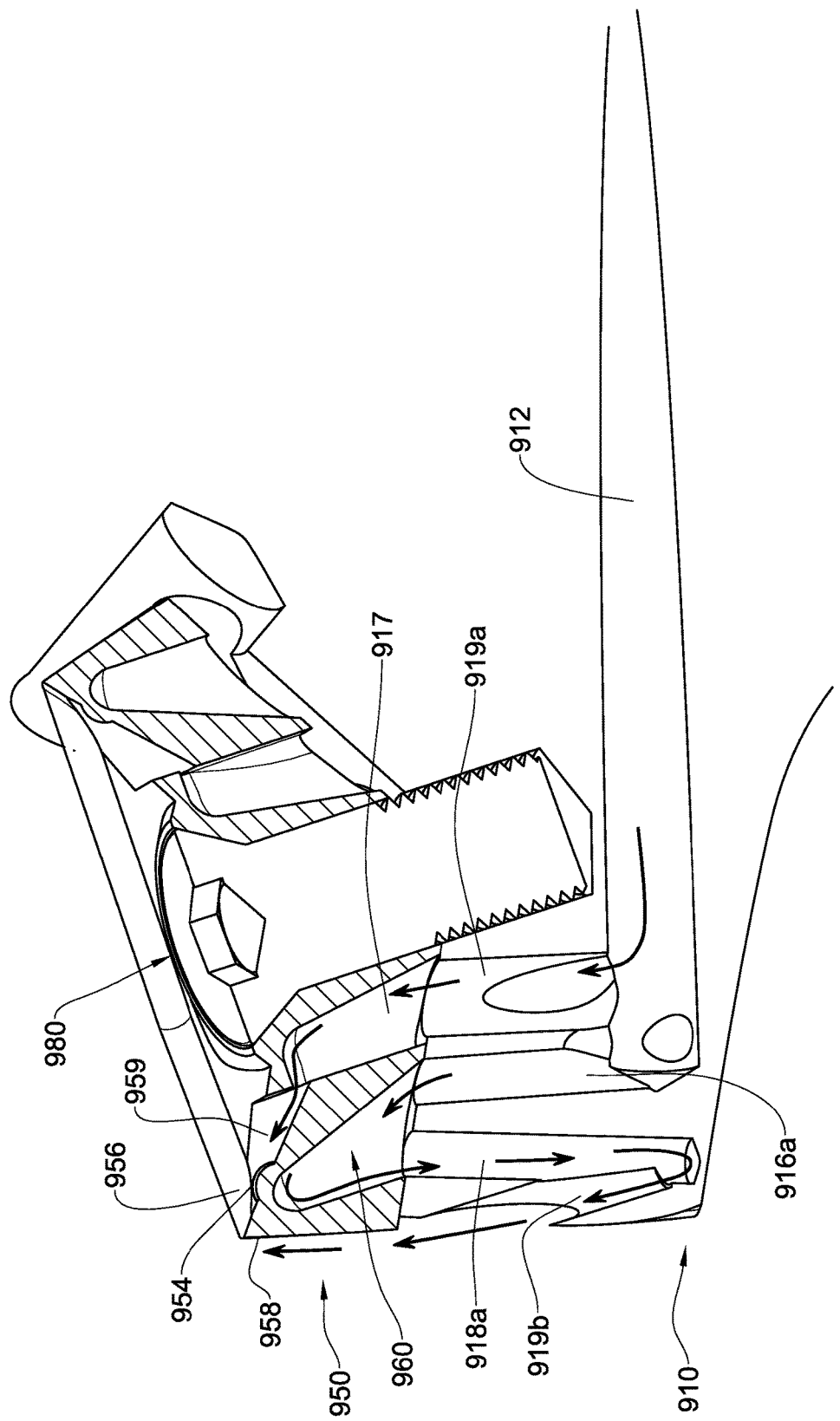

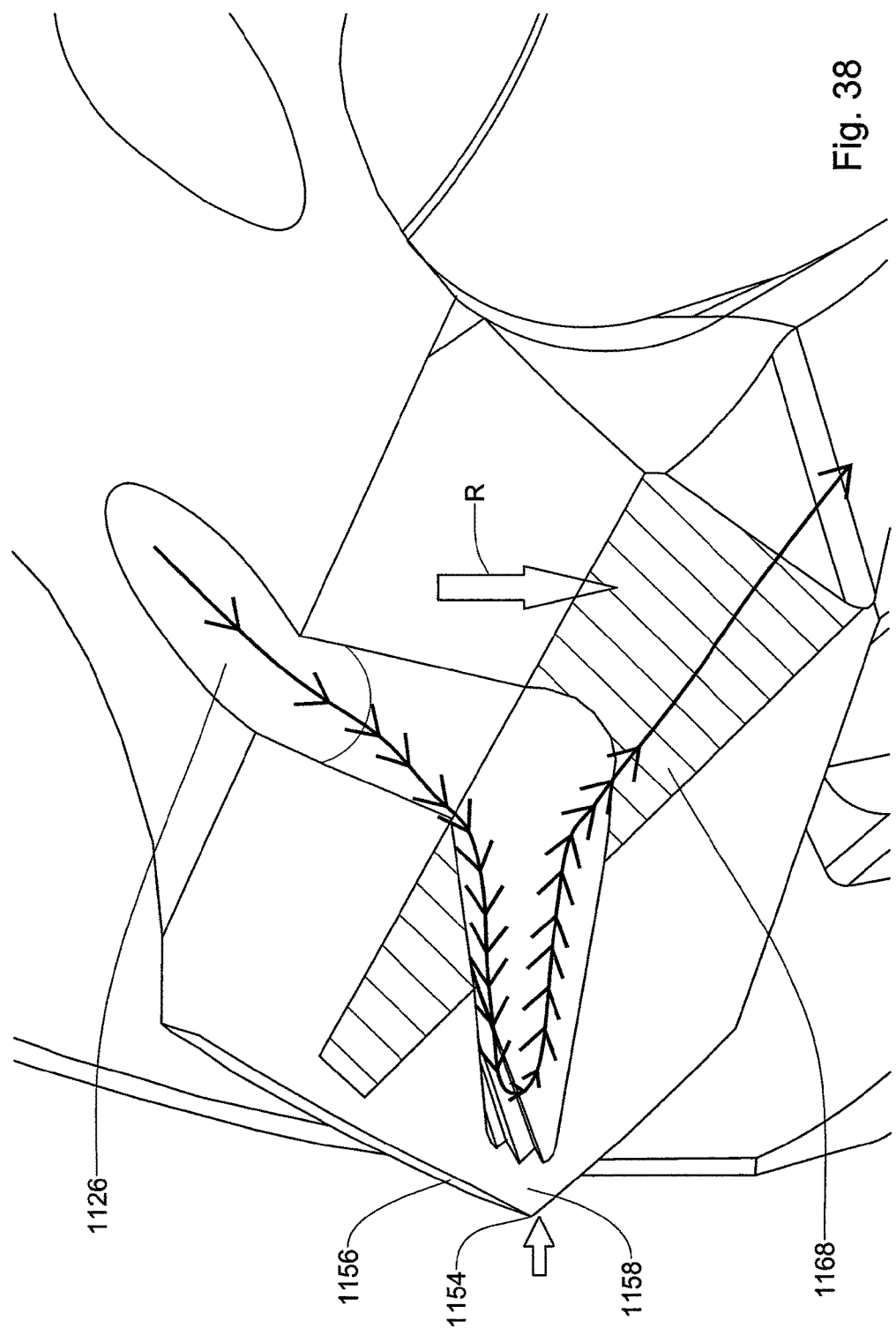

CUTTING INSERT WITH INTERNAL COOLING

TECHNOLOGICAL FIELD

The present invention relates to cutting tools and inserts having an internal cooling mechanism.

BACKGROUND

It is known in the art to provide a cooling fluid to a cutting interface between a cutting tool and a workpiece during a cutting operation. The provision of the cooling fluid allows reducing the heat generated at the cutting interface during the cutting operation and thereby preventing damage to both the cutting edge and the workpiece.

In general, a cutting tool has a rake face and a relief face, defining at the intersection thereof a cutting edge of the cutting tool. Cooling fluid is generally provided directly to the cutting interface either from the side of the rake face or from the side of the relief face or from both.

In some examples, cutting inserts used in cutting tools are preformed with apertures configured for the provision of a cooling fluid. In other examples, cutting tools and/or cutting tool holders are provided with a cooling arrangement separate from the cutting insert, which is configured for provision of the cooling fluid.

Examples of cooling arrangements as discussed above are disclosed, for example, in EP0791420, U.S. Pat. No. 5,346,335, U.S. Pat. No. 5,775,854, U.S. Pat. No. 5,901,623, U.S. Pat. No. 6,705,805, U.S. Pat. No. 7,634,957, U.S. Pat. No. 7,934,891 and U.S. Pat. No. 7,959,384. Another example is WO12070046 to the applicant.

Acknowledgement of the above references herein is not to be inferred as meaning that these are in any way relevant to the patentability of the presently disclosed subject matter.

GENERAL DESCRIPTION

According to one aspect of the subject matter of the present application, there is provided a cutting element having a front face, an opposite rear face and at least one side face extending therebetween, said cutting element comprising a cooling cavity defined by a cavity surface, and at least one shell-like cutting zone defined by an external surface and an internal surface, the external surface being constituted by a cutting edge defined at the intersection between the front face and the at least one side face and corresponding rake and relief surfaces constituted by portions of the front fact and at least one side face respectively, and the internal surface being constituted by a portion of the cavity surface, wherein the maximal distance between the cavity surface and the external surface at the cutting zone is considerably smaller than the distance between the front face and the opposite rear face, said cooling cavity being configured for receiving therein a cooling fluid for cooling said inner surface and thereby withdrawing heat from the cutting edge.

The definition of 'shell-like' refers to the fact that the cutting zone is formed of a relatively thin shell owing to a hollow structure of the cutting element. In particular, the ratio between the maximal distance between the cavity surface and the external surface and the distance between the front face and its opposing rear face can be in the range of 1:5 to 1:10.

More specifically, the maximal distance between the cavity surface and the external surface ranges between 0.2-1 mm, more particularly between 0.3-0.9 mm, even more particularly between 0.4-0.8 mm and still more particularly between 0.5-0.7 mm.

According to one example, the cavity surface can be sloped towards the cutting zone in order to direct cooling fluid entering the cavity towards the cutting zone. The arrangement can be such that, in operation, cooling fluid entering the cavity is configured to impact the sloped cavity surface and directed to flow towards the cutting zone so as to cool down the cutting edge from its internal side.

According to one design embodiment, the cavity surface can be formed with a rib array extending along the cutting zone. In particular, said rib array can comprise rake ribs extending generally parallel to the rake surface and relief ribs extending generally parallel to the relief surface.

The ribs of the rib array can provide, inter alia, for at least one of the following:
  mechanical integrity to the cutting zone despite its shell-like configuration; and
  increase in surface area for increased cooling of the cutting edge.

In particular, it is appreciated that the ribs provide the shell-like structure of the cutting zone, which is considerably thinner than in a standard, non-hollow insert (full of material at the cutting zone) with the required mechanical integrity to withstand the loads exerted on the cutting element during a cutting operation.

It is also appreciated that the jagged design of the ribs yields that some points of the cavity surface are closer to the cutting edge than others. Thus, while the average shell-thickness can be T (an average of the distances of all points on the cavity surface at the cutting zone from the cutting edge), some points along the cavity surface at the cutting zone are extremely close to the cutting edge, with a thickness t<T. This provides for considerable efficiency in the cooling of the cutting edge without deteriorating mechanical integrity of the cutting zone.

In other words, in a corresponding structure having a smoother cavity surface at the same average thickness T, the cooling efficiency would be lesser than in the above described example and the mechanical integrity may be lesser as well.

The arrangement can be such that the cooling fluid provided to the cavity is configured for cooling the cutting edge from the side of the cavity surface. In particular, cooling fluid provided into the cooling cavity is configured, by virtue of the geometry of the cavity so as not to come into direct contact with the cutting edge.

According to one example, each cutting edge of the cutting element can have a corresponding cooling cavity. Alternatively, the majority of said cutting element can be hollow, comprising a single cooling cavity facilitating cooling for all cutting edges of the cutting element.

In addition, it is appreciated that, on the one hand, the smaller the height of the cutting element (i.e. the distance between the front face and the rear face), the stronger the cutting element since the cutting edge is elevated over a smaller hollow area. On the other hand, the lesser the height of the cutting element, the lesser the space for cooling fluid to flow. Thus, the geometry of the cutting element and of the cavity can be such that meet the required cooling on the one hand while meeting mechanical integrity requirements on the other.

In particular, the following differences should be noted between different cutting operations:
  Milling—the cutting edge keeps coming in and out of contact with the workpiece. As a result, when it is in contact with the workpiece the cutting edge heats up, whereas when it is out of contact, the cutting edge cools down. However, this constant motion in and out of the workpiece causes the milling insert to be repeatedly 'impacted' by the workpiece, requiring sufficient mechanical robustness and stability. In such case, it may be beneficial to provide a more robust structure of the cutting element by using a configuration in which each cutting zone is provided with its individual cooling cavity;

Turning—the cutting edge remains within the workpiece throughout the cutting operation, whereby the effect of 'impact' by the workpiece, which occurs in milling, is eliminated. However, since the cutting edge is constantly in contact with the workpiece, it constantly heats up, requiring sufficient cooling to prevent mechanical damage to the cutting insert.

In addition, the front face of the cutting element can be formed with at least one drainage outlet being in fluid communication with the cooling cavity, and wherein the discharge outlet is arranged such that cooling fluid discharged therethrough does not come in contact with the cutting edge.

According to another aspect of the subject matter of the present application, there is provided a cutting tool comprising:

a cutting tool holder comprising a seat portion having a base surface provided with a fluid inlet for providing cooling fluid to the seat portion and a fluid outlet configured for removing cooling fluid from the seat portion; and a cutting element according to any one of claims 1 to 11 positioned within the seat portion of the cutting tool holder, over the base surface;

wherein, a cooling cavity of the cutting element is aligned with said inlet and said outlet, whereby cooling fluid is configured for being provided into the cooling cavity via said inlet and be withdrawn therefrom via said outlet.

In reference to the above, the base surface can be provided with a ramp element configured, when the cutting tool is assembled and the cutting element is mounted onto the base surface, to protrude into the cavity of the cutting element to thereby define a fluid path. Specifically, the fluid path can be configured for receiving cooling fluid through said inlet, directing it towards the portion of the cavity surface at the cutting zone and then towards said outlet. According to a specific example, the cross-sectional area of the fluid path can decrease towards the cutting zone.

According to one design, the base surface can be unitary with the cutting tool holder. Alternatively, according to another design, the cutting tool holder can comprise an intermediate base plate formed with said base surface.

The intermediate base plate can be provided with an inlet bore aligned with the inlet of the cutting tool holder and the cooling cavity of the cutting element and an outlet bore aligned with the outlet of the cutting tool holder and the cooling cavity of the cutting element, to allow passage of cooling fluid therethrough.

The cutting tool can be a milling tool comprising a plurality of cutting elements mounted thereto, wherein said outlet has an open end at a rear portion of the seat so as to direct cooling fluid discharged from the outlet towards a subsequent cutting element of the milling tool.

According to still another aspect of the subject matter of the present application, there is provided a cutting tool holder for mounting thereon a cutting element to form a cutting tool, said cutting tool holder comprising a seat portion having a base surface onto which said cutting element is to be mounted, said base surface being provided with a fluid inlet for providing cooling fluid to the seat portion and a fluid outlet configured for removing cooling fluid from the seat portion.

In addition, the following points should be noted:

the cutting element can be manufactured by a pressing process within a mold, simplifying production thereof;

more efficient cooling of the cutting zone of a cutting insert can provide at least one of the following advantages: longer life span of the cutting element under standard cutting conditions, an increased feed and/or increased revolution speed of the cutting tool or of a corresponding workpiece, thereby reducing the required time for performing a predetermined cutting operation;

the cooling fluid can be any know cooling fluid including water, air, nitrogen etc.; and producing the cutting element with a cavity saves valuable material (e.g. tungsten carbide).

The cavity of the cutting element can be formed at an angle to the cutting edge. I particular, it can be angled at 45° to a top or bottom surface of the cutting element. The insert bore, in turn, can be angled to a top and bottom surface thereof and configured for receiving therein a fastening member in a direction generally perpendicular to the top and bottom surface.

The cutting insert can have a first portion and a second portion, angled at about 135° with respect to each other.

The cutting element can comprise a flow channel at the top surface thereof, configured for concentrating fluid flow towards the cutting edge. An outlet of the flow channel can be located below the top surface, and a top surface of the cutting element can be of angled configuration while a bottom surface thereof is generally flat.

The cutting element can be configured for performing a drilling operation or mounting onto a tool holder to form a drilling tool configured for performing a drilling operation.

Specifically, the drilling element can comprise an outlet configured for emitting a cooling fluid to cool the cutting edge, wherein cooling is aided by centrifugal forces caused by rotation of the drilling tool itself.

In effect, centrifugal forces facilitate emission of the cooling fluid towards the cutting edge while rotation of the drilling tool with respect to a bottom surface of the workpiece allows the workpiece to remove cooling fluid away from the cutting edge.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4 is a schematic enlarged view of the base plate of FIG. 3 when mounted onto the tool holder of FIG. 2;

FIG. 8A is a schematic isometric view of a turning tool according to another example of the subject matter of the present application;

FIG. 8B is a schematic bottom isometric view of the turning tool shown in FIG. 8A;

FIG. 9A is a schematic isometric view of a turning tool according to another example of the subject matter of the present application;

FIG. 9C is a schematic isometric view of the turning tool shown in FIG. 9A, demonstrating the flow of a cooling fluid;

FIG. 14 is a schematic isometric view of a male part of a mold for the manufacture of the turning insert shown in FIG. 13B;

FIG. 18C is a schematic bottom isometric view of the turning insert shown in FIG. 18B;

FIG. 21C is a schematic exploded isometric view of the turning tool shown in FIG. 21A;

FIG. 22D is a schematic front view of a turning insert used in the turning tool shown in FIG. 21A;

FIG. 25A is a schematic isometric view of a turning tool according to still another example of the subject matter of the present application;

FIG. 25B is a schematic enlarged view of detail N of the turning tool shown in FIG. 25A;

FIG. 26A is a schematic bottom view of a turning insert used in the turning tool shown in FIG. 25A;

FIG. 27 is a schematic enlarged view of the turning insert shown in FIG. 26A, with a turning insert thereof being removed, demonstrating the flow of cooling fluid;

FIG. 30A is a schematic isometric view of a turning tool according to still another example of the subject matter of the present application;

FIG. 35B is a schematic isometric section view of the milling tool shown in FIG. 34A, demonstrating the flow of cooling fluid;

FIG. 38 is a schematic isometric section view of the drilling tool shown in FIG. 37A, demonstrating the flow of cooling fluid;

DETAILED DESCRIPTION OF EMBODIMENTS

Figure 1A:
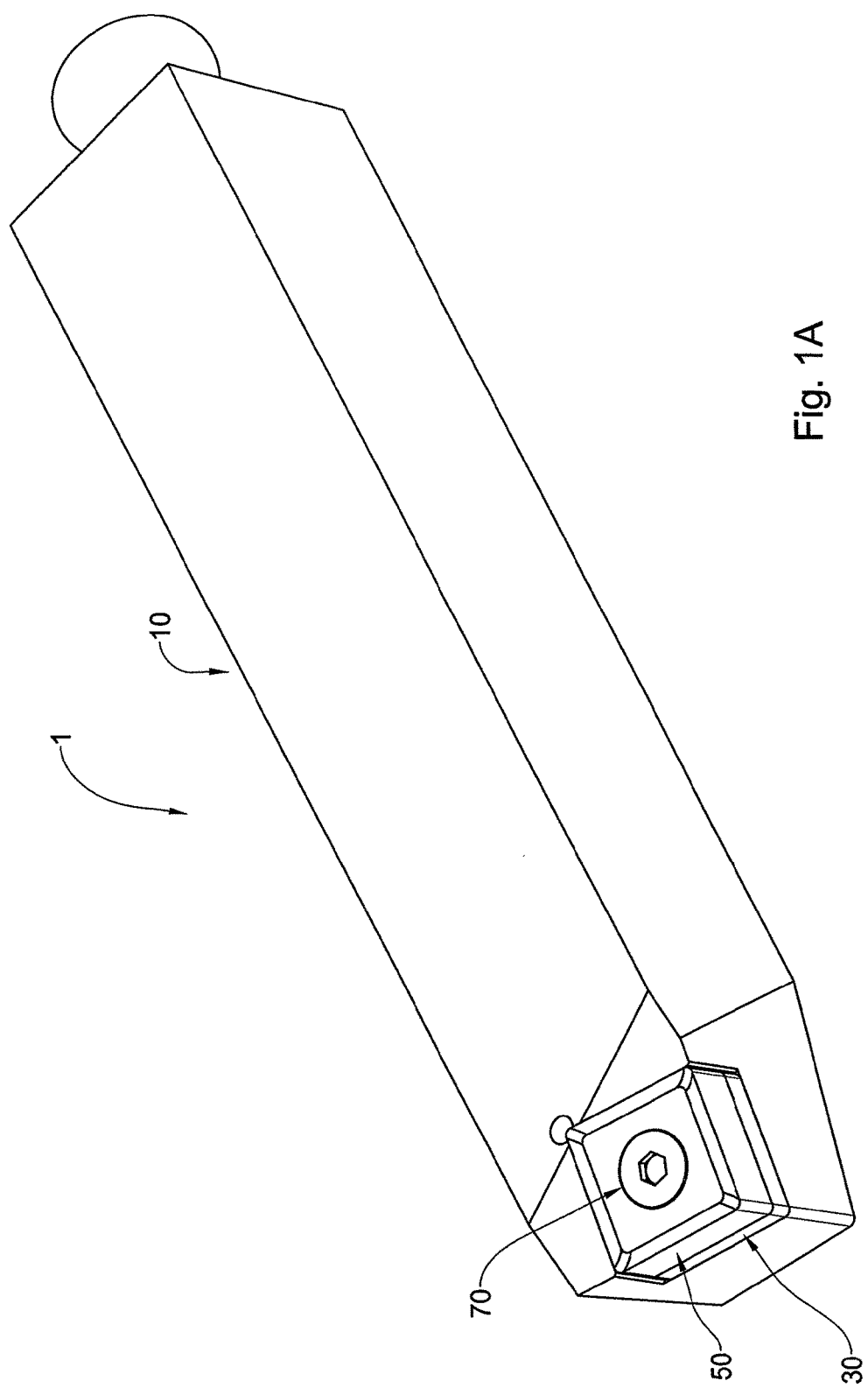
FIG. 1A is a schematic isometric view of a turning tool according to the subject matter of the present application.
Figure 1B:
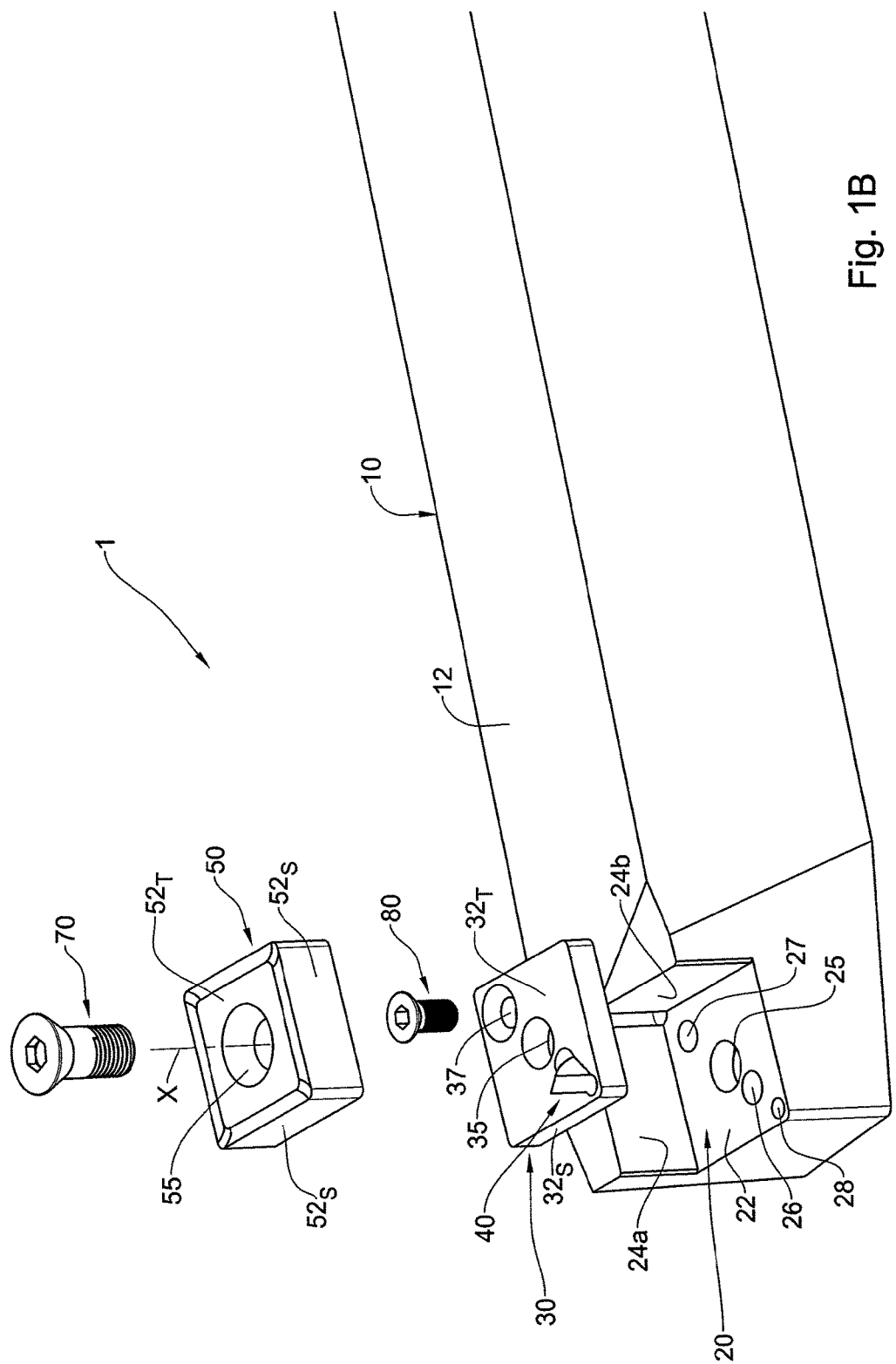
FIG. 1B is a schematic exploded isometric view of the turning tool shown in FIG. 1B.

Turning to FIGS. 1A and 1B, a turning tool according to the subject matter of the present application is shown generally designated as 1, and comprising a tool holder 10, a base plate 30 (made of widia), a turning insert 50 and two clamping screws 70, 80. The turning tool 1 is designed so as to allow cooling of the area of the cutting edge thereof during a turning operation.

Figure 2:
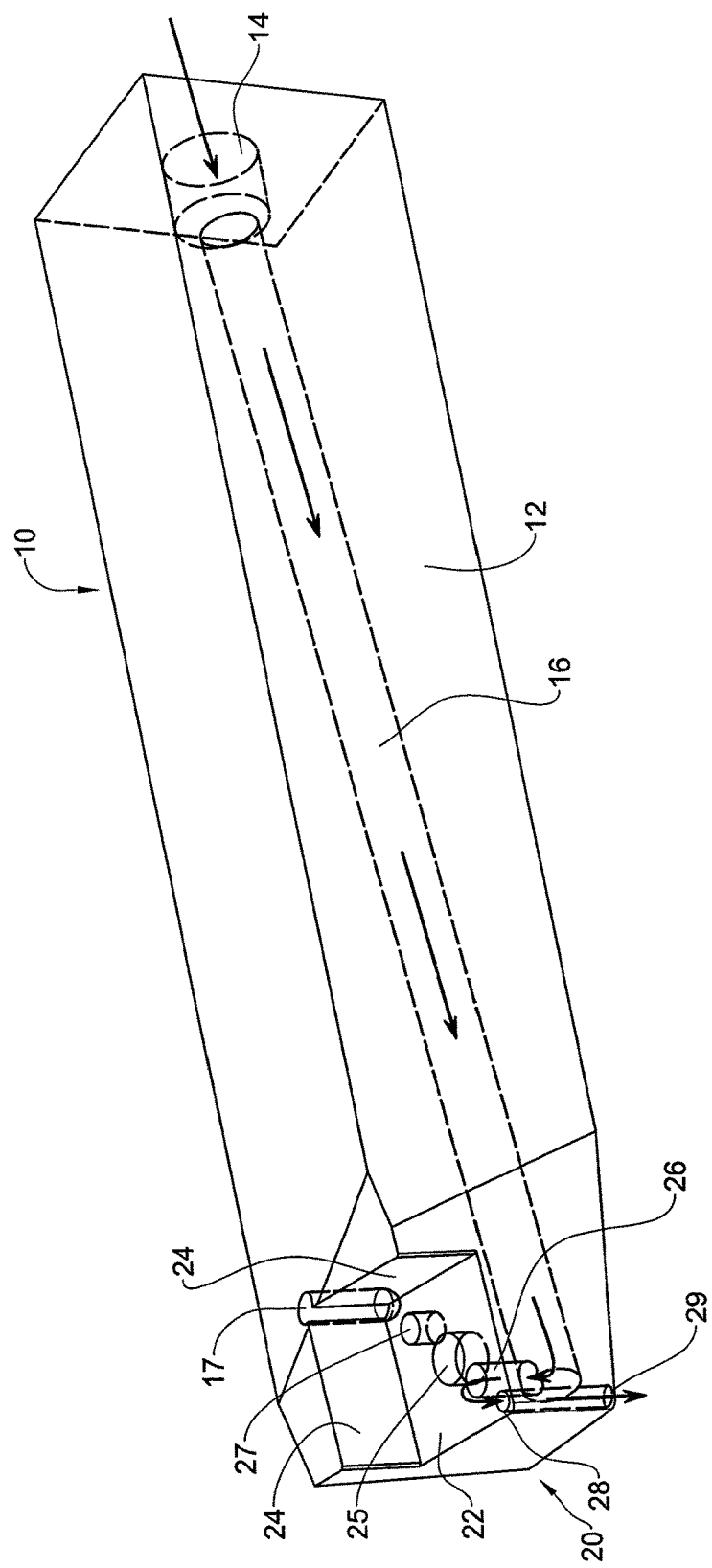
FIG. 2 is a schematic isometric view of a tool holder used in the turning tool shown in FIGS. 1A and 1B.

With particular reference being made to FIG. 2, it is observed that the cutting tool holder 10 has a main body 12 comprising a seat portion 20 for mounting thereon the base plate 30 and the cutting insert 50. The body 12 is provided with a cooling fluid provision channel 16 passing therethrough and configured for providing a cooling fluid to the seat portion 20.

The seat portion 20 has a bottom face 22 configured for positioning thereon of the base plate 30, and is delimited by two side walls 24. The bottom face 22 is formed with an auxiliary bore 27 configured for receiving therein an auxiliary securing bolt 80 for fastening of the base plate 30 into the seat 20, and a main bore 25 configured for receiving therein a main securing bolt 70 for fastening of the cutting insert 50 into the seat 20.

The seat portion 20 is also formed with an cooling inlet 26 configured for emitting the cooling fluid provided through the channel 16, and an outlet 28 configured for removal of the cooling fluid from the area of the seat portion 20.

Figure 3:
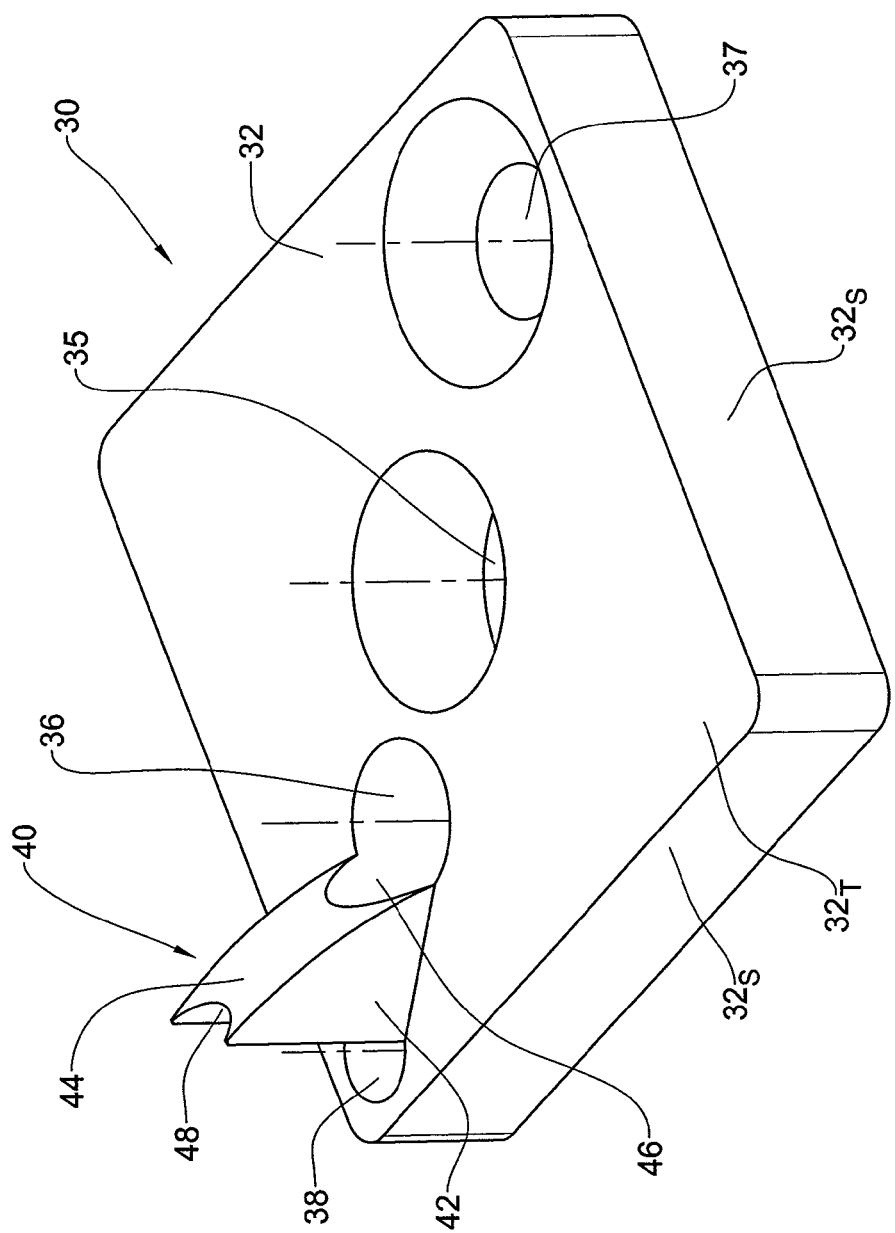
FIG. 3 is a schematic isometric view of a base plate used in the turning tool shown in FIGS. 1A and 1B.

Turning now to FIGS. 3 and 4, the base plate 30 comprises a main body 32 having a top face 32T, a bottom face 32B and side faces 32S extending therebetween. The main body 32 comprises a main bore 35 for passing therethrough of the main securing bolt 70 and an auxiliary bore 37 for passing therethrough of the auxiliary securing bolt 80.

The base plate 30 further comprises an inlet hole 36 and an outlet hole 38 which, when the base plate 30 is mounted into the seat portion 20 of the cutting tool holder 10, are aligned with the respective inlet and outlet 26, 28 of the cutting tool holder 10.

The base plate 30 further comprises a fluid ramp 40 projecting from the top surface 32T thereof, disposed between the inlet 36 and the outlet 38, and configured for directing the flow of the cooling fluid towards a designated area of the cutting insert 50.

In particular, as shown in FIG. 4, cooling fluid incoming through the channel 16 is emitted through the inlet 26 and immediately through inlet 36. As will be explained in detail later with respect to FIG. 6, fluid flow is restricted by the geometry of the cutting insert 50 and is directed towards the outlet 38 and subsequently 28 to be emitted from the cutting tool 1.

Figure 5A:
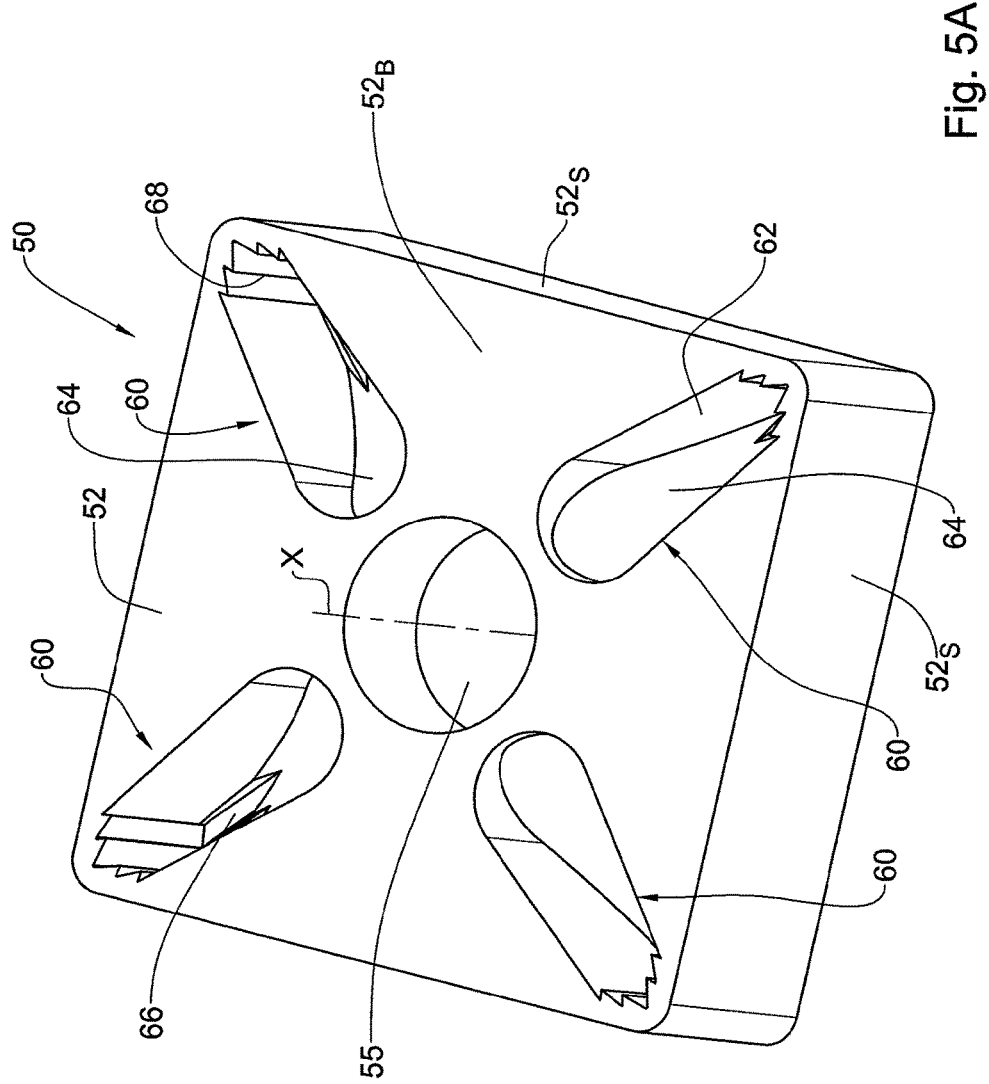
FIG. 5A is a schematic bottom isometric view of a turning insert used in the turning tool shown in FIGS. 1A and 1B.
Figure 5B:
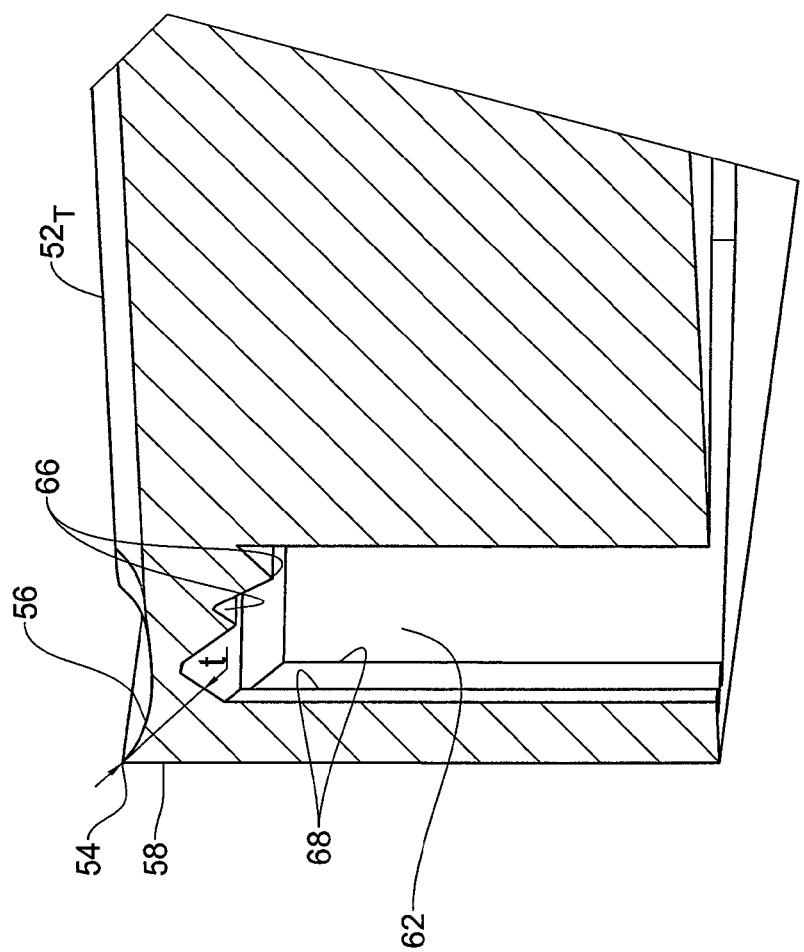
FIG. 5B is a schematic isometric section view of the turning insert shown in FIG. 5A.

Attention is now drawn to FIGS. 5A and 5B in which a cutting insert 50 is shown, comprising a body 52 with a top surface 52T, bottom surface 52B and side surfaces 52S extending therebetween. The cutting insert 50 has four cutting edges 54 defined at the respective four corners of the insert at the intersection between the top face 52T and the side faces 52S. Each cutting edge 54 is delimited by a rake surface 56 and a relief surface 58 located on opposite sides of the cutting edge 32. The cutting edge 54, rake surface 56 and relief surface 58 constitute together the external surface of the cutting zone of the cutting insert 50.

In addition, the cutting insert 50 comprises four cooling cavities 60, each associated with a respective cutting edge 54. Each cooling cavity has an inner space 62 delimited by side walls and a ramp 64, tapering away from the cutting edge 54. The inner surface of the cavity provides each cutting corner of the cutting insert 50 with a shell-like geometry (a thin-walled structure) which has an external, operational surface (comprising the cutting edge 54) and an internal, cooling surface constituted by the surface of the cavity 60.

It is observed that the cooling surface is formed with an array of ribs, including rake ribs 66 which extend generally parallel to the rake surface 56 and relief ribs 68 which extend generally parallel to the relief surface 58. With particular reference to FIG. 5B, the rib array allows the shell-like geometry to be of relatively small thickness t, reaching extremely close to the cutting edge 54. In other words, the arrangement is such that the cavity surface 64 at the cutting zone is much closer to the cutting edge 54 than to the rear surface 52B of the cutting insert 50.

Figure 6:
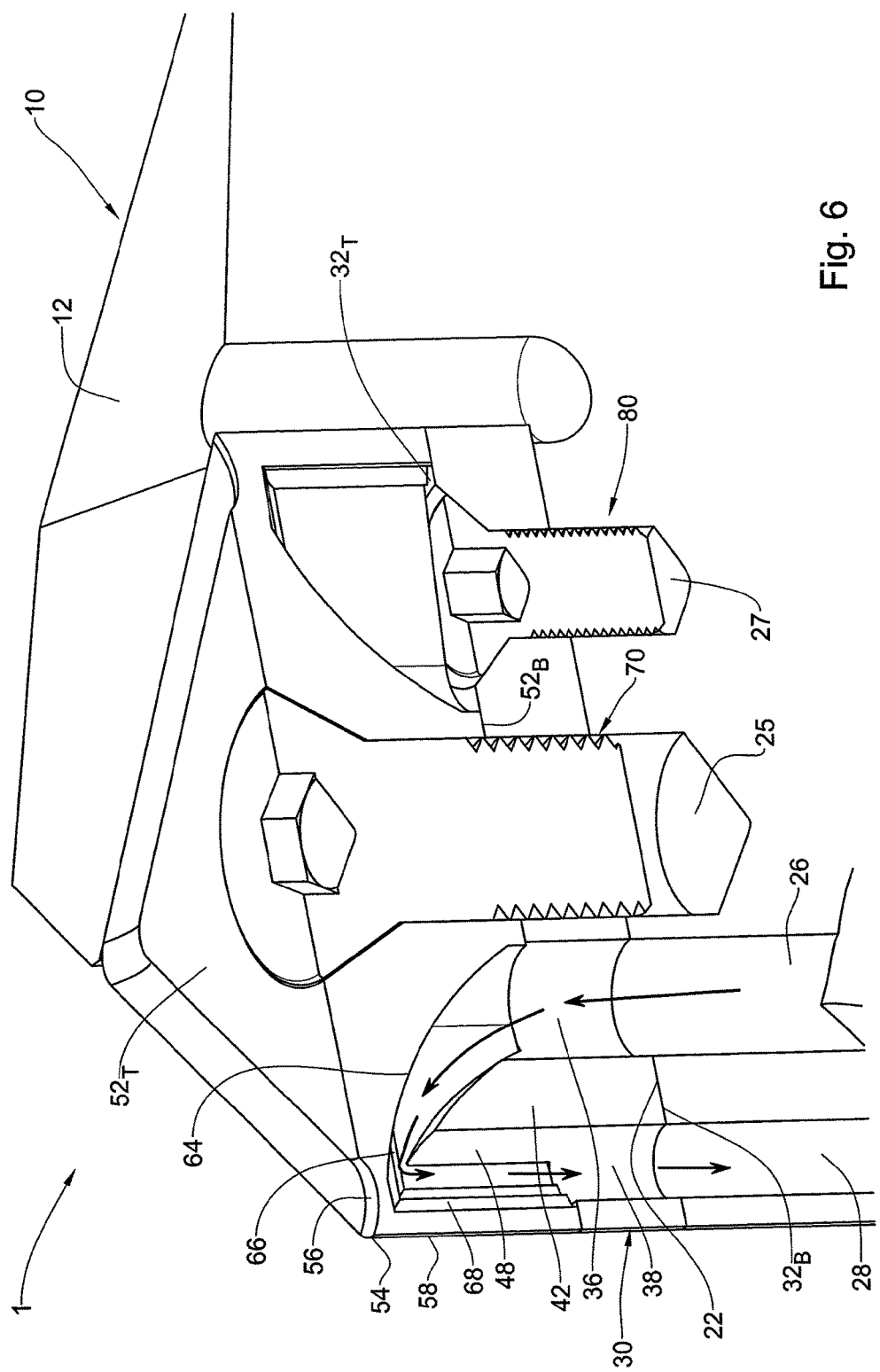
FIG. 6 is a schematic section view of a portion of the turning tool shown in FIGS. 1A and 1B.

Turning to FIG. 6, a section of the cutting tool 1 is shown, demonstrating how the cutting insert 50 is positioned on the base plate 30. It is observed that since the pockets 40 are only at the vicinity of the cutting corners, the majority of the bottom surface 52B of the cutting insert 50 rests on the base plate 30 and thus provides sufficient stability and support to the cutting insert 50.

It is also noted that the geometry of ribs (as opposed to a straight wall) provides for a much stronger construction, allowing the pocket 60 to be even closer to the cutting edge 54, i.e. provide a smaller thickness between the external, operative surface and internal, cooling surface (as small as 0.5 mm).

In operation, during cutting of a workpiece (not shown), the cutting edge 54 heats up due to constant friction with the workpiece. This heat, reduction of which is usually facilitated by providing a cooling fluid directly to the cutting edge, propagates towards the center of the cutting insert 50 so that the body 52 of the cutting insert 50 becomes a heat accumulator.

In order to mitigate this effect, the arrangement according to the subject matter of the present application allows cooling the inner portion of the cutting zone of the cutting insert 50 thereby facilitating both increased cooling of the cutting edge 54 (external cooling is used anyway, though not shown here) and cooling of the body 52 of cutting insert 50 itself.

With additional reference being made to FIG. 4, in operation, cooling fluid W is provided to the seat portion 20. Reaching the seat portion 20 (position W2), the cooling fluid is emitted from the inlet 36 and is urged into the pocket 60 of the cutting insert 50. There (position W3), the slope 64 and the ramp 44 define together a gradually tapering channel, with a gradually reducing cross-sectional area, in which the velocity of the cooling fluid is increased. The cooling fluid is thus pushed towards the inner surface of the cutting edge 54, in between the ribs 66, 68 which maximize heat dissipation between the cutting edge 54 and the cooling fluid W by increasing surface area. The cooling fluid W is then emitted (position W4) from the cutting insert 50 through the open end of the cavity 60 and is discharged from the cutting tool holder 10 via outlets 36 and 26 respectively.

The above described cutting insert 50 is configured for both milling and turning operations. In this regards, the following differences should be noted between these two operations:

Milling—the cutting edge keeps coming in and out of contact with the workpiece. As a result, when it is in contact with the workpiece the cutting edge heats up, whereas when it is out of contact, the cutting edge cools down. However, this constant motion in and out of the workpiece causes the milling insert to be repeatedly 'impacted' by the workpiece, requiring sufficient mechanical robustness and stability;

Turning—the cutting edge remains within the workpiece throughout the cutting operation, whereby the effect of 'impact' by the workpiece, which occurs in milling, is eliminated. However, since the cutting edge is constantly in contact with the workpiece, it constantly heats up, requiring sufficient cooling to prevent mechanical damage to the cutting insert.

The above described cutting insert 50 provides both for sufficient mechanical integrity to withstand a milling operation as well as sufficient heat removal space for the cooling fluid.

Figure 7A:
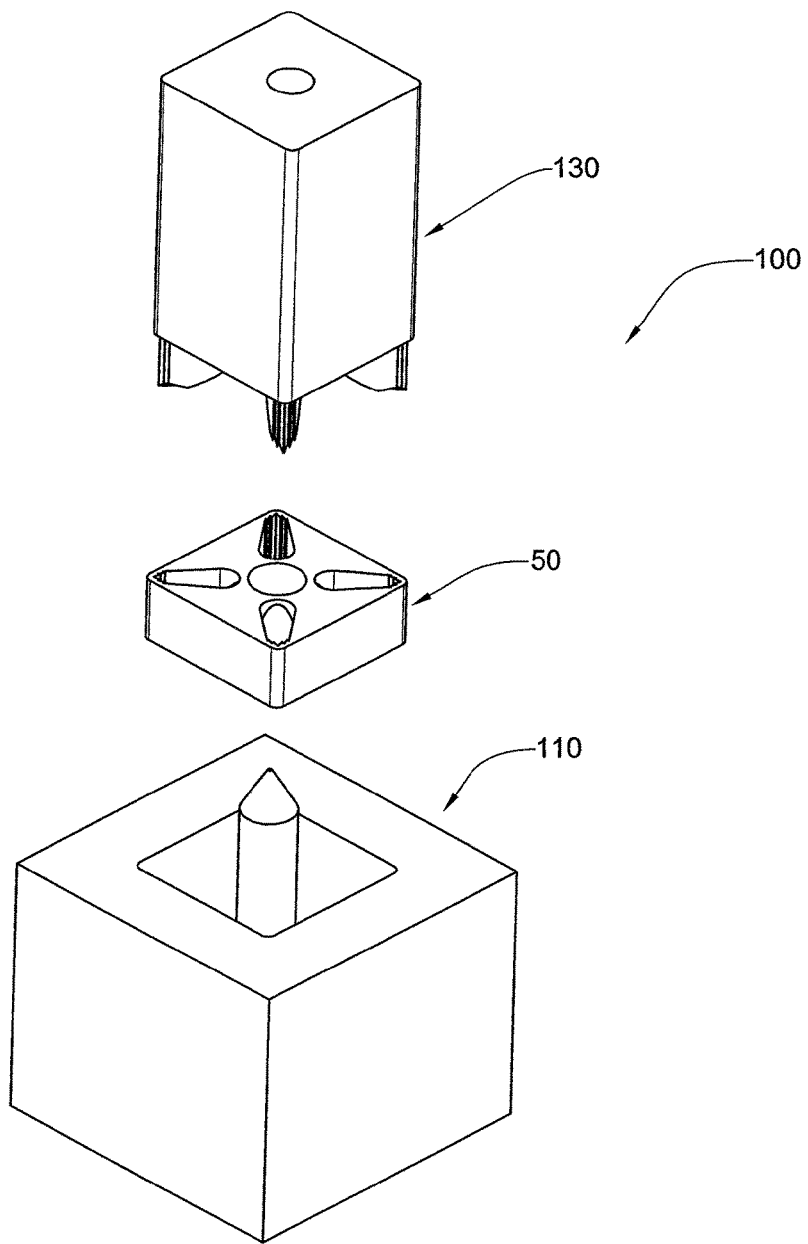
FIG. 7A is a schematic exploded isometric view of a mold for the manufacture of the turning insert shown in FIGS. 5A and 5B.
Figure 7B:
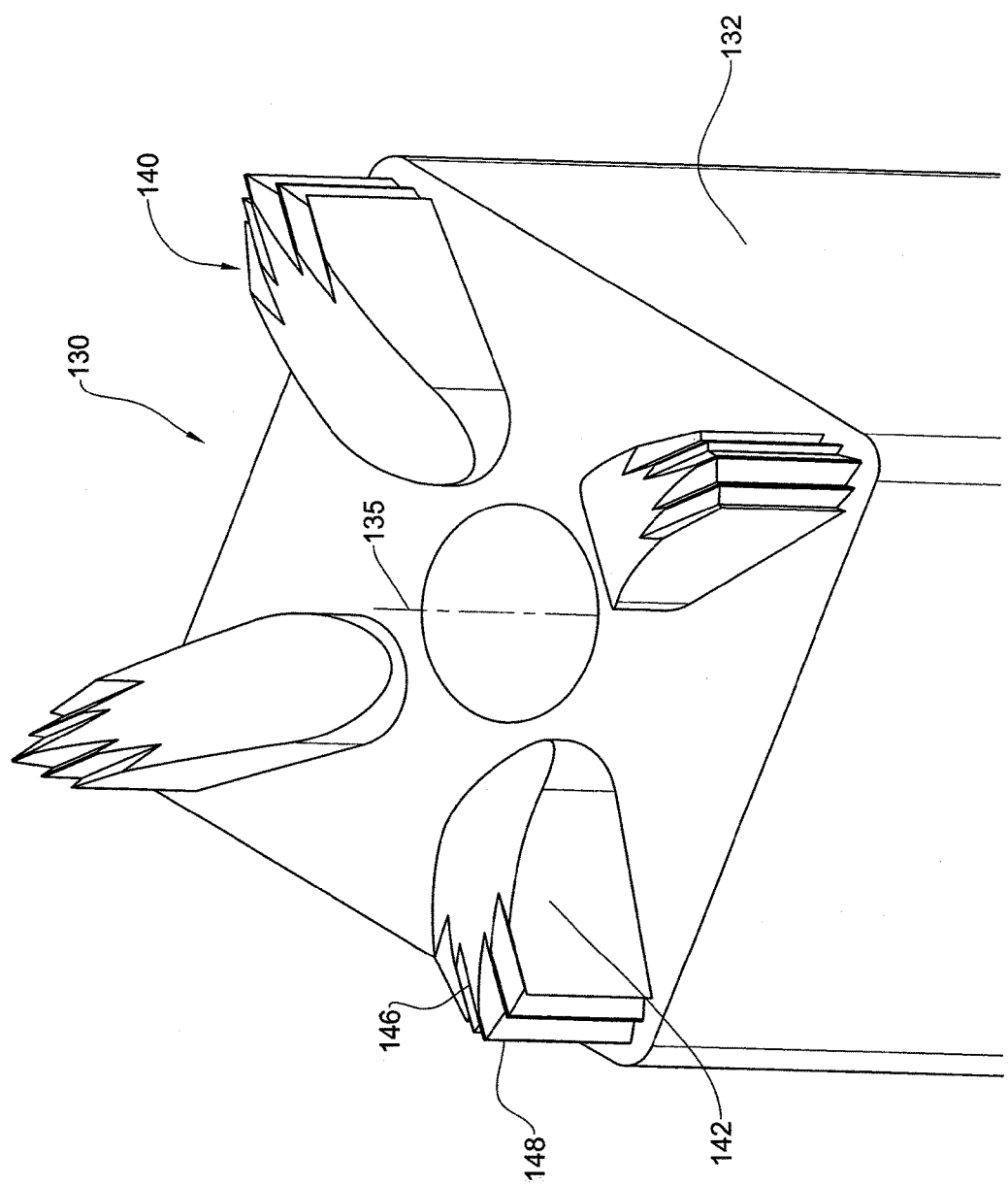
FIG. 7B is a schematic enlarged isometric view of a male part of the mold shown in FIG. 7A.

Turning now to FIGS. 7A and 7B, the cutting insert 50 is manufactured in a press mold 100 comprising a female part 110 and a male part 130. The male part 13 comprises a body 132 formed on a surface thereof with four projections 140 which correspond in shape and size to the required pockets 60 to be formed within the cutting insert 50. Each projection 140 comprises a body 142 formed with a ramp portion 144, rake ribs 146 and relief ribs 148.

Figure 8C:
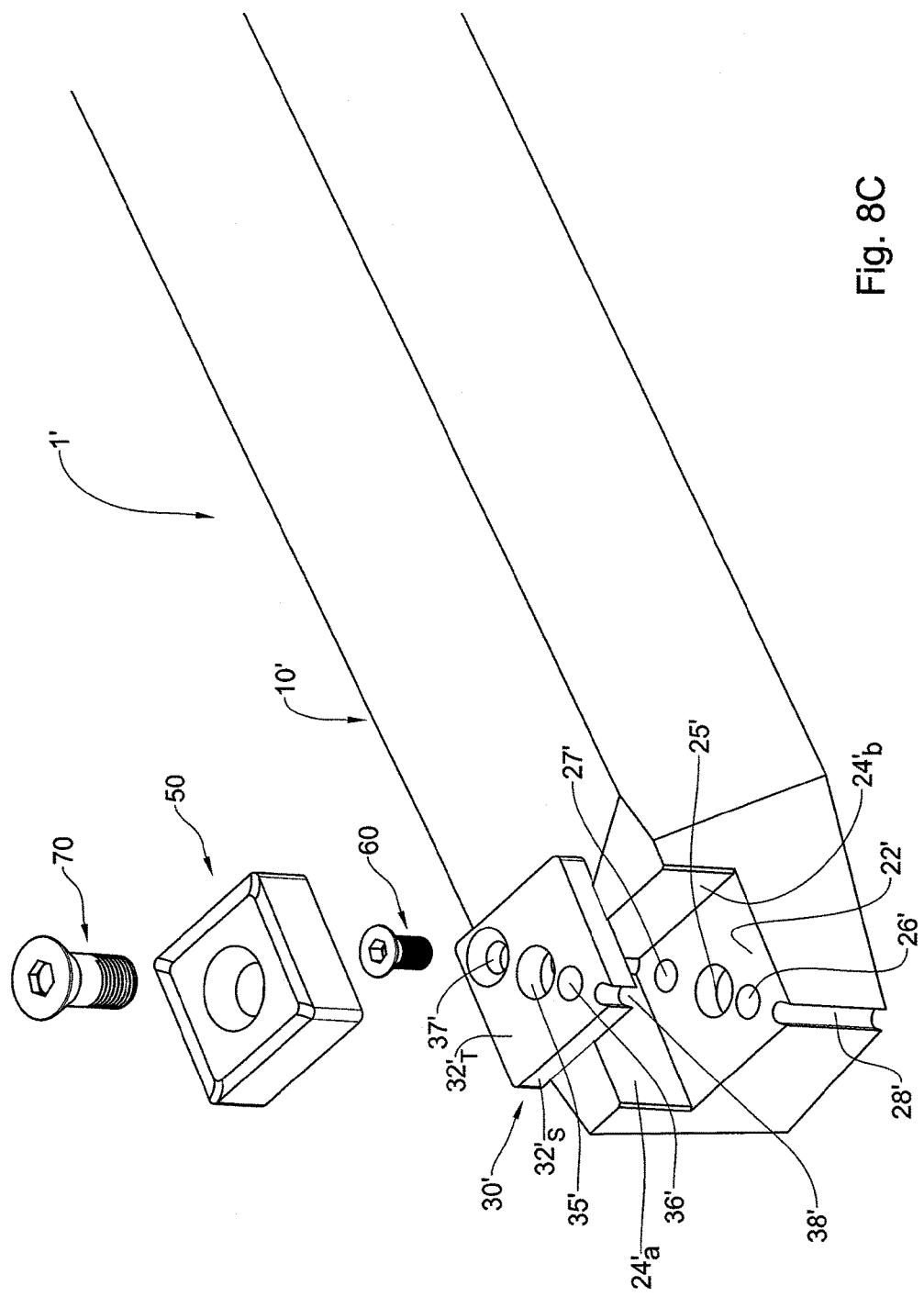
FIG. 8C is a schematic exploded isometric view of the turning tool shown in FIG. 8A.

Attention is now drawn to FIGS. 8A to 8C, in which a variation of the above cutting tool is shown, generally designated as 1'. Similar designation numbers have been used with the addition of a prime ('), i.e. cutting tool holder 10' is equivalent to cutting tool holder 10 and so on.

The only difference between the cutting tool 1' and cutting tool 1' lies in that the outlets 28, 38 of the cutting tool holder 10' and base plate 30' respectively, are in the shape of open channels.

Specifically, the heated cooling fluid emitted from the pocket 60 of the cutting insert 50 does not pass through a closed channel as shown in cutting tool 1, but rather through an open channel 38', 28' as shown in the above Figs.

The open channel configuration allows increasing the flow rate of the cooling fluid W by increasing the drainage rate of the cooling fluid.

Figure 9B:
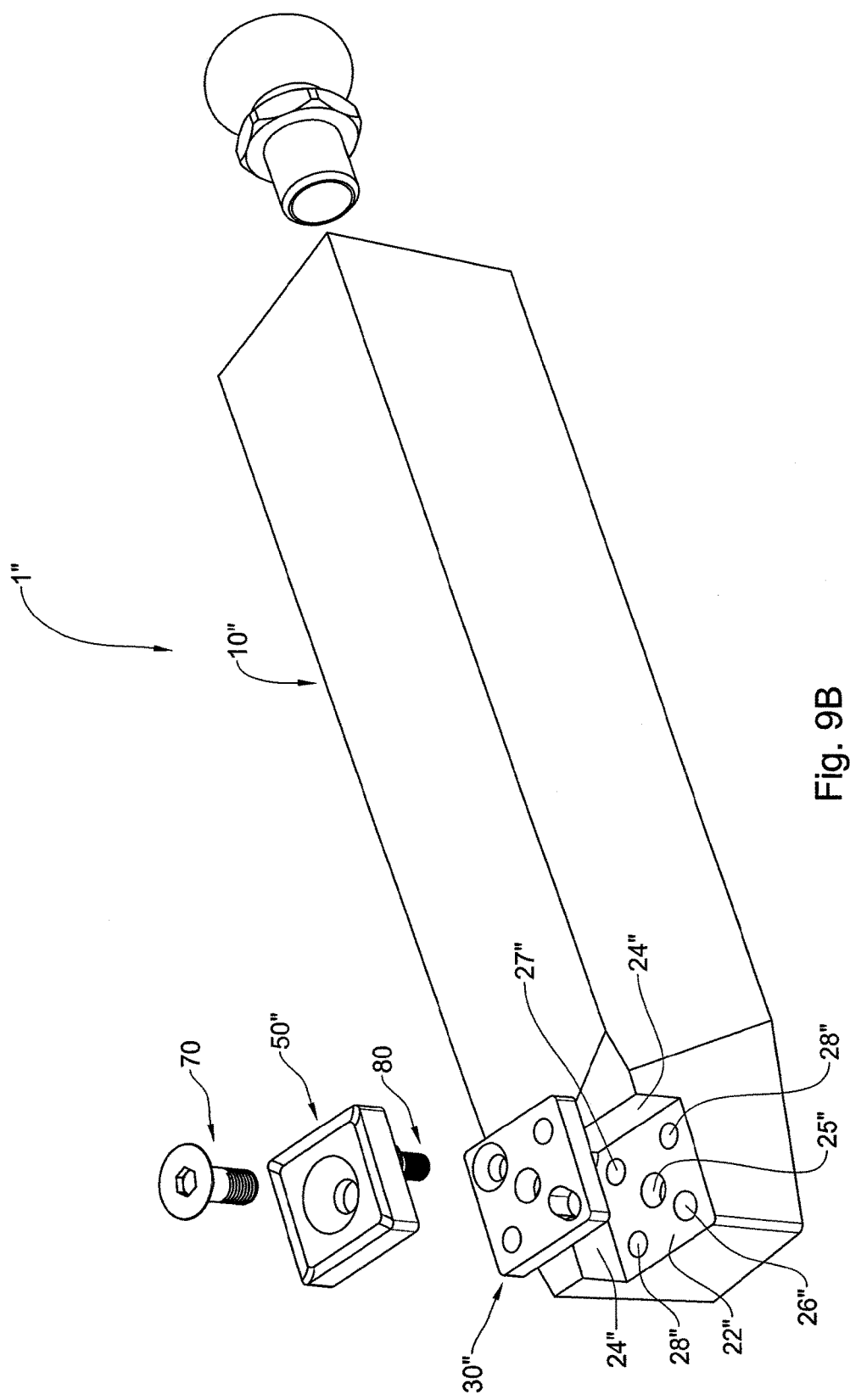
FIG. 9B is a schematic exploded isometric view of the turning tool shown in FIG. 9A.

Turning now to FIGS. 9A and 9B, another example of a cutting tool is shown, generally designated 1", and comprising a cutting tool holder 10", a base plate 30", a cutting insert 50" and securing bolts 70, 80.

In the present example, the seat portion 20" of the cutting tool holder 10" comprises one inlet 26" located at the proximity of the working corner and two outlets 28" located spaced therefrom.

Respectively, the base plate 30" comprises an inlet 36" configured to be aligned with the inlet 26" and two outlets 38" spaced therefrom and configured for being aligned with the outlets 28". Contrary to the previously described example, the base plate 30" does not comprise a fluid ramp.

Figure 10:
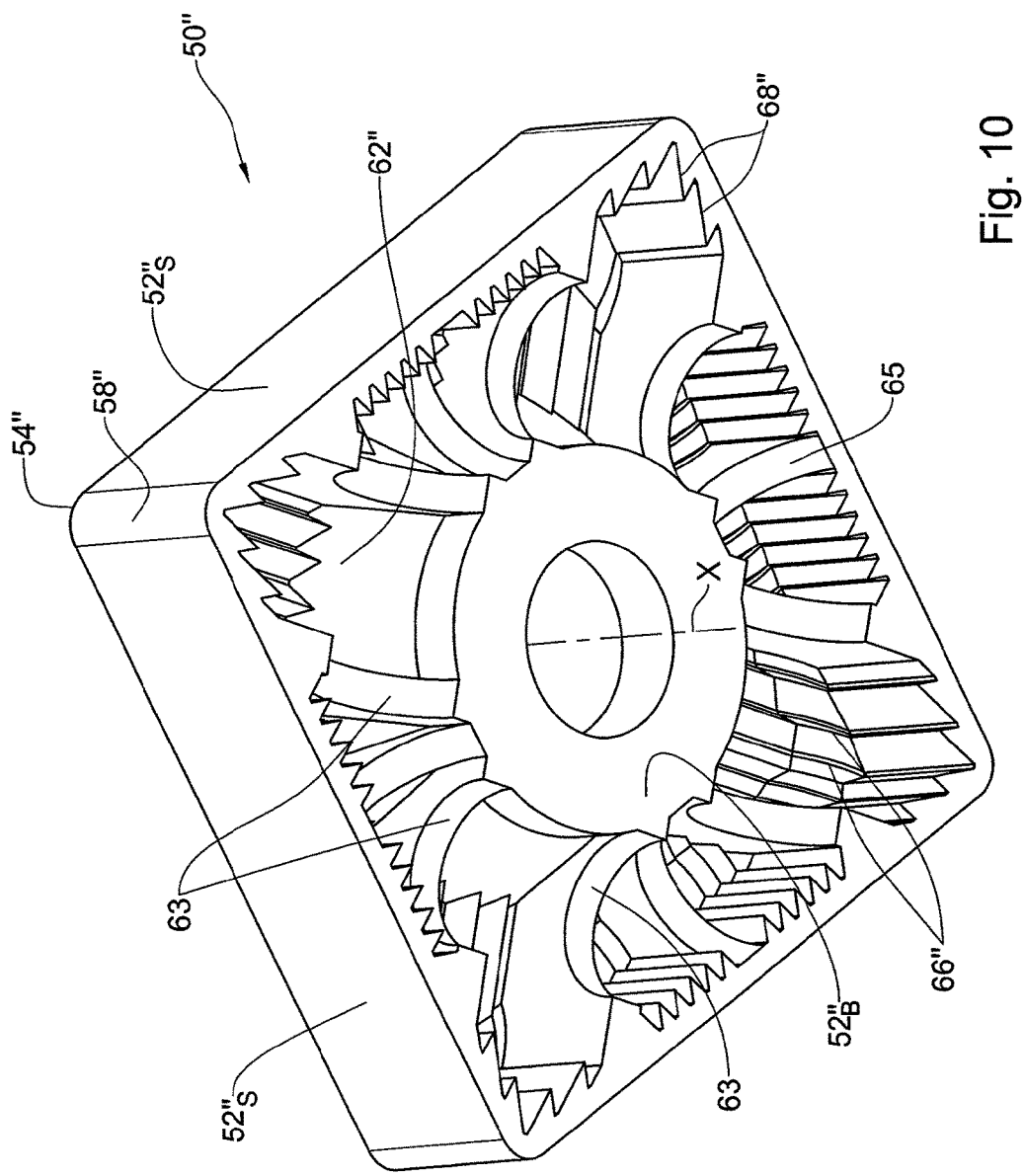
FIG. 10 is a schematic bottom isometric view of the turning insert shown in FIG. 9C.
Figure 11:
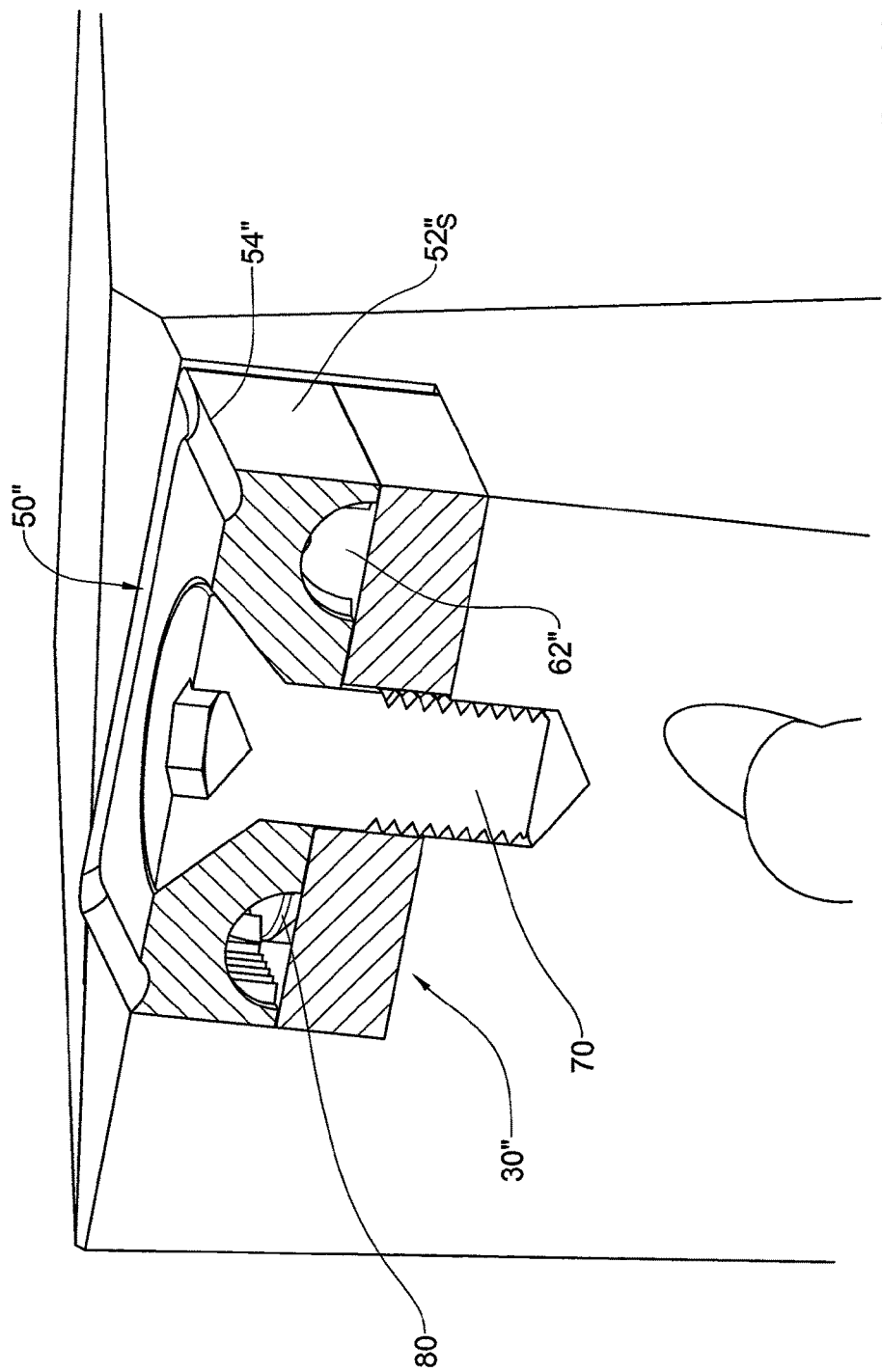
FIG. 11 is a schematic section view of the turning tool shown in FIG. 9A.

Turning to FIG. 10, the cutting insert 50" comprises a main body 52" with a top face 52T", a bottom face 52B" and side faces 52S" extending therebetween. However, whereas in the previous examples the pockets 60 were individual for each cutting corner, in the present example, the cutting insert 50 has a main 60" cavity, so that the entire cutting insert is shell-like (i.e. in the form of a thin-walled structure).

Figure 9D:
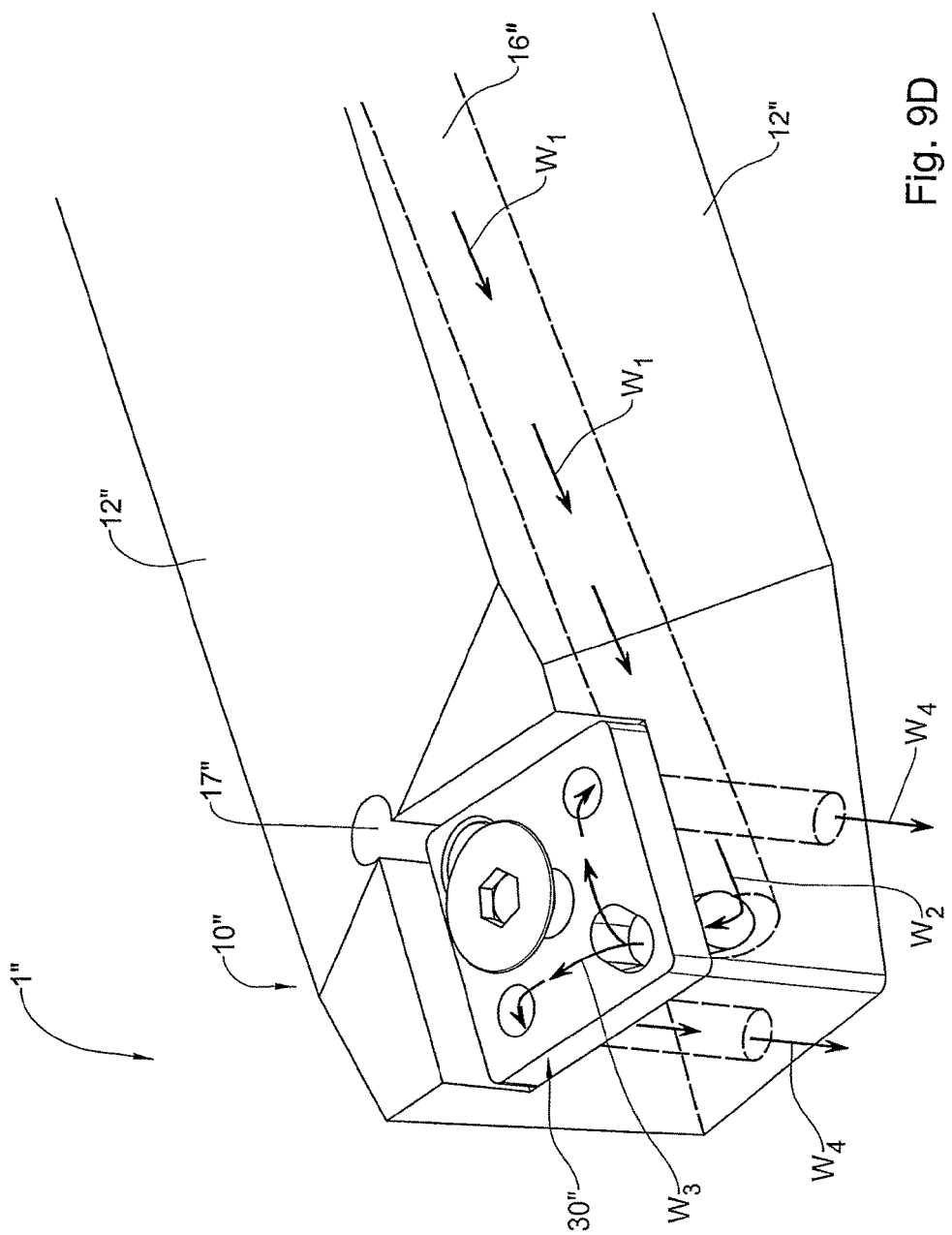
FIG. 9D is a schematic isometric view of the turning tool shown in FIG. 9, with a turning insert thereof being removed.

Reverting to FIGS. 9C and 9D, under the above configuration, cooling fluid W is provided through an internal channel 16" (position W1) and is urged towards the seat portion 20". There, the cooling fluid enters through the inlets 26", 36" (position W2) and is emitted into the cavity 60" of the cutting insert 50" and spreads sideways (position W3), filling the entire cavity 60". The cooling fluid W is then emitted through the discharge outlets 38" and away from the cutting tool 1".

It is observed that, as opposed to the previously described example, the cutting insert 50" of the present example comprises much less material, and is therefore less robust. As a result, it may be that the above cutting insert 50" is more suitable for turning operation rather than milling.

However, it is noted that the above cutting insert may also be used in milling, in particular, in milling operations in which three corners of the cutting insert 50" come into contact with the workpiece. In this case, it is appreciated that the cooling fluid W facilitates cooling not only of the main corner towards which the fluid is discharged but also to the adjacent cutting corners due to flow of the cooling fluid towards the evacuation outlets 38".

Figure 12:
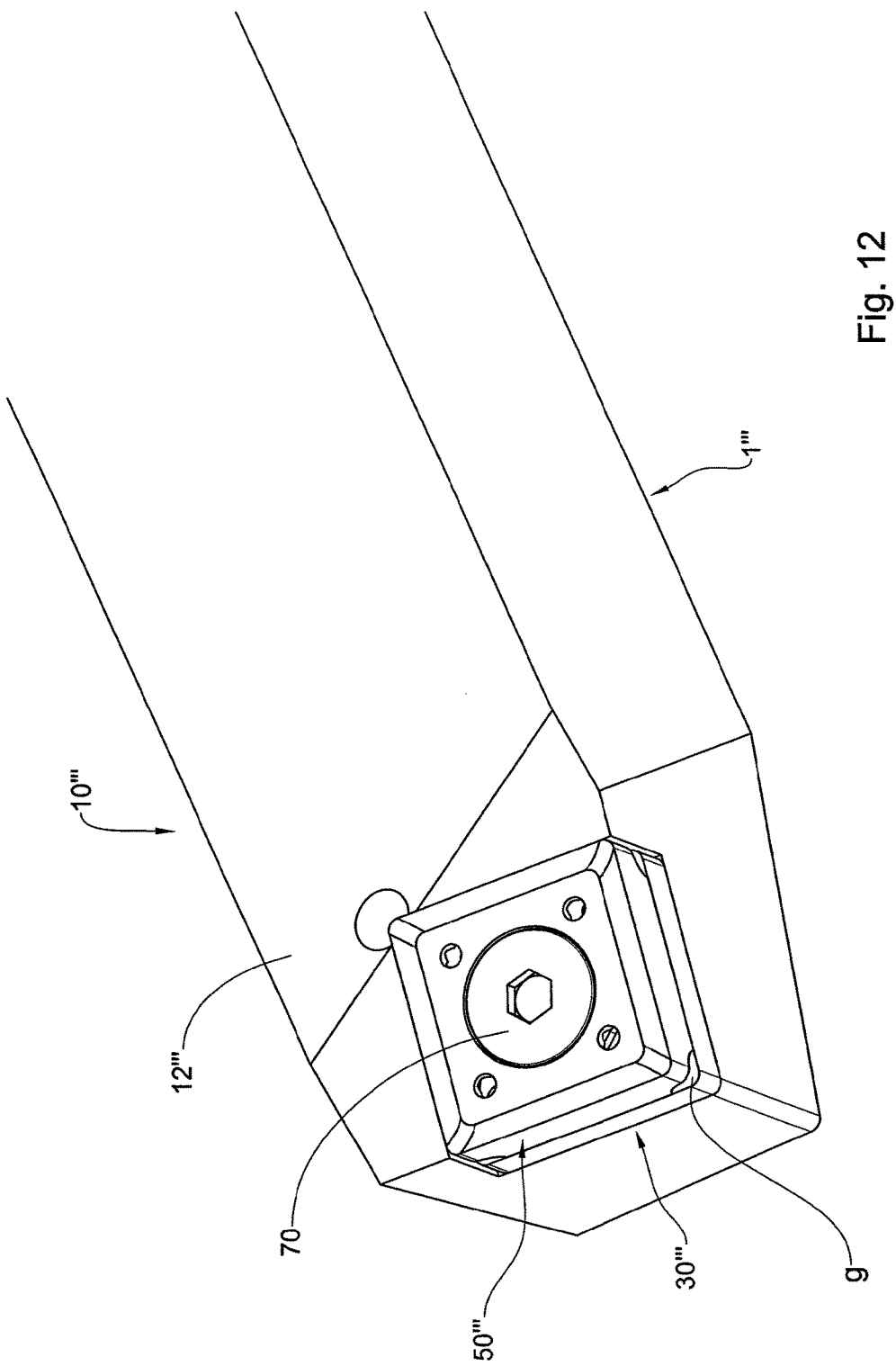
FIG. 12 is a schematic isometric view of a turning tool according to still another example of the subject matter of the present application.
Figure 13A:
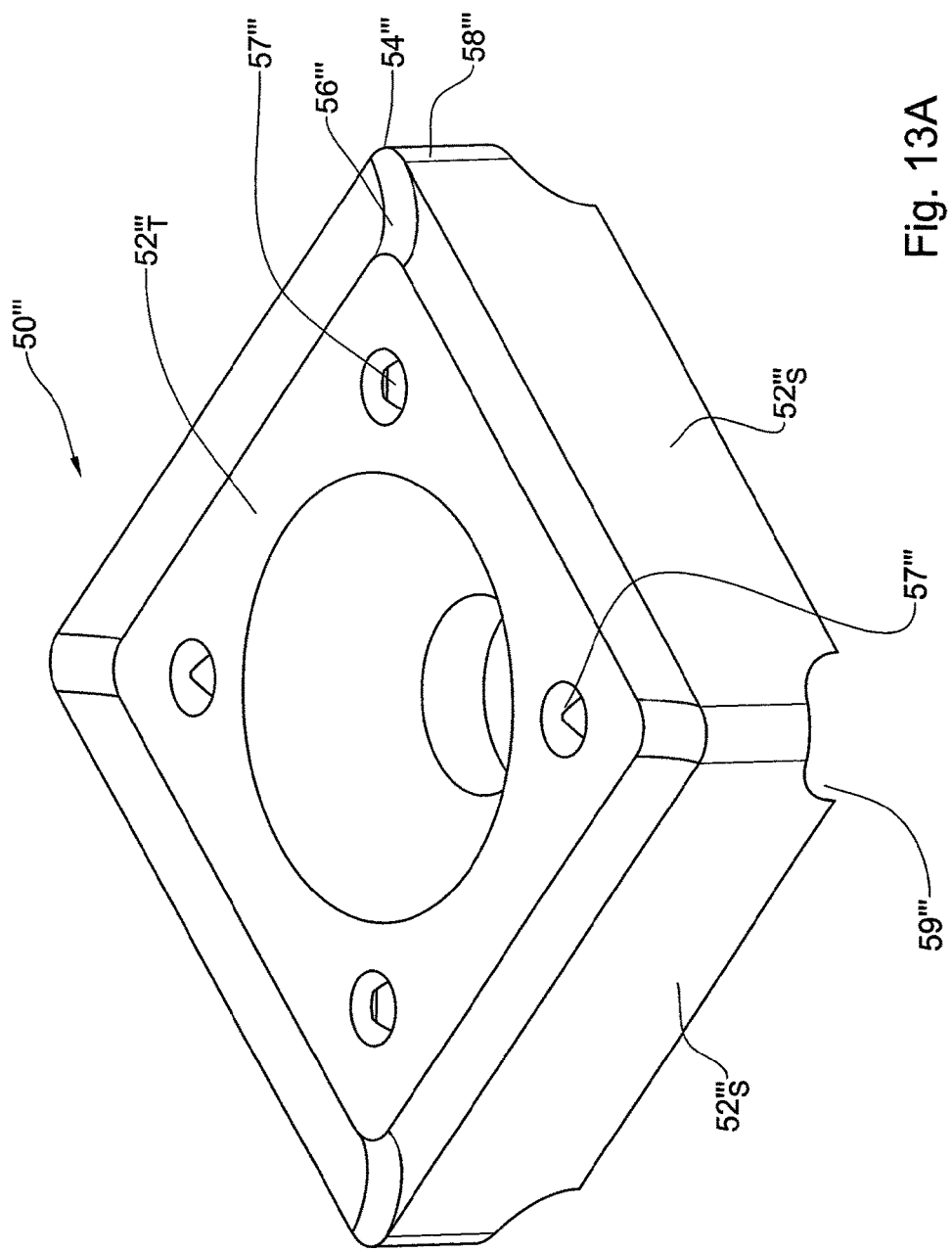
FIG. 13A is a schematic isometric view of a turning insert used in the turning tool shown in FIG. 12.
Figure 13B:
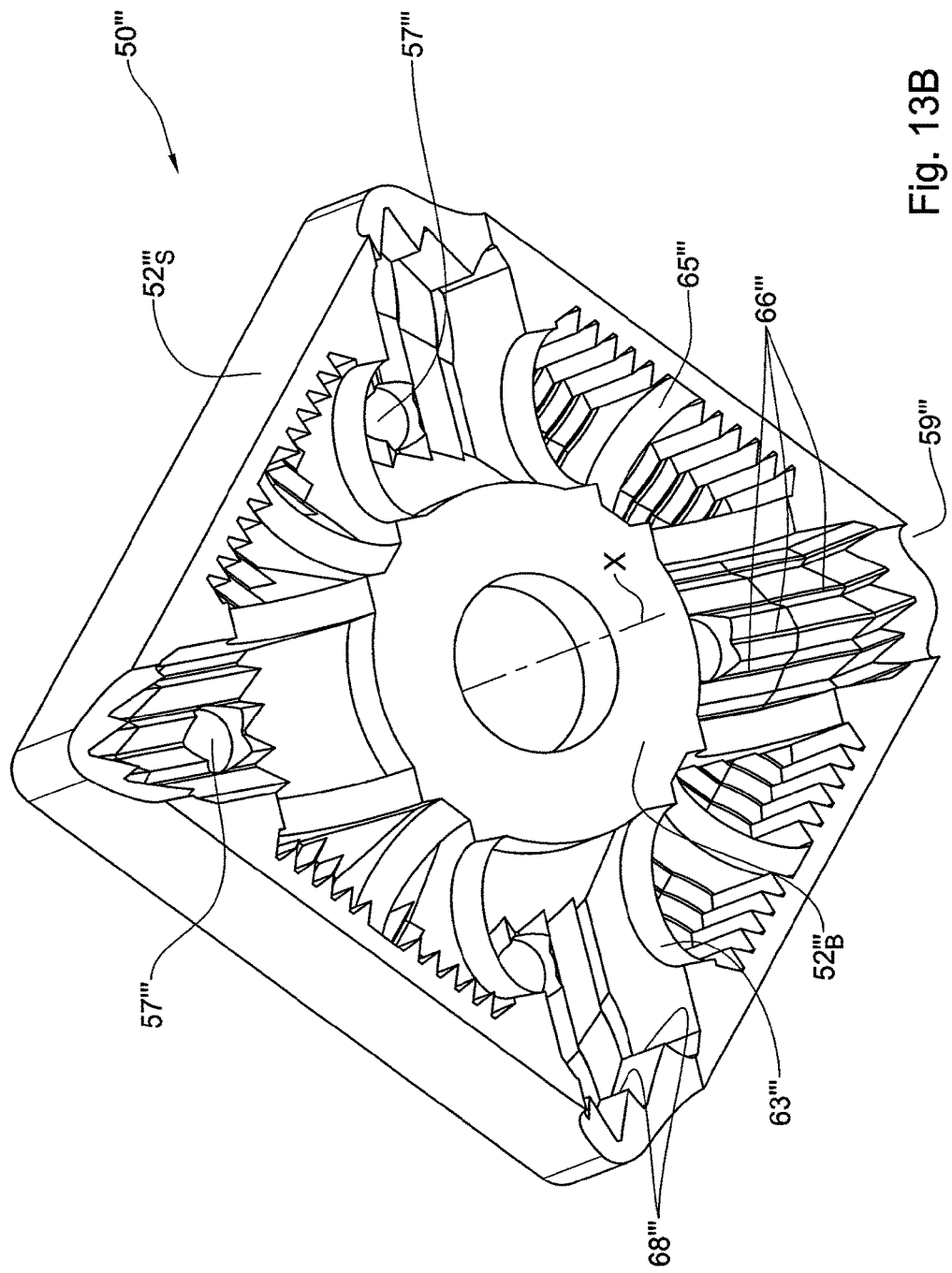
FIG. 13B is a schematic bottom isometric view of the turning insert shown in FIG. 13A.

Attention is now drawn to FIG. 12, in which another example of a turning tool is shown, generally designated 1'''. This tool is generally similar to previously described tool 1" with the difference being in two features:

Reduced corner—the cutting insert 50''' has a chipped-away portion 59''' at each corner proximal to the bottom face 52B''', which provides an additional drainage outlet for the cooling fluid during operation, via a formed gap g;

Additional holes—the top face 52T''' of the cutting insert 50''' is provided with four through going drainage holes 57''' which are configured for facilitating greater removal of cooling fluid from the cutting insert 50'''.

It is noted that the drainage outlet holes 57''' are not directed to the cutting corner as they are not intended for providing cooling fluid to the external surface of the cutting edge 54'''. To the contrary—the drainage holes 57''' are only configured for allowing increased evacuation of cooling fluid from the cutting insert 50'''. Thus, it can be posited that the majority of the cooling fluid emitted from the drainage holes 57''' does not reach the operative cutting corner at all.

Turning to FIG. 14, a male part 130''' is shown constituting part of a mold (not shown) for the manufacture of the cutting insert 50'''. It is noted that the part 130''' comprises four corner projections 140''', each being formed with a hole 147''' configured for receiving therein a corresponding projection from the female part (not shown) in order to form the drainage holes 57'''.

The male part 130''' also comprises eight mid-projections 150''' which are configured for the forming of the ribs disposed along the side of the cutting insert 50''', between two neighboring corners.

Figure 15A:
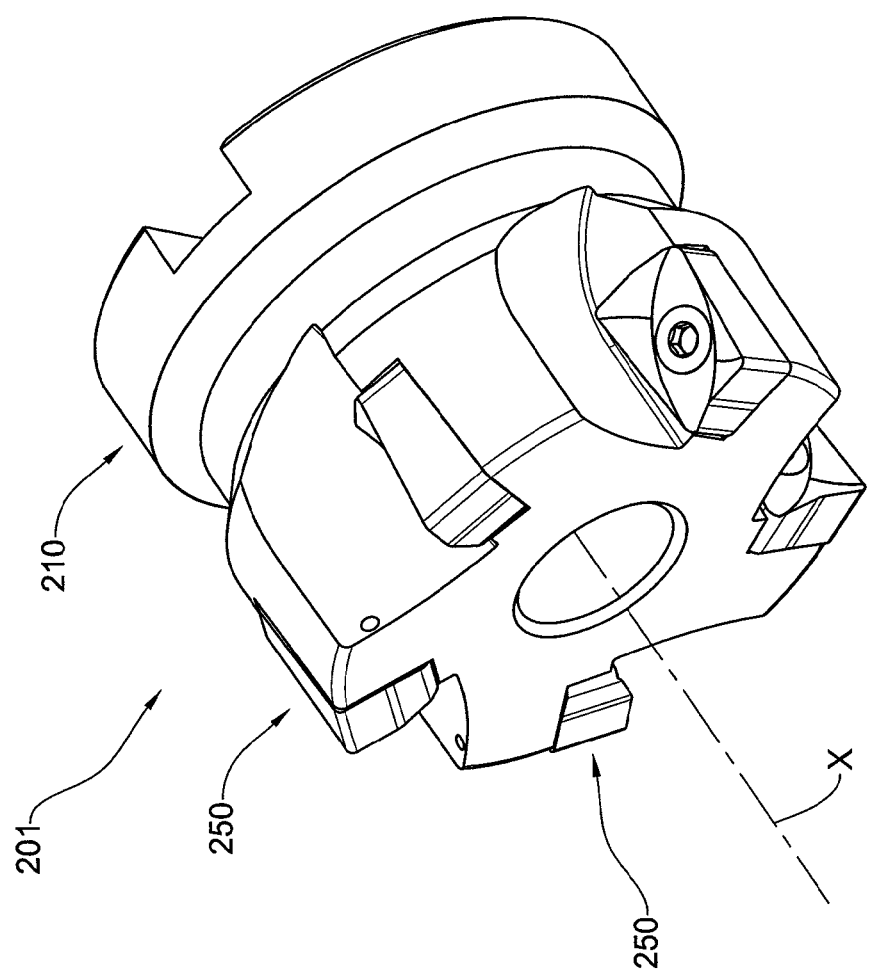
FIG. 15A is a schematic isometric view of a milling tool according to another example of the subject matter of the present application.

Turning now to FIG. 15A, a milling tool is shown, generally designated as 201 and comprising a tool holder 210 formed with a plurality of seat portions 220, each being configured for receiving therein a cutting insert 250.

Figure 15B:
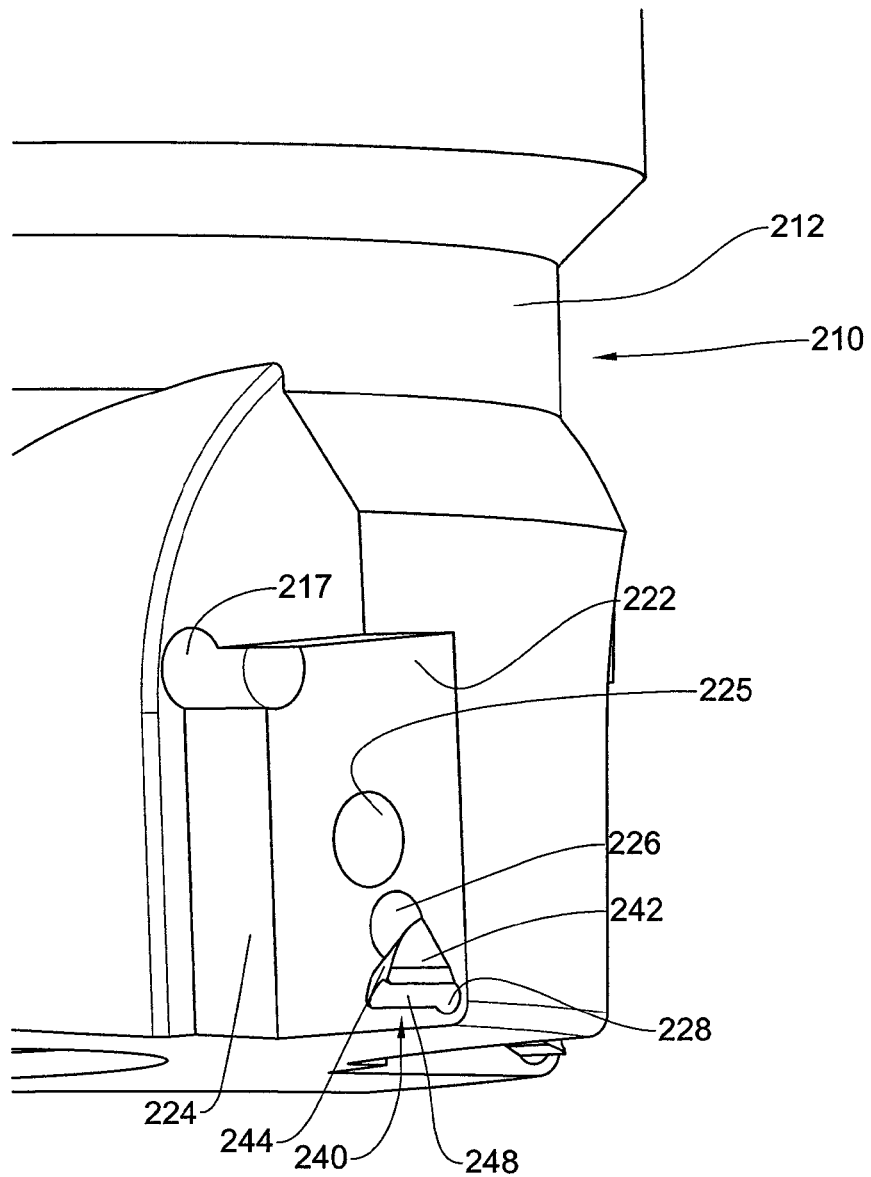
FIG. 15B is a schematic enlarged view of an insert seat of the milling tool shown in FIG. 15A.
Figure 15C:
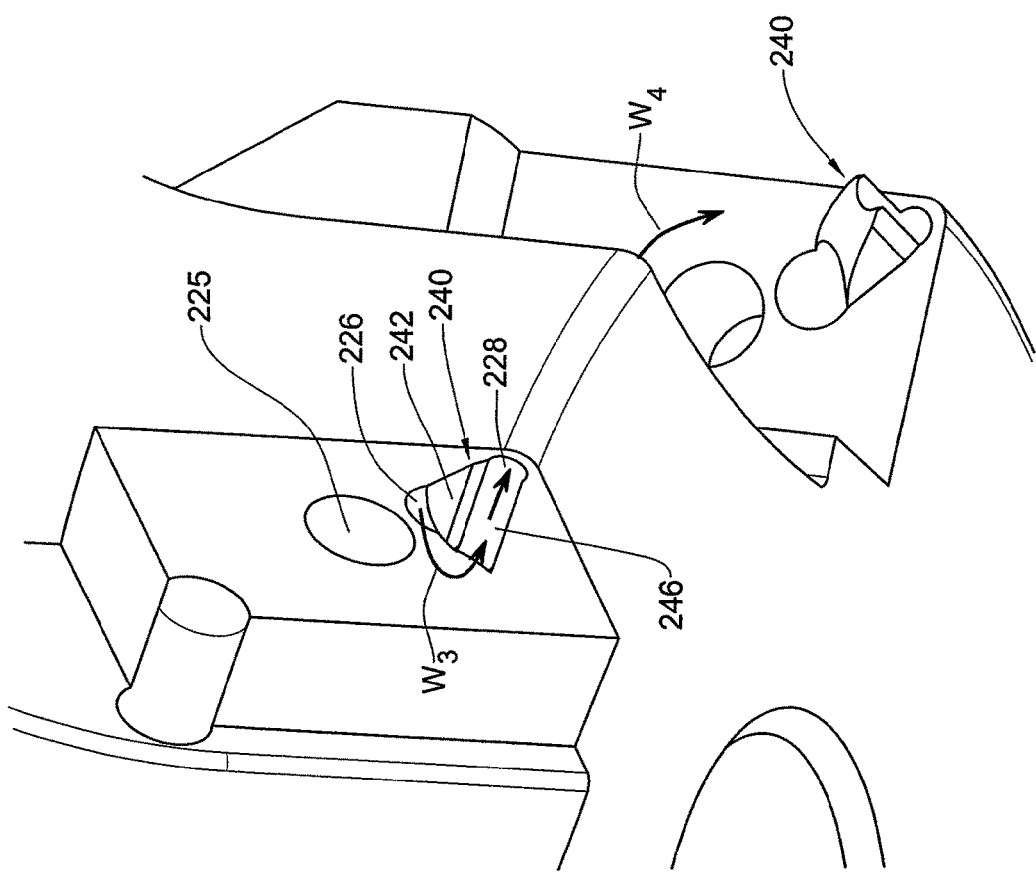
FIG. 15C is a schematic isometric view of the insert seat shown in FIG. 15B, demonstrating the flow of a cooling fluid.

With particular reference being made to FIGS. 15B and 15C, each seat comprises a securing bore 225 configured for receiving therein a securing bolt 70 for fixing the cutting insert 250 into the seat portion 220.

In addition, each seat comprises an inlet 226 configured for provisional cooling fluid into the seat 220 and an outlet 228 configured for removal of cooling fluid therefore. As opposed to the cutting tool 1 previously described, in this case there is no base plate 230, and the seat itself serves as a base plate.

Thus, the seat surface 222 is formed with a ramp element 240 projecting from the seat and has a body 242 with a ramp surface 244, an inlet channel 246 and an outlet channel 248 merging with respective inlet and outlet 226, 228. It is also noted that the outlet channel 228 extends along the seat and has a discharge opening 229 at the rear side of the seat, the purpose of which will not be explained.

Figure 15D:
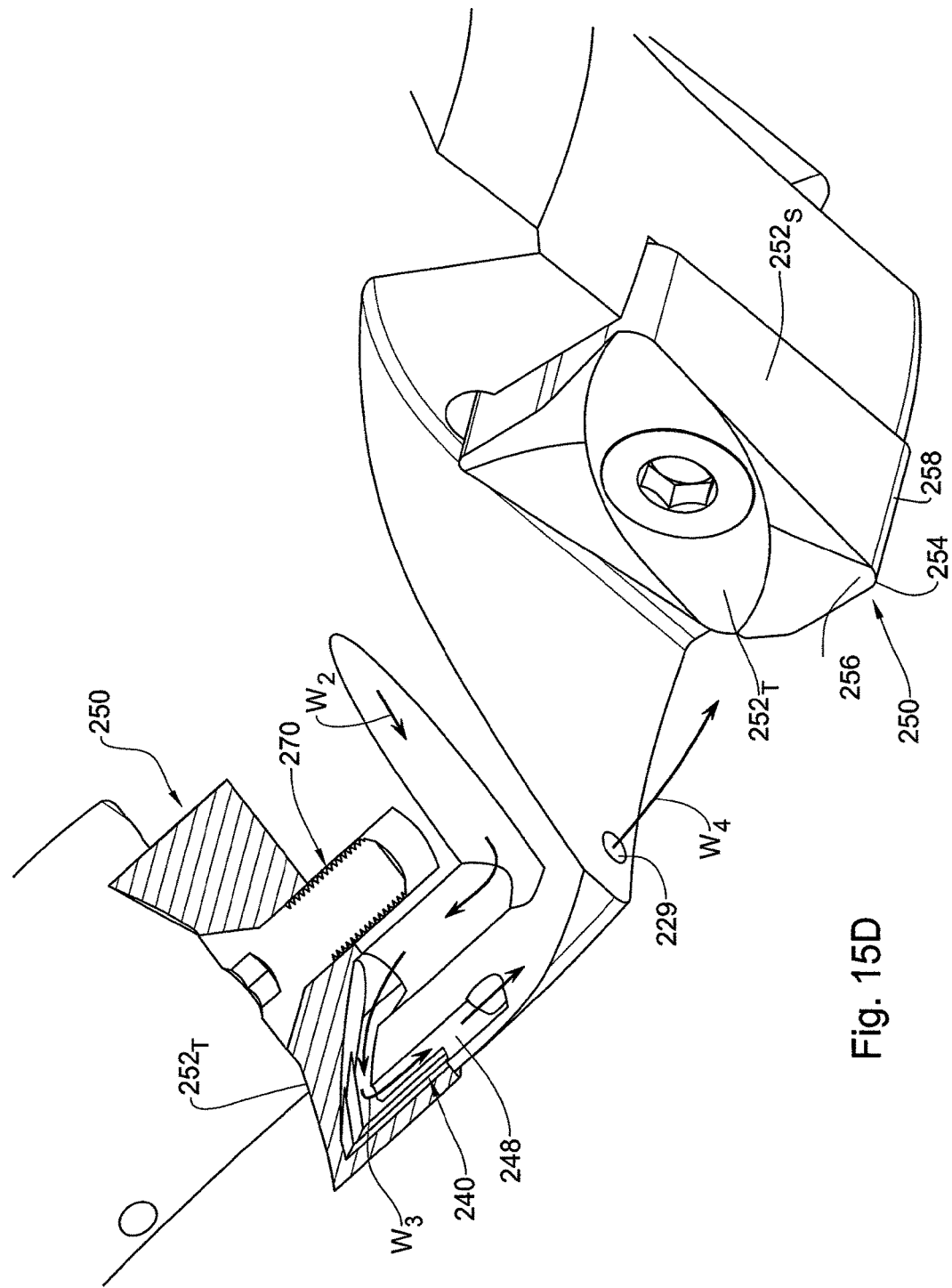
FIG. 15D is a schematic isometric section view of the milling tool shown in FIG. 15A, demonstrating the flow of cooling fluid.

Turning to FIG. 15D, when the cutting insert 250 is mounted onto the seat 220, a configuration similar to that shown in FIG. 1A is achieved. Thus, during operation, cooling fluid W passes through the tool holder 210, enters the seat 220 via the inlet 226 and is discharged into the pocket 260 of the cutting insert 250. From there, owing to the ramp 240 and slope 264, the fluid is directed to the outlet 228.

In this case, the cooling fluid is discharged from the seat 220 via a rear outlet 229. It is noted here that the outlet 229 is arranged such the discharged fluid is aimed at the cutting corner of the subsequent cutting insert 250, so it also serves as an addition to the standard external cooling. However, it is noted that the cooling fluid passing through the seat is not used for external cooling of the cutting edge of the cutting insert mounted into that seat.

Figure 16A:
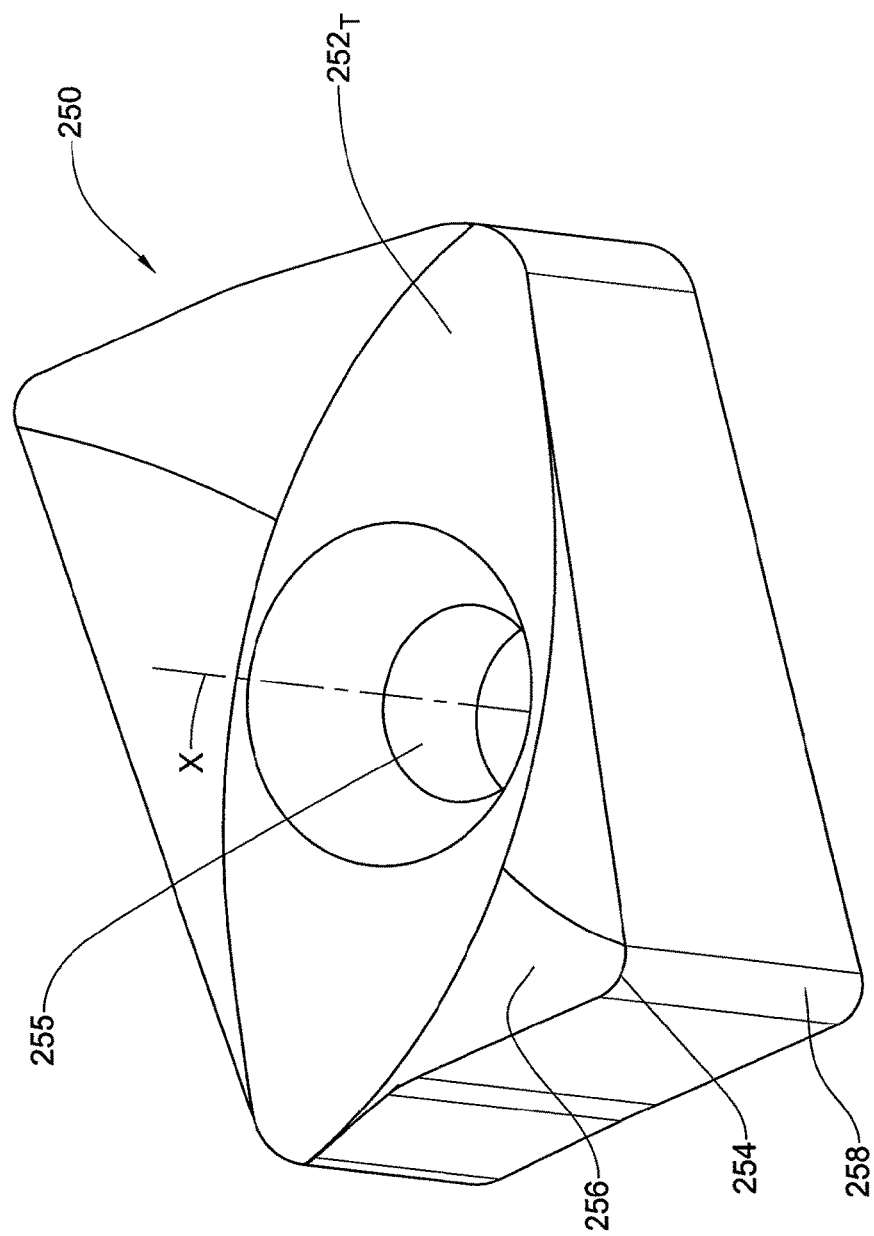
FIG. 16A is a schematic isometric view of a milling insert used in the milling tool shown in FIG. 15A.
Figure 16B:
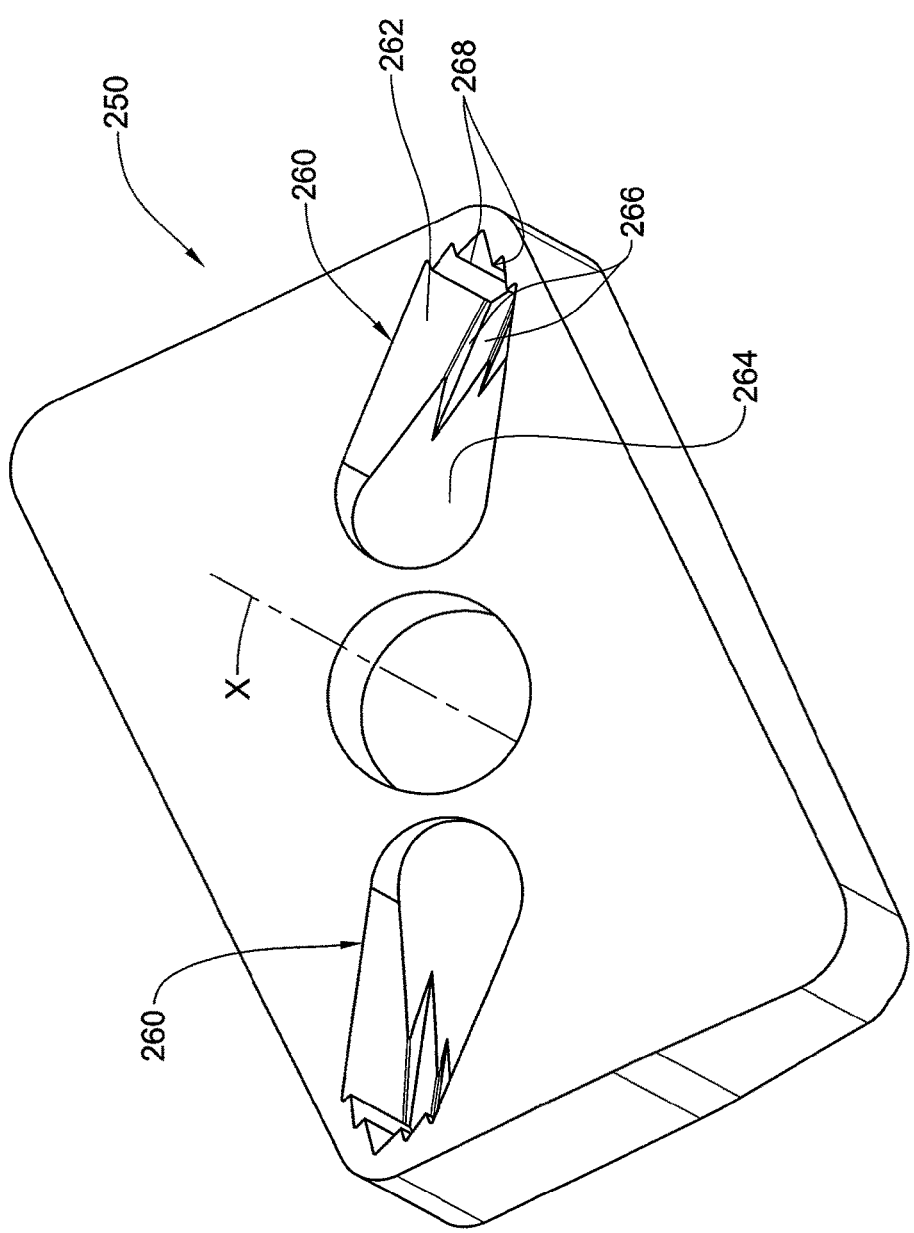
FIG. 16B is a schematic bottom isometric view of the milling insert shown in FIG. 16A.

Reference is now made to FIGS. 16Aa and 16B, in which a milling insert 250 is shown. In principle, the milling insert 250 is generally similar to the turning insert 50 previously described with the difference being it has two cutting corners and two corresponding pockets 260.

Figure 17A:
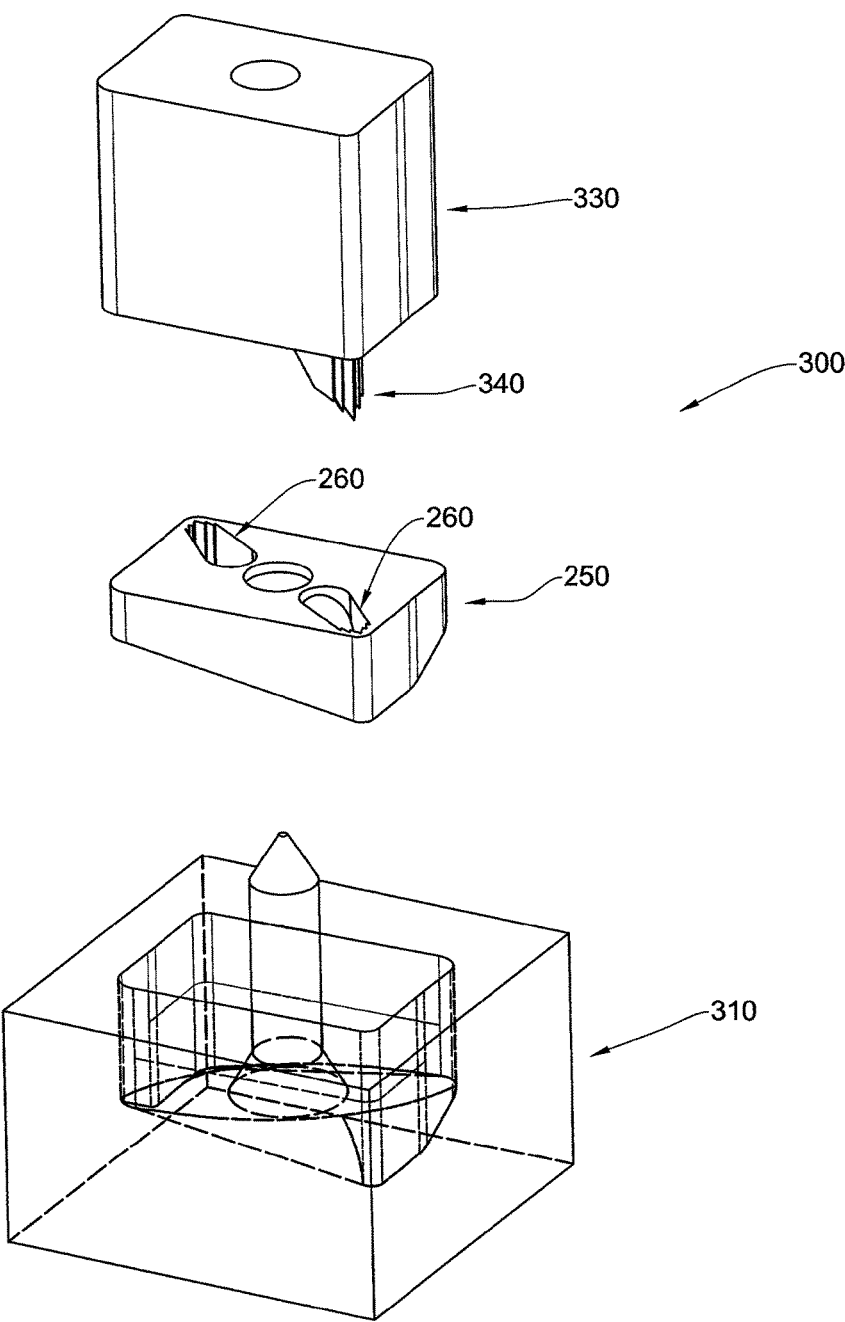
FIG. 17A is a schematic exploded isometric view of a mold for the manufacture of the milling insert shown in FIGS. 16A and 16B.
Figure 17B:
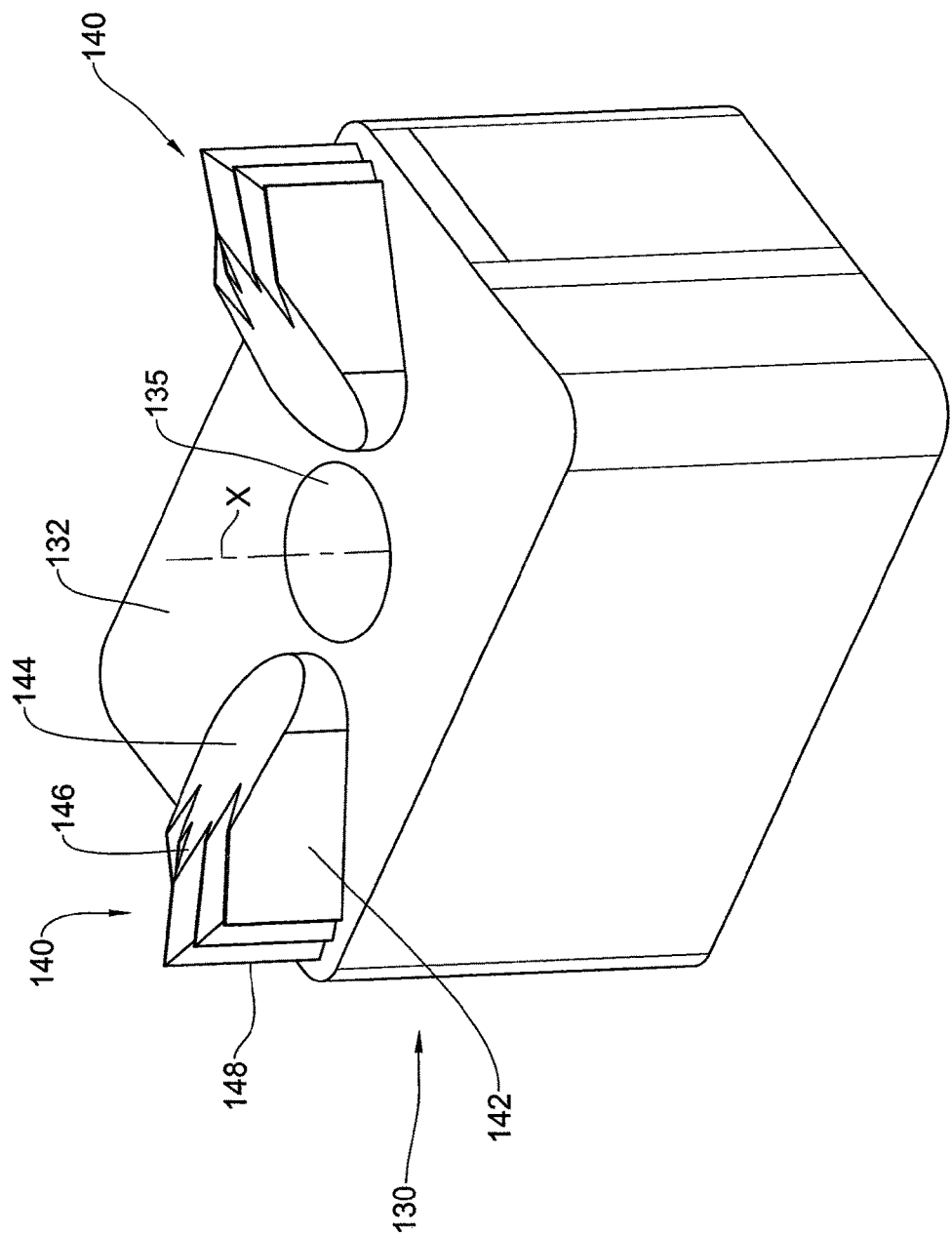
FIG. 17B is a schematic isometric view of a male part of the mold shown in FIG. 17A.

With reference to FIGS. 17A, 17B, the milling insert 250 is manufactured in a pressing process within a mold 300 comprising a male part 330 and a female part 310.

With regards to all of the above cutting inserts 50, 50', 50'', 50''' and 250—all can be manufactured in a pressing/sintering process, allowing for convenient mass production of the cutting inserts.

Attention is now drawn to FIGS. 18A to 20C, in which another example of a turning tool is shown, generally designated 401, and a mold for the manufacture of its cutting insert 450.

Figure 18A:
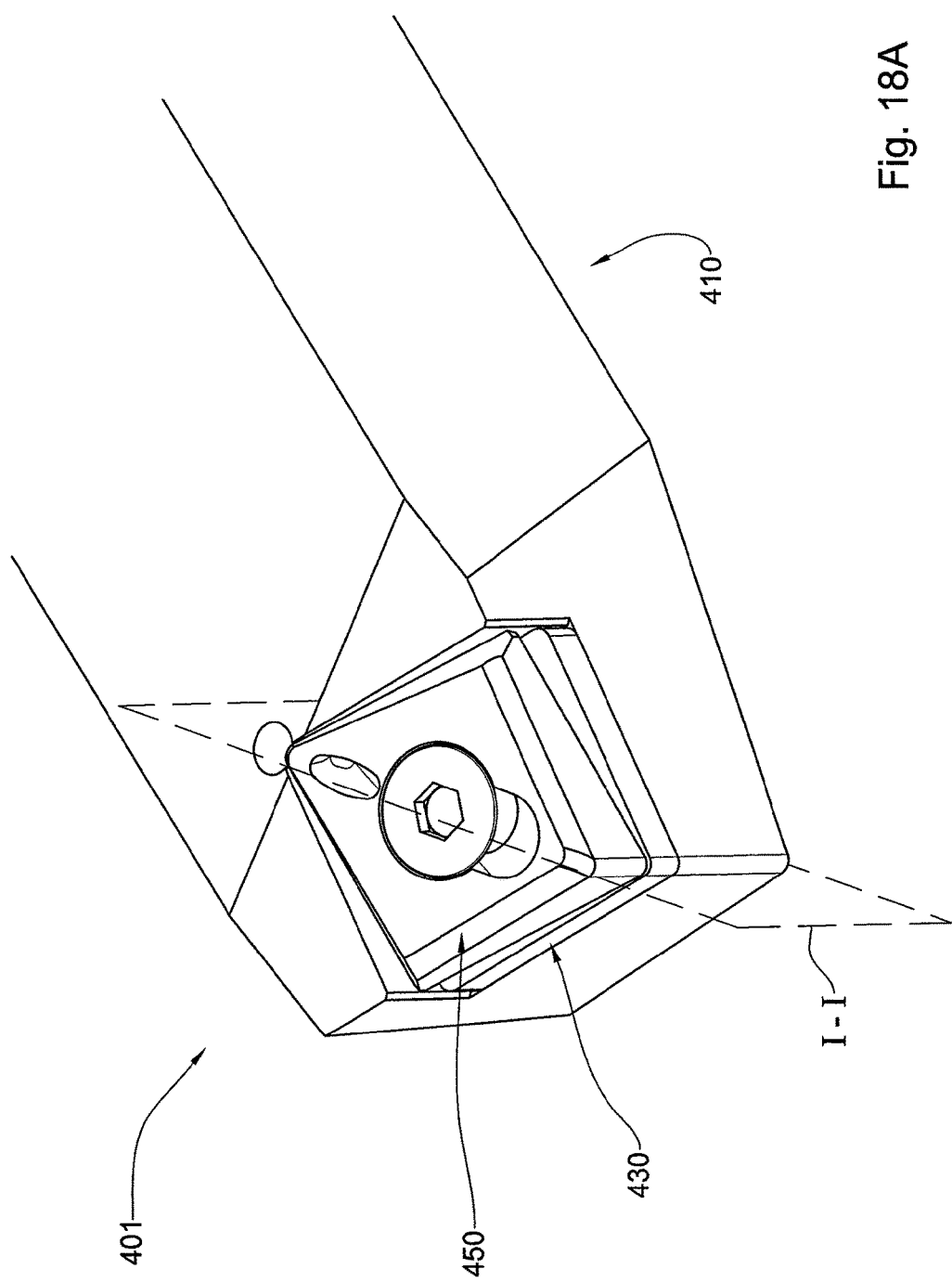
FIG. 18A is a schematic isometric view of a turning tool according to still another example of the subject matter of the present application.
Figure 18B:
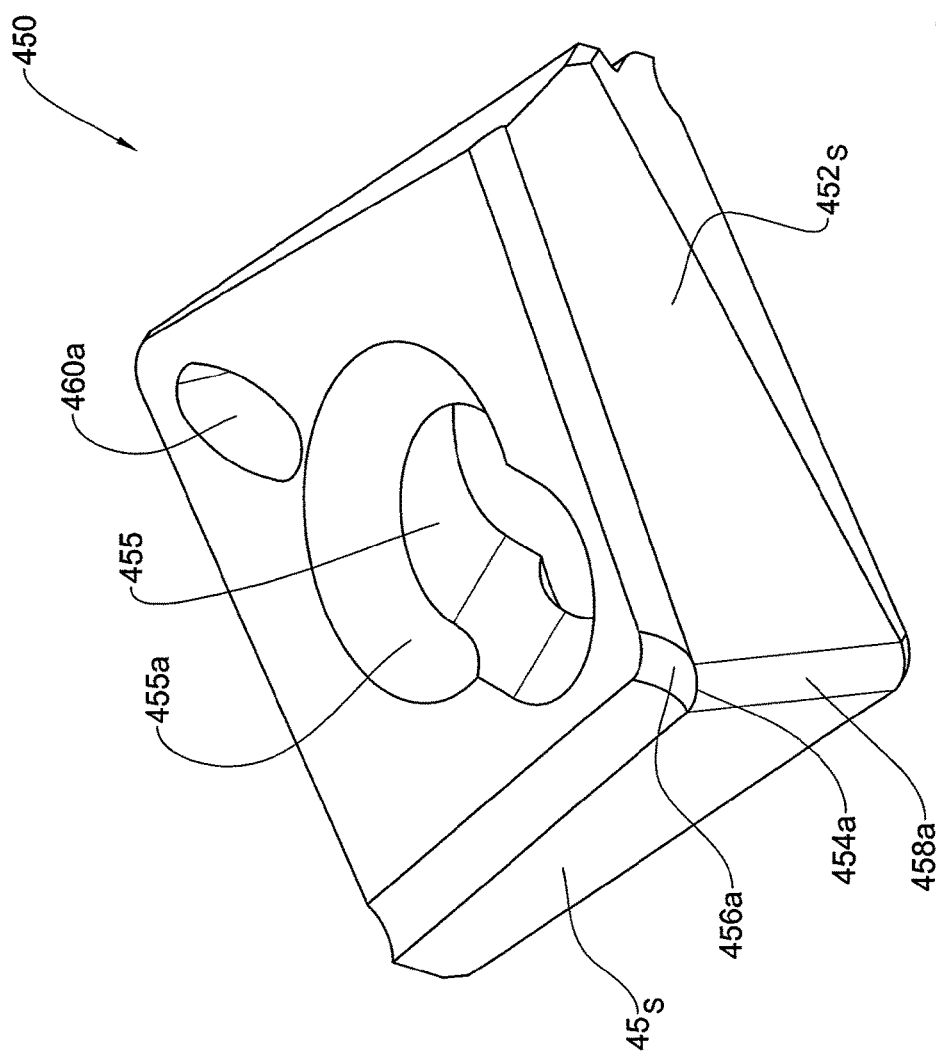
FIG. 18B is a schematic isometric view of a turning insert used in the turning tool shown in FIG. 18A.
Figure 18D:
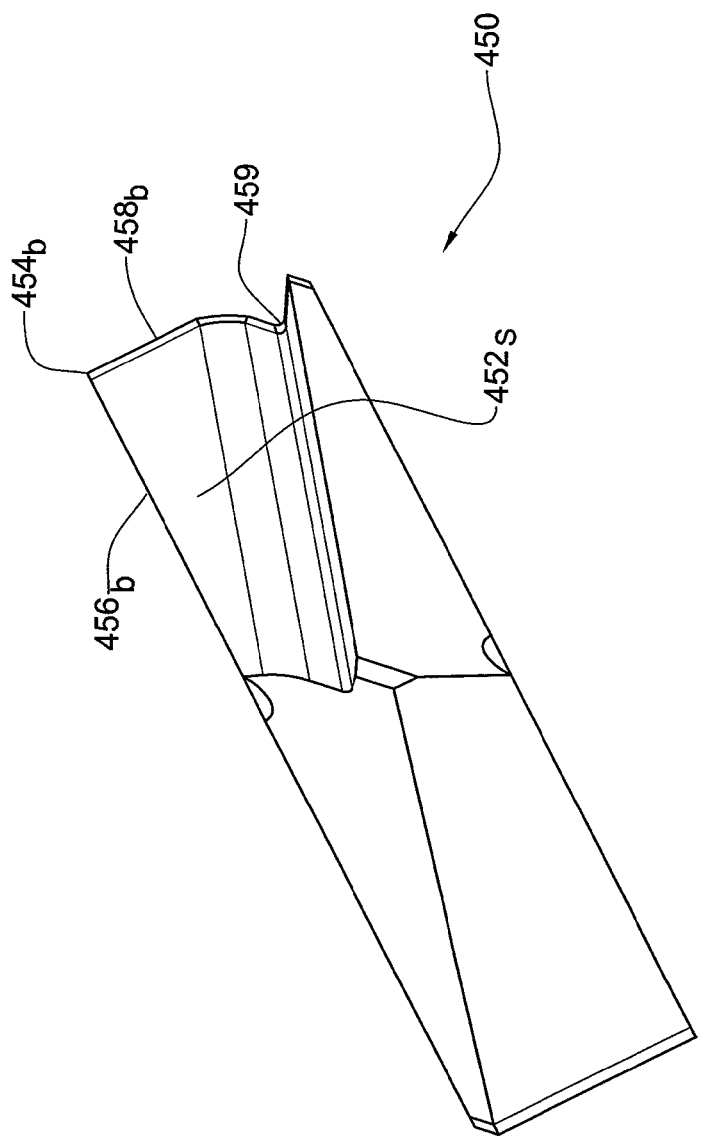
FIG. 18D is a schematic side view of the turning insert shown in FIG. 18B.

As observed specifically from FIGS. 18B and 18C, the cutting insert 450 comprises an insert bore 455 which is diagonally oriented with respect to the top and bottom faces 452T, 452B respectively.

Such an orientation of the insert bore allows forming the cooling cavities 460a, 460b, closer to the cutting edge 454, since the diagonal orientation leaves more material area to be worked with. This, in turn, allows for a more robust structure of the cutting insert, the mechanical integrity of which is not greatly deteriorated due to the forming of the cooling cavity 460a.

Figure 19:
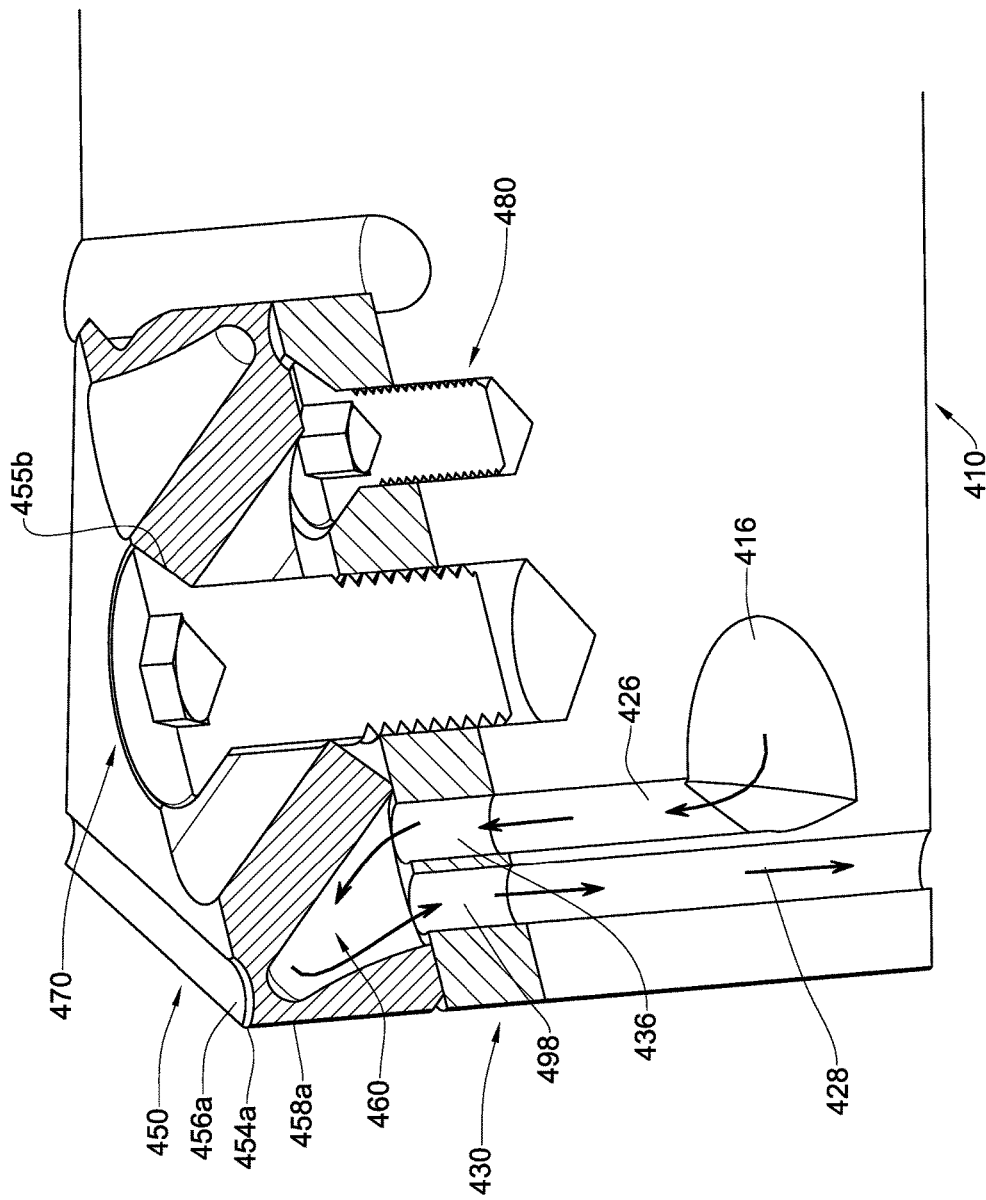
FIG. 19 is a schematic isometric section view of the turning tool shown in FIG. 18A, taken along plane I-I shown in FIG. 18A, demonstrating the flow of cooling fluid.

With reference being made to FIG. 19, showing a cross-section of the turning tool 401, it is observed that the cooling cavity 460 is of conical shape, allowing to concentrate the flow of cooling fluid towards the back side of the cutting edge 454a (the flow being designated by arrows 428).

Figure 20A:
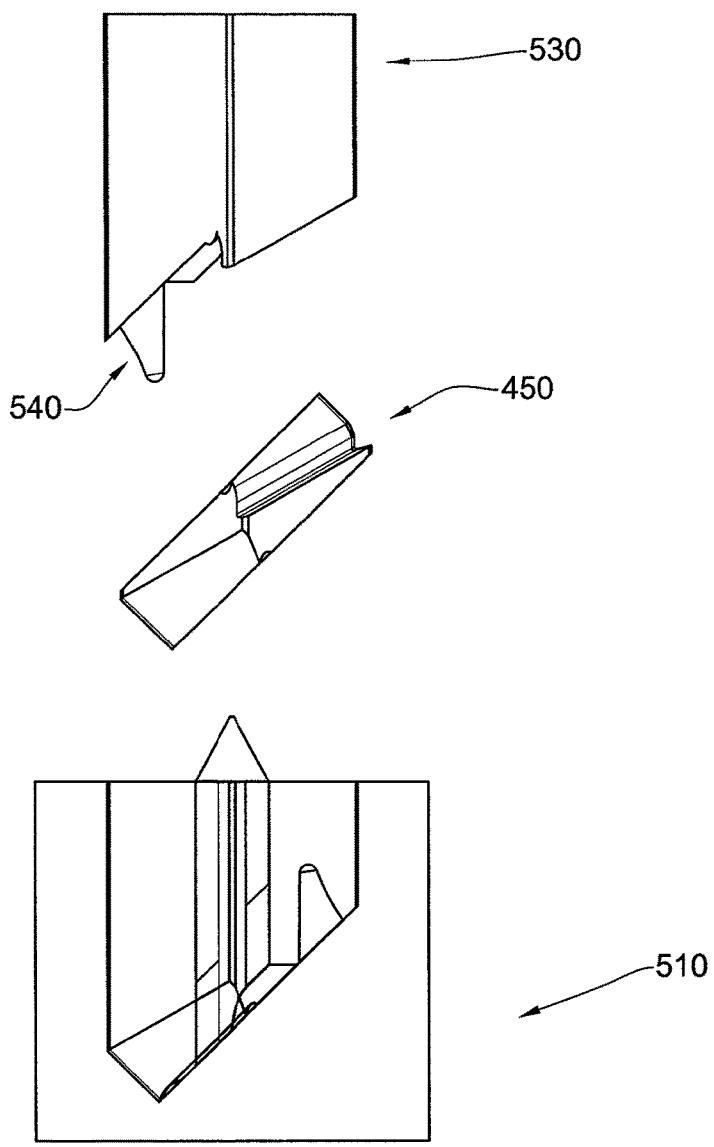
FIG. 20A is a schematic exploded isometric view of a mold for the manufacture of the turning insert shown in FIGS. 18B and 18C.
Figure 20B:
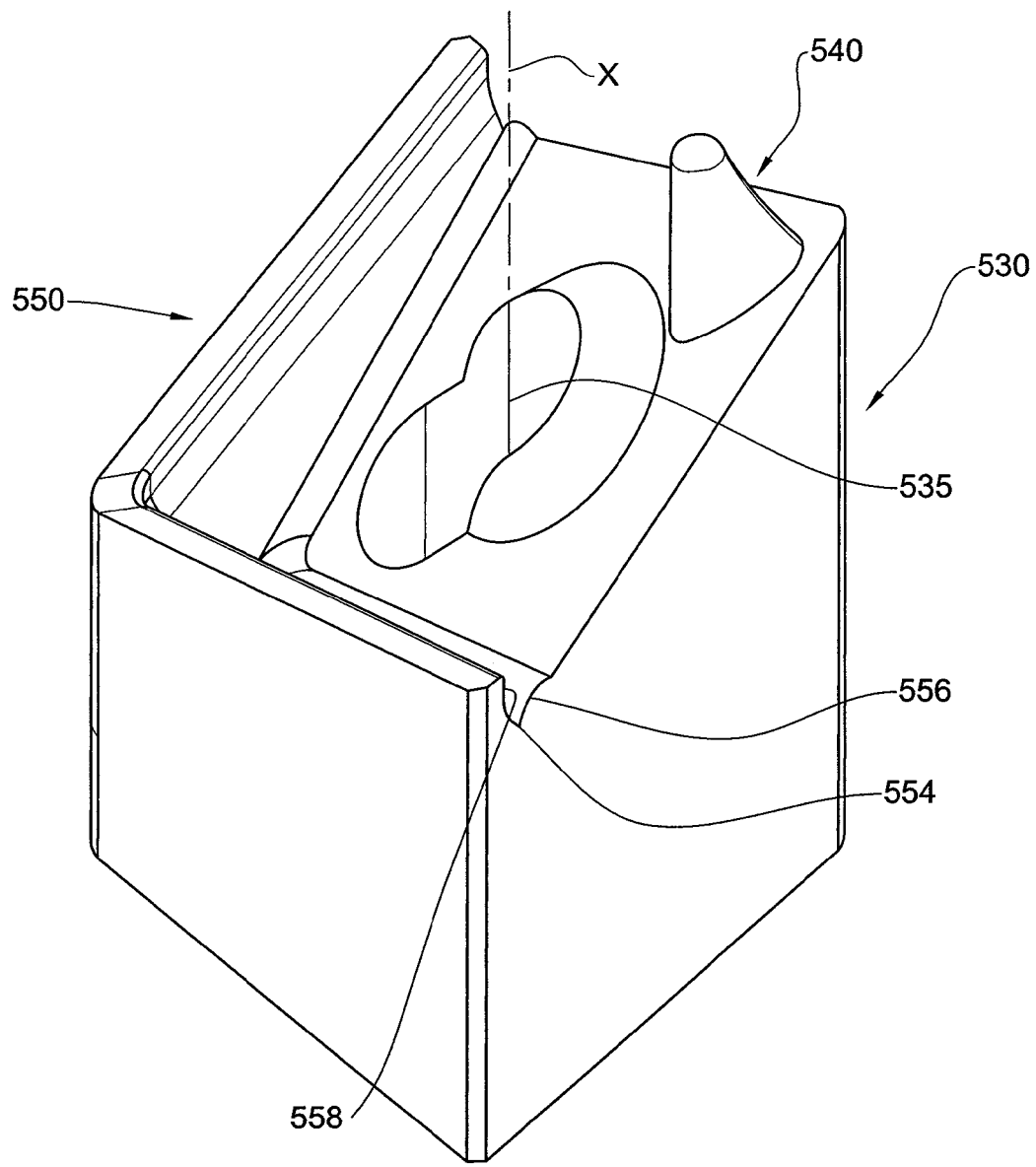
FIG. 20B is a schematic isometric view of a male part of the mold shown in FIG. 20A.
Figure 20C:
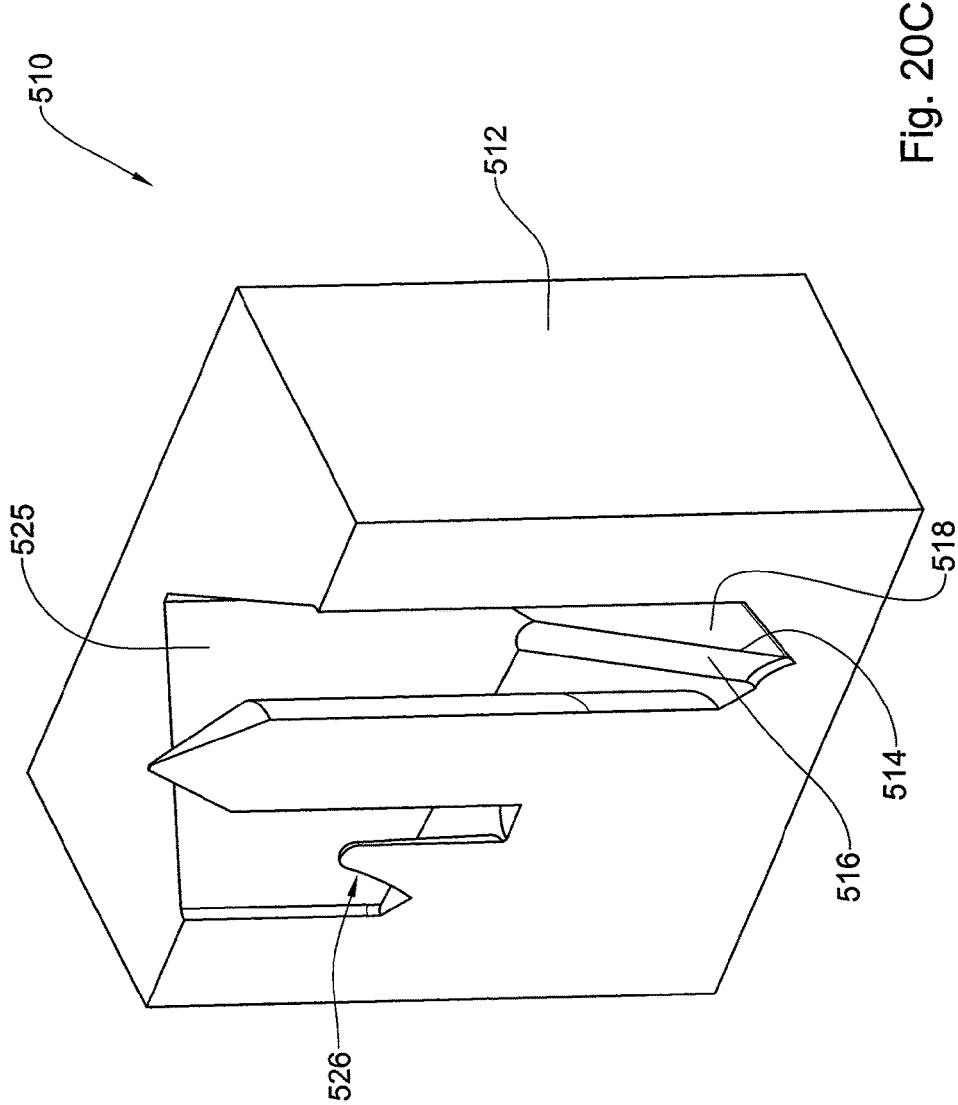
FIG. 20C is a schematic section view of a female part of the mold shown in FIG. 20A.
Figure 21A:
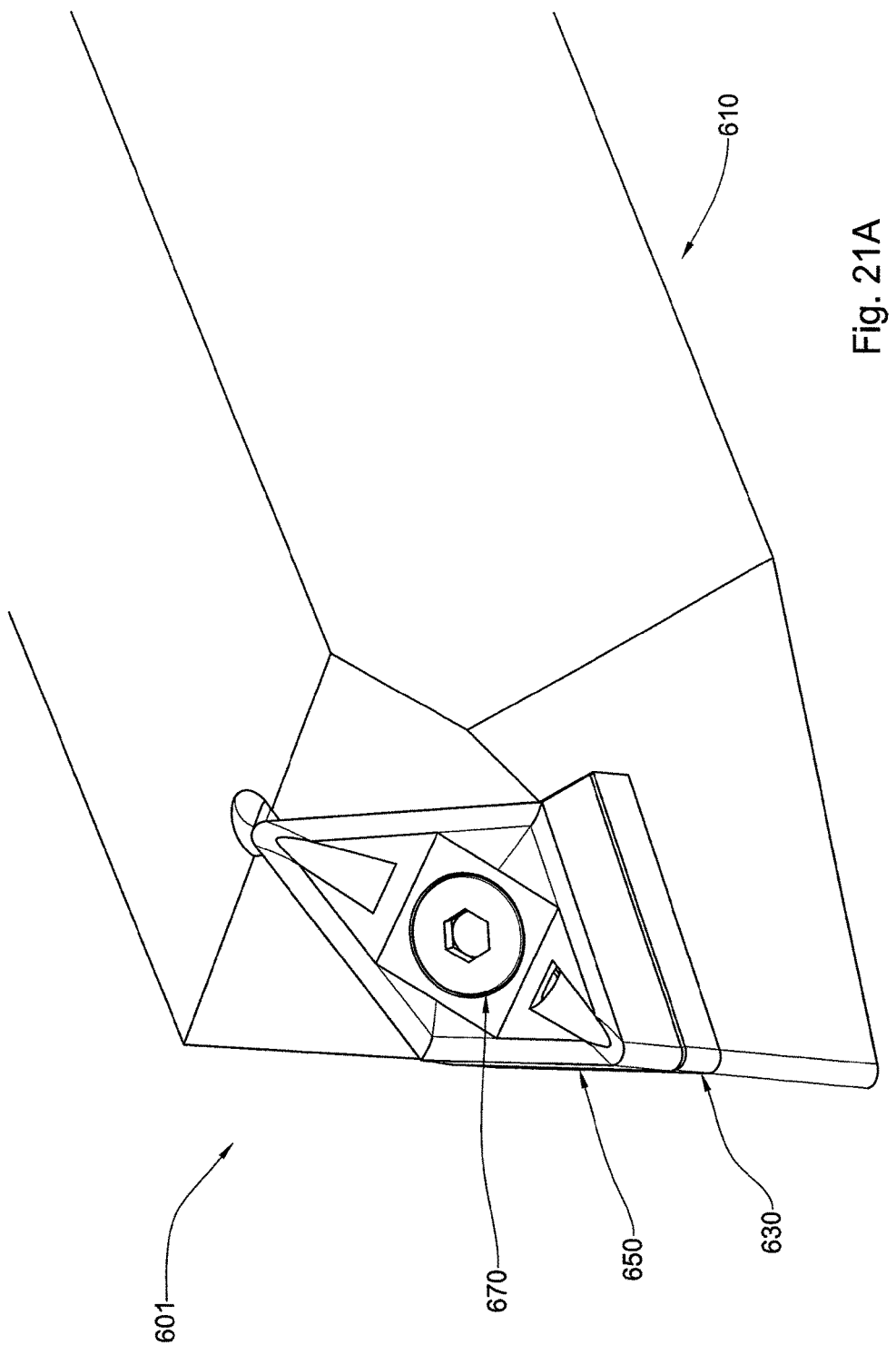
FIG. 21A is a schematic isometric view of a turning tool according to still another example of the subject matter of the present application.
Figure 21B:
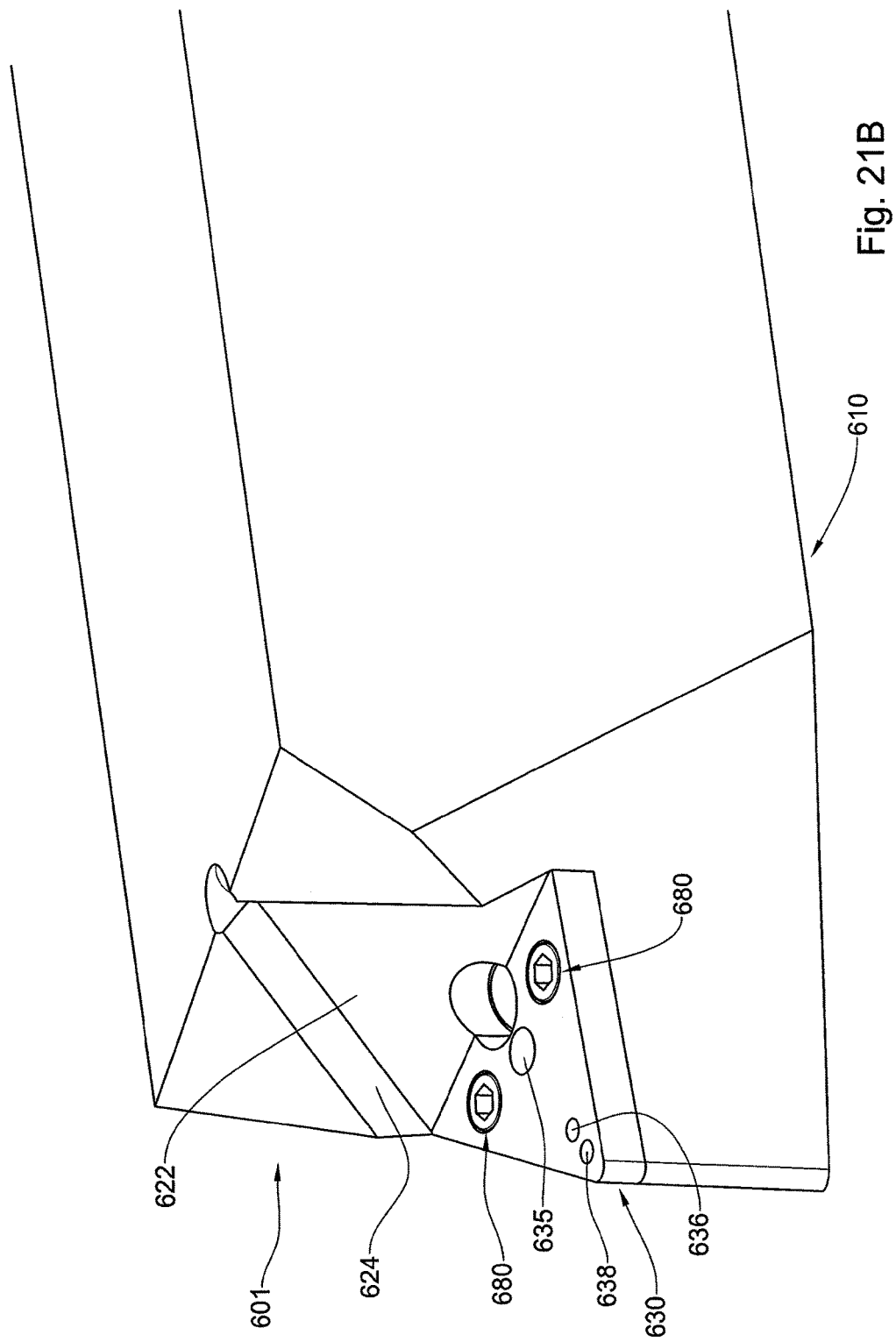
FIG. 21B is a schematic isometric view of the turning tool shown in FIG. 21A, with a turning insert thereof being removed.

Turning now to FIGS. 20A to 20C, a mold 501 for the manufacture of the cutting insert 450 is shown, comprising a male member 530 and a female member 510 having a cavity for receiving therein the male member 530.

It is observed that the cutting insert 450 produced by the mold 501 is oriented at a 45° angle with respect to the longitudinal axis of the mold (the axis along which the members 510, 530 displaced when pressing). As a result, the cooling cavities 460, which are formed generally along the longitudinal axis, are eventually angled to the cutting edge 454 of the cutting insert 450 and the desired angle.

It is important to note that while the pressing is performed along a pressing axis which extends generally along the longitudinal direction of the male and female member, the operative surfaces of the latter, the ones used to form the top and bottom surfaces of the cutting insert are angled at 45° to the pressing axis, allowing the forming of the cavity at the desired angle.

It is also observed that the female member 530 comprises a side ledge 550 configured for forming the cutting edge of the cutting insert at a location other than the split line at which the male and female members meet during press molding. This yields a side channel 459 formed along two sides of the cutting insert 450.

Turning now to FIGS. 21A to 22D, there is provided another example of a cutting tool designated 601, and comprising a cutting insert 650 mounted on a tool holder 610. Similar to the previous example, the cutting insert 650 is formed with two opposite cutting edges 654, each comprising a cooling cavity angled to the top surface at 45°.

Similar elements have been designated with similar reference numbers, with the addition of 600 (i.e. cutting insert 650 uses a similar reference number as cutting insert 450, both having cutting edge 454, 654 etc.)

However, contrary to the previous example, the cutting insert 650 comprises two portions which are angled to one another at 135°, yielding that the cooling cavities 660 are generally parallel to one another.

This provides a very important advantage with respect to the pressing process. In particular, contrary to the previous example which required forming the cutting insert at an orientation angled to the pressing axis, in this example, the cutting insert can be formed symmetrically with the pressing axis as the projections forming the cooling cavities extend generally along the pressing axis.

Figure 22A:
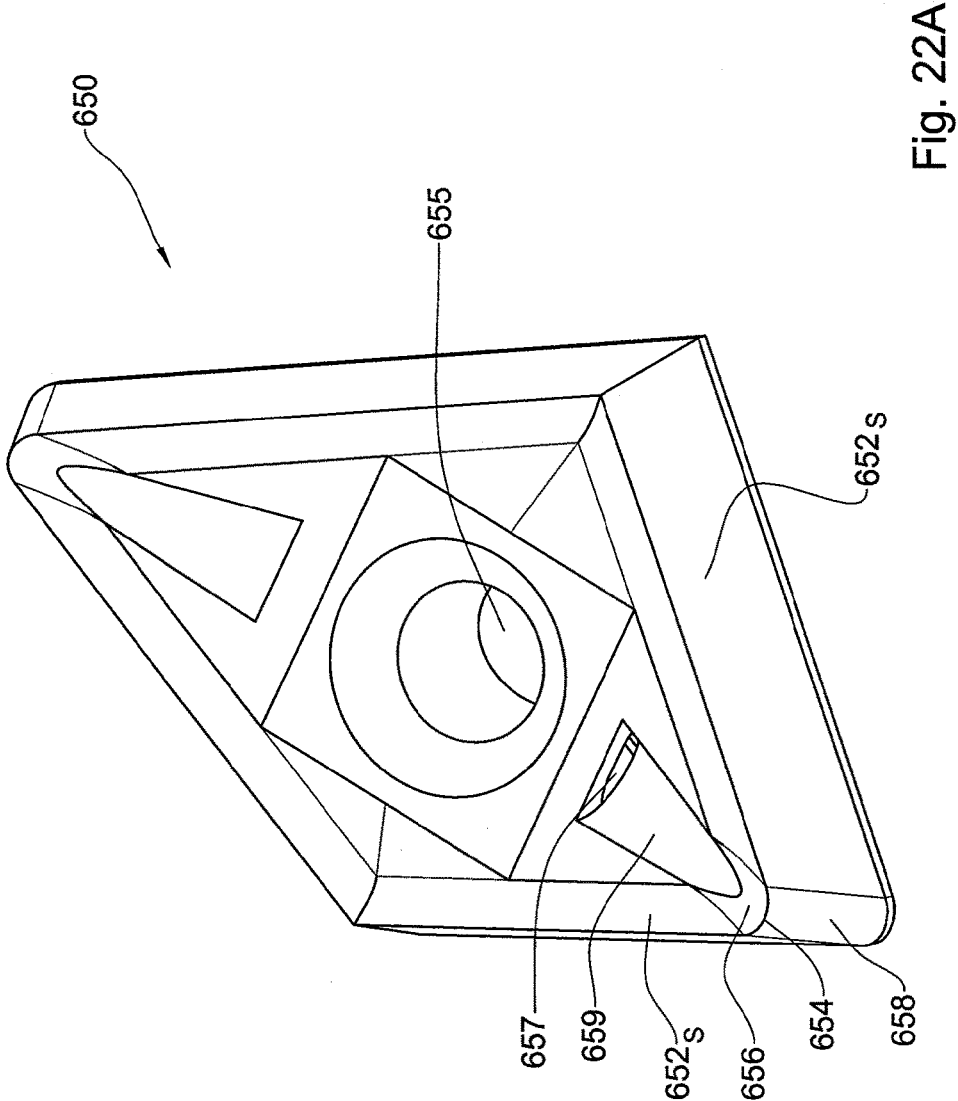
FIG. 22A is a schematic isometric view of a turning insert used in the turning tool shown in FIG. 21A.
Figure 22B:
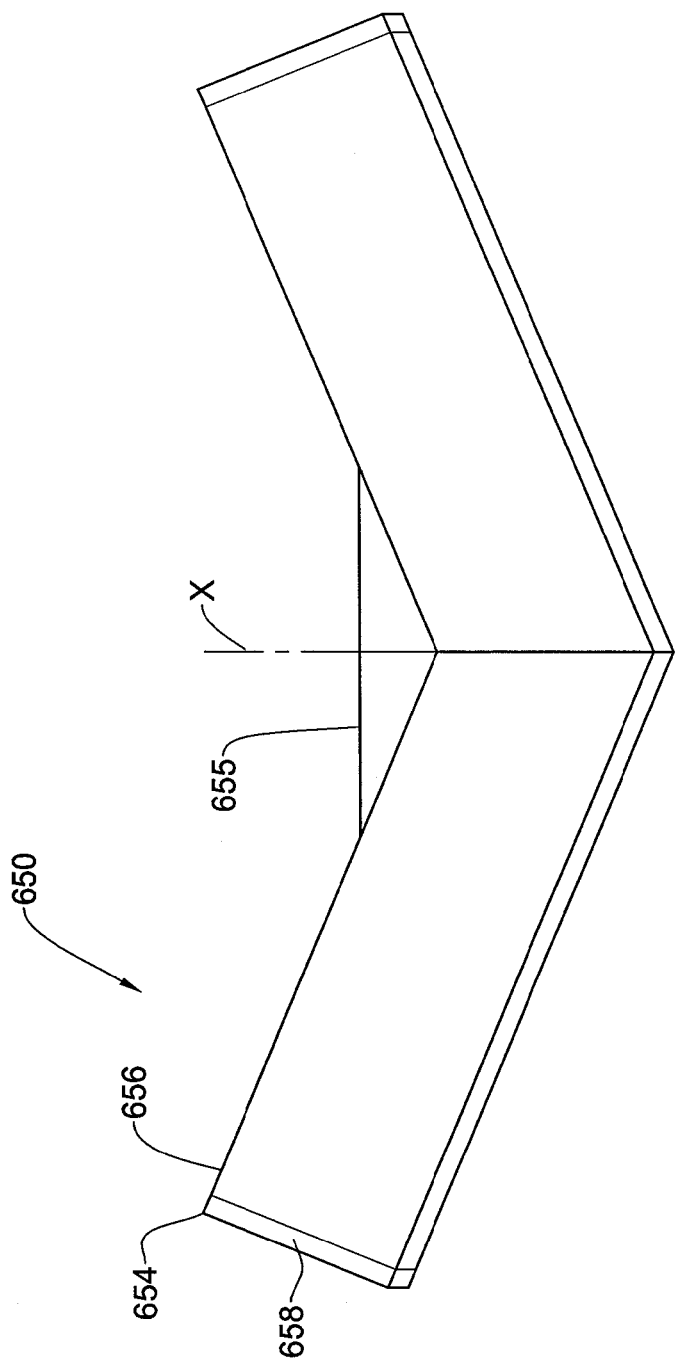
FIG. 22B is a schematic side view of a turning insert used in the turning tool shown in FIG. 21A.
Figure 22C:
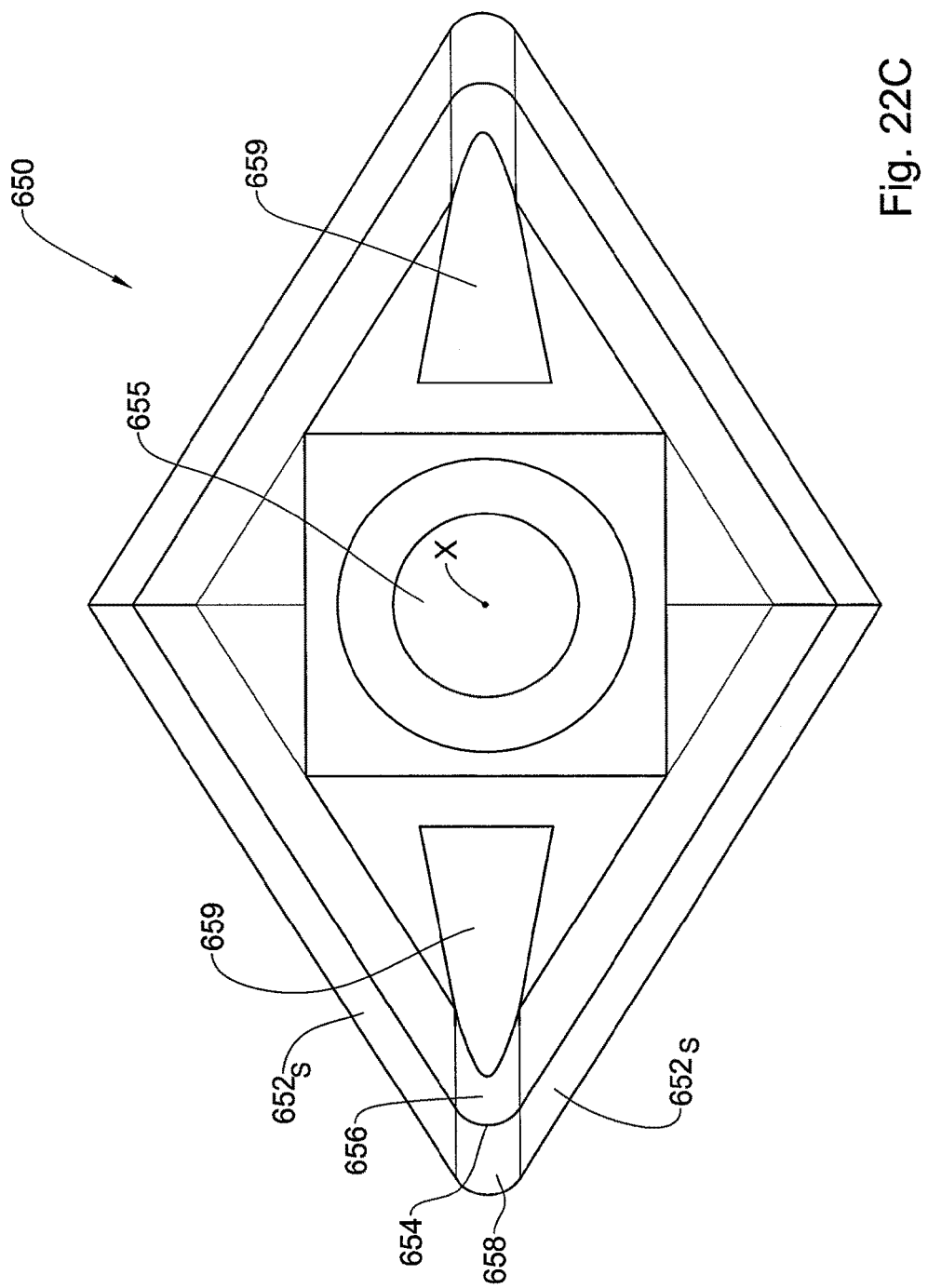
FIG. 22C is a schematic top view of a turning insert used in the turning tool shown in FIG. 21A.

The above yields an angled configuration of the cutting insert itself 650, in this particular example, each portion of the cutting insert is of a triangular shape, the portioned being angled to one another, as shown in FIG. 22B.

Figure 23:
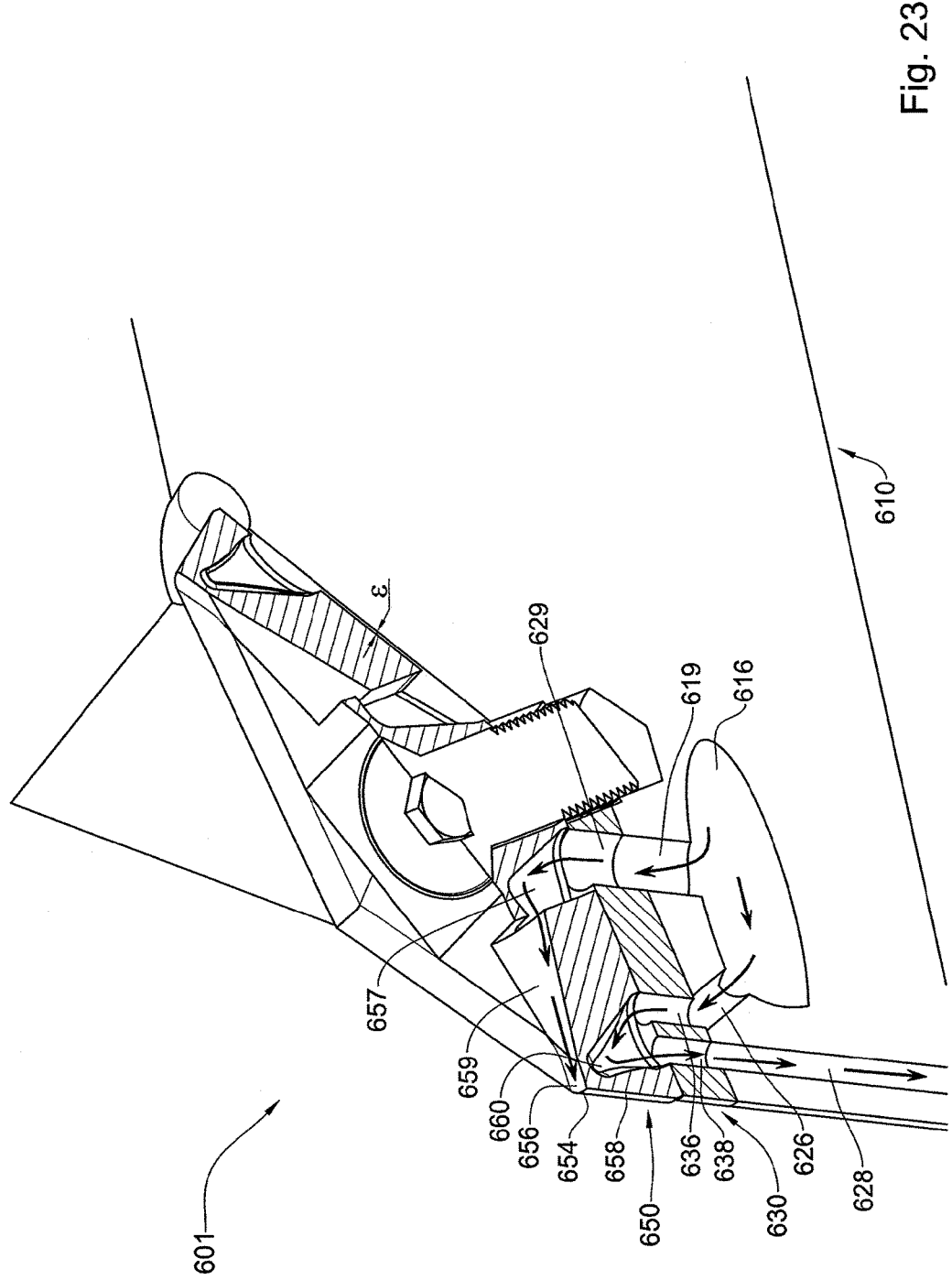
FIG. 23 is a schematic isometric longitudinal section view of the turning tool shown in FIG. 21A.
Figure 24A:
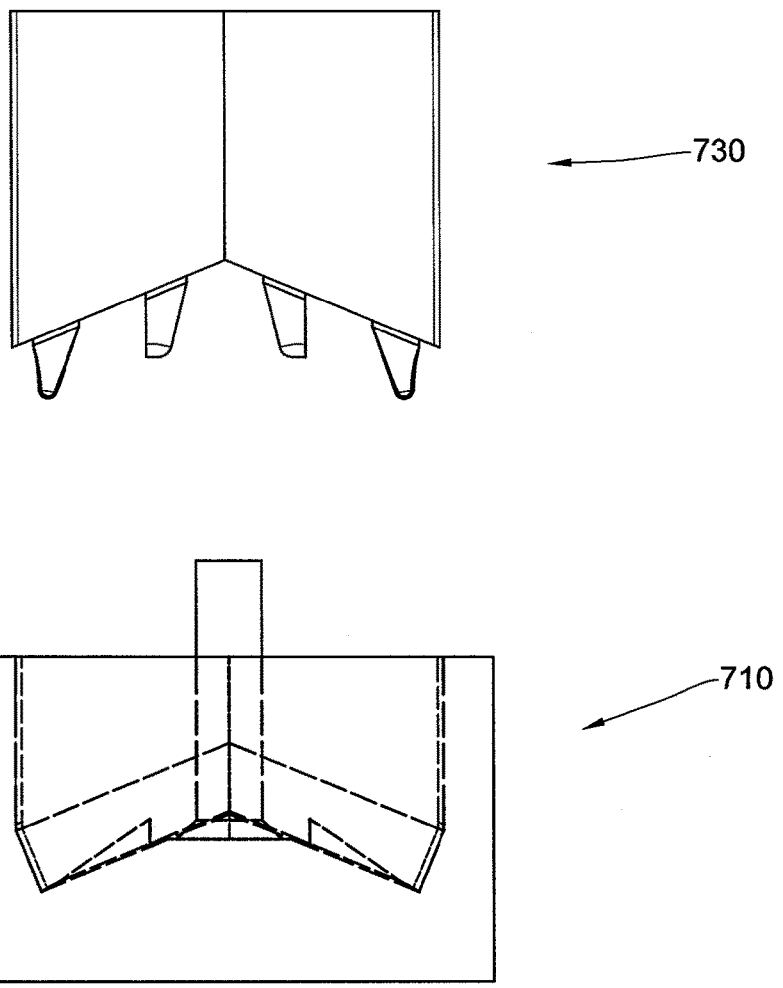
FIG. 24A is a schematic exploded isometric view of a mold for the manufacture of the turning insert shown in FIGS. 22A-22D.
Figure 24B:
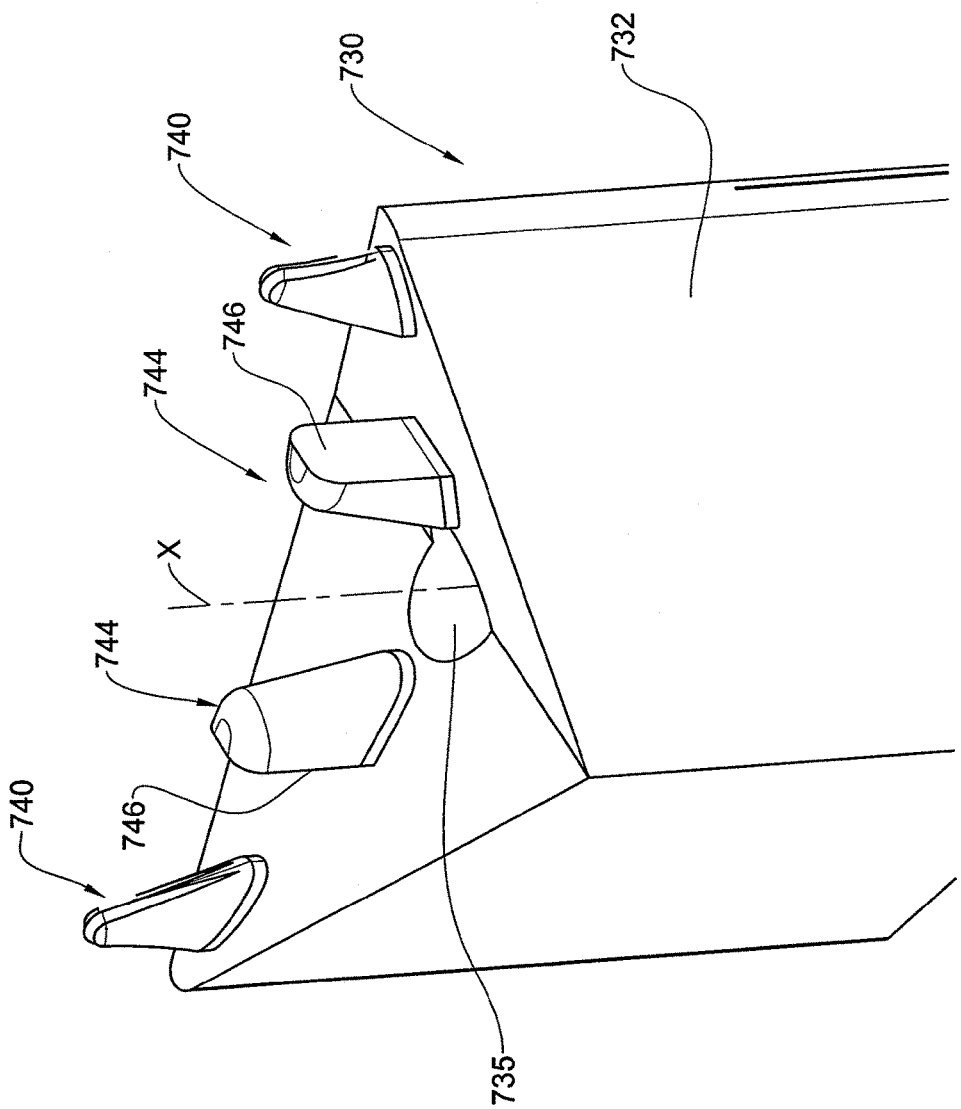
FIG. 24B is a schematic isometric enlarged view of a male part of the mold shown in FIG. 24A.
Figure 24C:
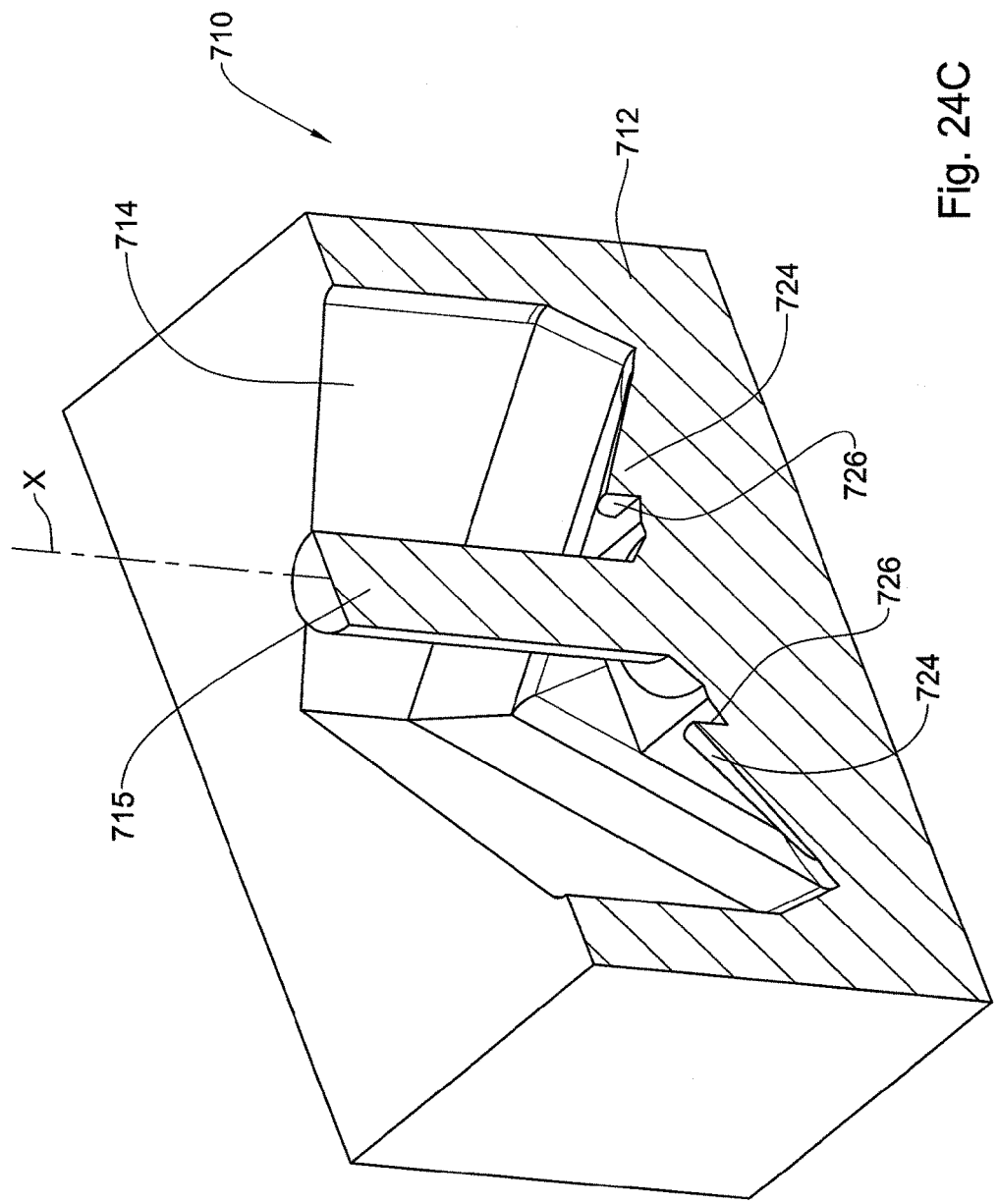
FIG. 24C is a schematic section view of a female part of the mold shown in FIG. 24A.

In addition, with particular reference being made to FIG. 23, it is noted that the cutting insert, when mounted onto the cutting tool holder 610, is supported by three different surface—a base surface provided by an intermediary plate 630 and two side surfaces of the cutting tool holder 624. It is noted that the bottom surface of the other portion of the cutting insert 650, does not come into contact with a base surface of the holder 630, as shown by the gap E.

Reverting back to FIGS. 22A to 22D, the cutting insert 650 is shown to have an additional flow outlet 657 at the top surface of the cutting insert, and is provided with a flow channel 659 configured for directing the flow of the cooling fluid towards the cutting edge. It is also noted that the outlet 657 is located below the top surface 652T of the cutting insert.

The flow channel 659 merges with the chip breaking channel 656 of the cutting insert, allowing fluid flow to reach very close to the cutting edge and, at the same time, lift chips removed from the workpiece during a cutting operation.

Attention is now drawn to FIGS. 25A to 27, in which another example of a turning tool is shown, generally designated 601', which is generally similar to the previously described cutting tool 601. Similar elements have been designated with similar reference numbers, with the addition of a prime (i.e. cutting insert 650 uses a similar reference number as cutting insert 650', both having cutting edge 654, 654' etc.).

Figure 25C:
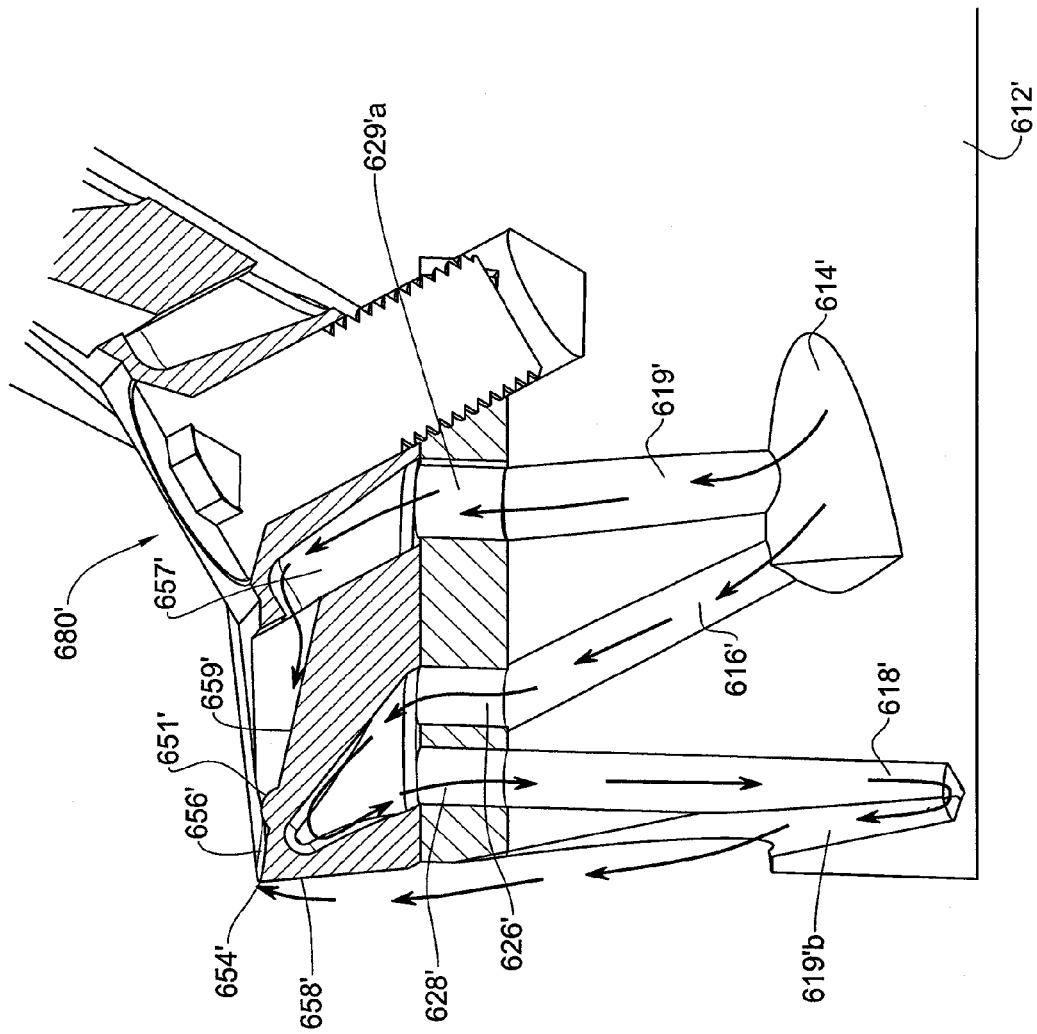
FIG. 25C is a schematic isometric longitudinal section view of the turning tool shown in FIG. 25A, demonstrating the flow of cooling fluid.
Figure 25D:
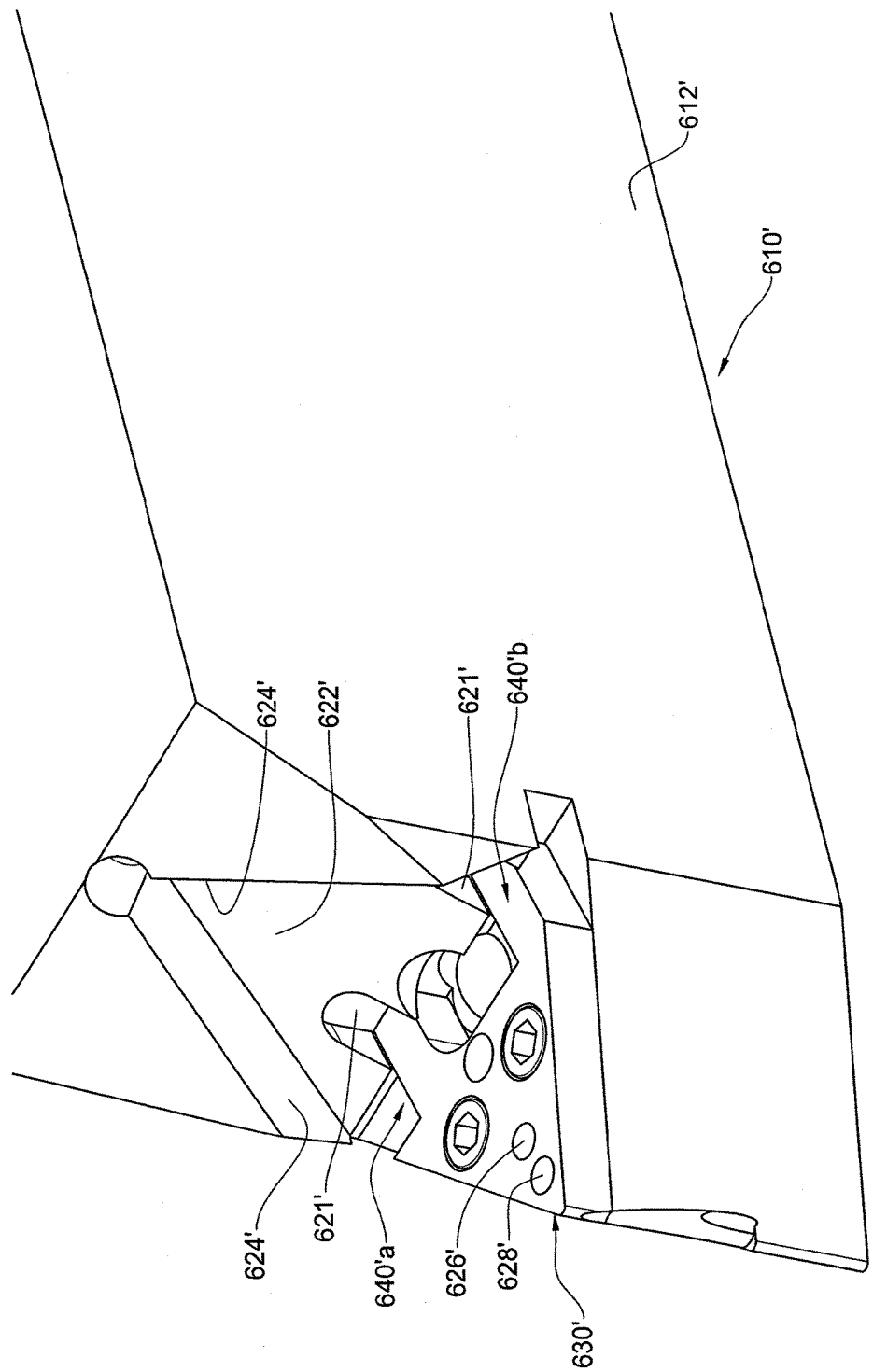
FIG. 25D is a schematic isometric view of the turning tool shown in FIG. 25A, with a turning insert thereof being removed.
Figure 25E:
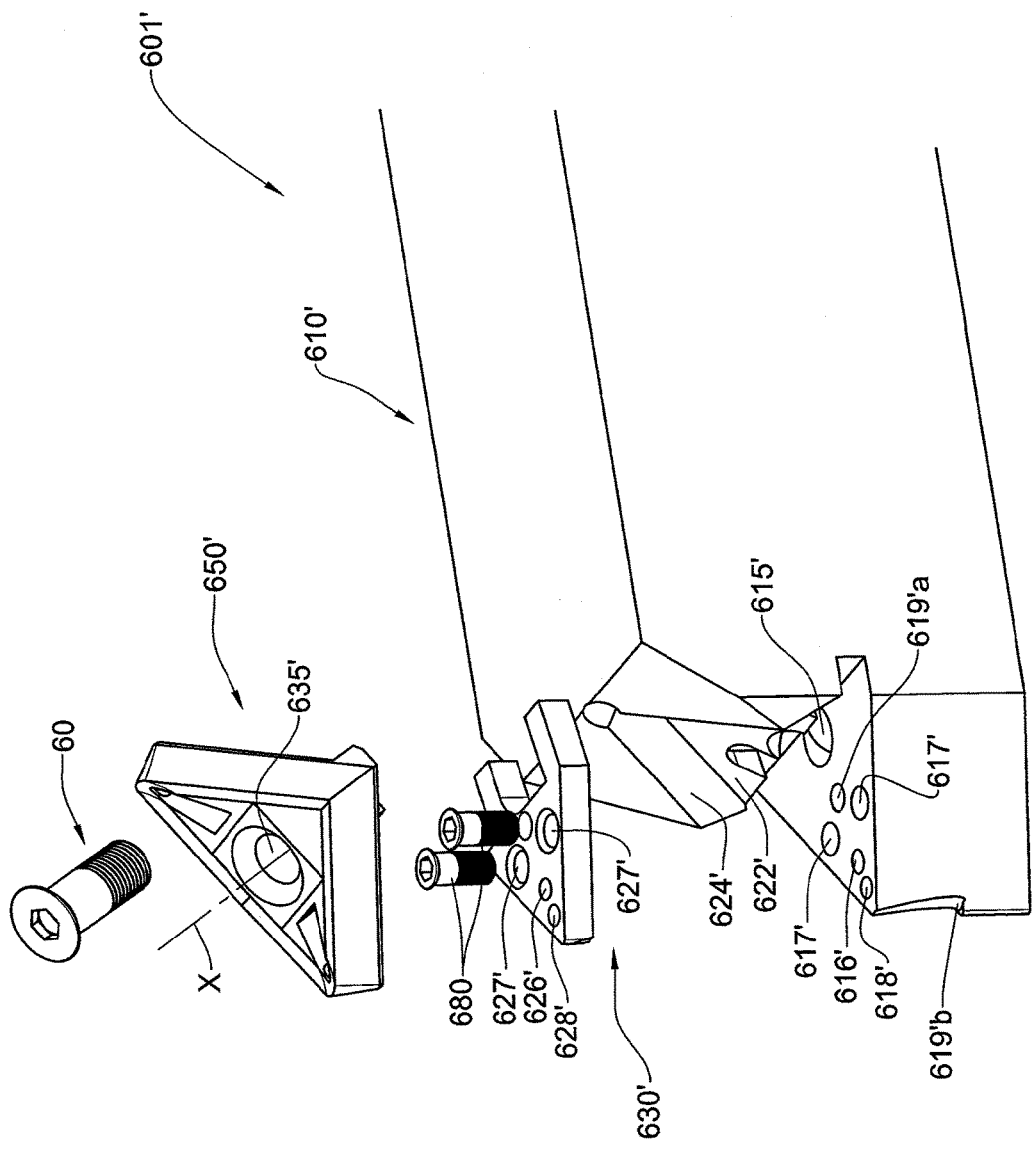
FIG. 25E is a schematic exploded isometric view of the turning tool shown in FIG. 25A.
Figure 26B:
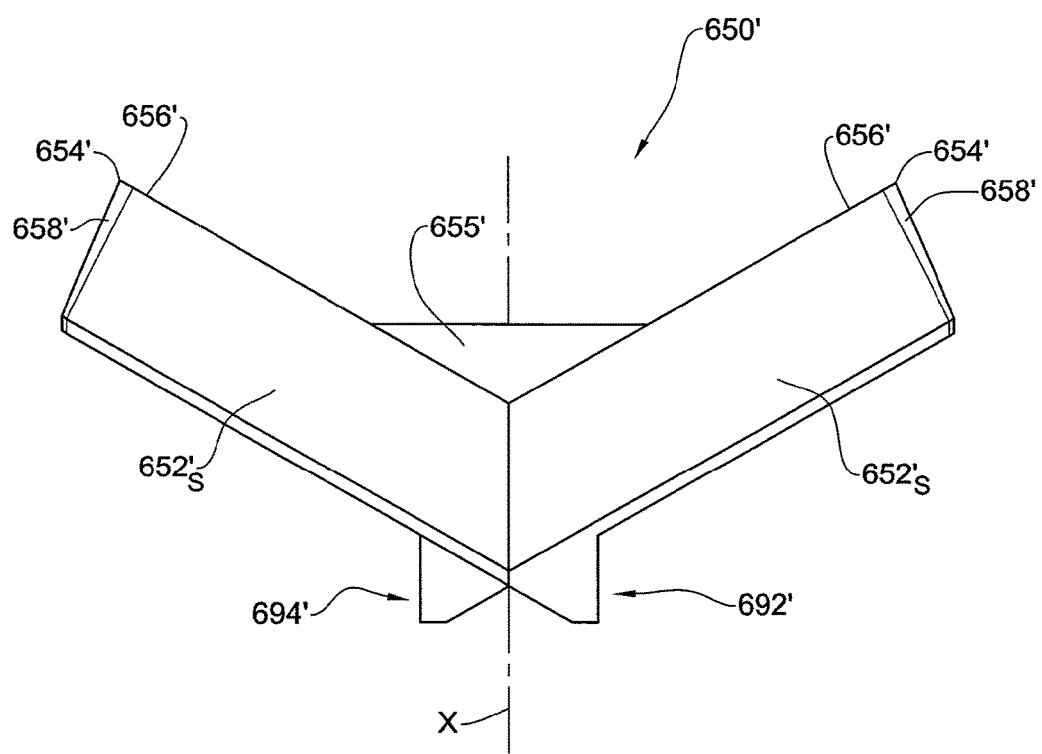
FIG. 26B is a schematic side view of a turning insert used in the turning tool shown in FIG. 25A.

The main differences between the turning tool 601' and 601 are as follows:

First of all, the holder 610' is designed with an additional flow channel 618' and 619' (FIG. 25C) which is configured for recycling cooling fluid used previously for cooling the cutting edge 654' back to the holder so that it is ejected therefrom to impinge on the relief surface of the cutting insert 650' as shown in FIG. 25C.

Secondly, the flow channel 659' is provided with a blocker 651' which is configured for preventing chips removed from the workpiece by the cutting edge 654' from flowing towards the outlet 657' and blocking it. On the other hand, the blocker 651' has a stream-line design configured for minimally obstructing cooling fluid emitted from the outlet 657' towards the cutting edge 654' (see FIG. 27).

Contrary to the previously described example 601, the cutting insert 650' further comprises supports 690 in the form of triangular projections 692' and 694', configured for being received with the holder 610'. The arrangement of the supports 692', 694' is such that allows the cutting insert 650' more surface contact with the holder 610' (compared to the example 601).

Since the bottom surface of the other portion of the cutting insert (the one that, at a given moment, does not perform a cutting operation) is not mated against a base surface of the holder, the supports 692', 694' allow preventing a see-saw motion of the cutting insert which could lead to disengagement of between the bottom surface 652B' of the operational cutting portion and the plate 630'.

Figure 28:
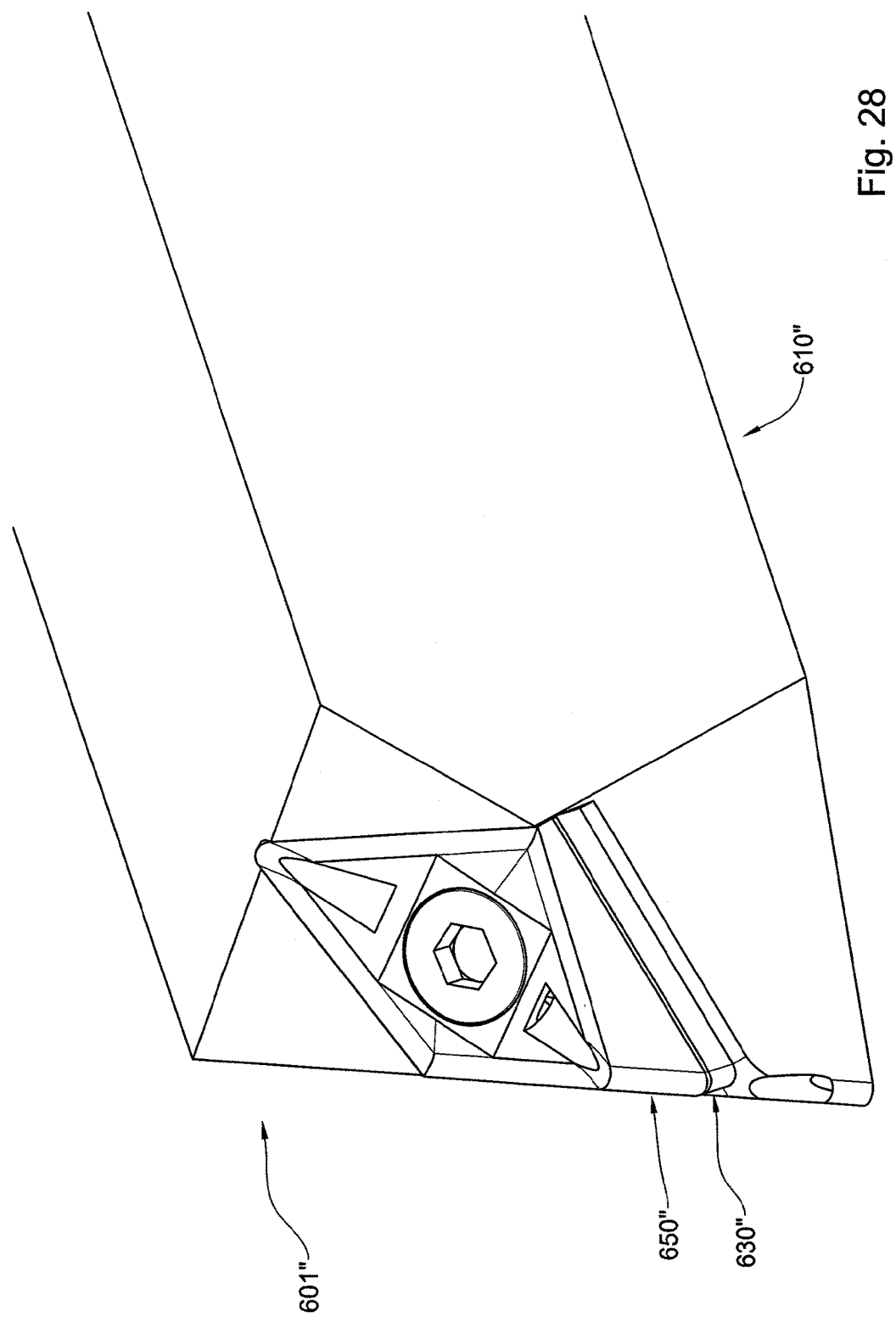
FIG. 28 is a schematic isometric view of a turning tool according to still another example of the subject matter of the present application.
Figure 29A:
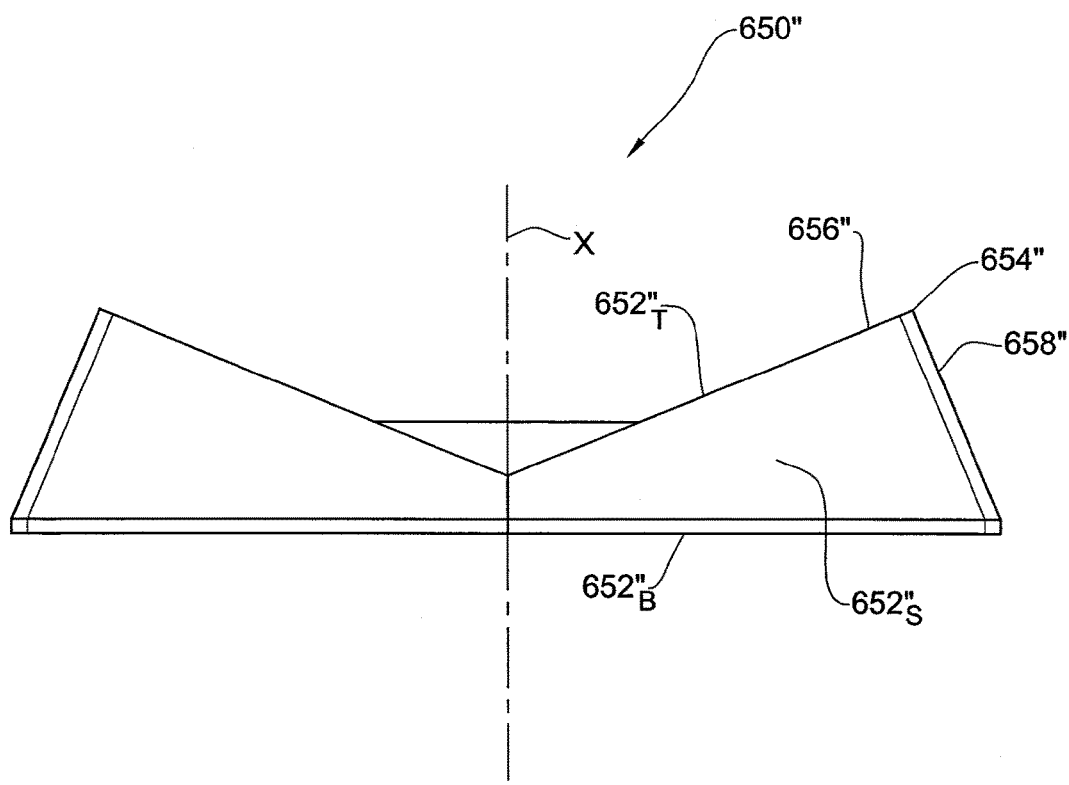
FIG. 29A is a schematic side view of a turning insert used in the turning tool shown in FIG. 28.
Figure 29B:
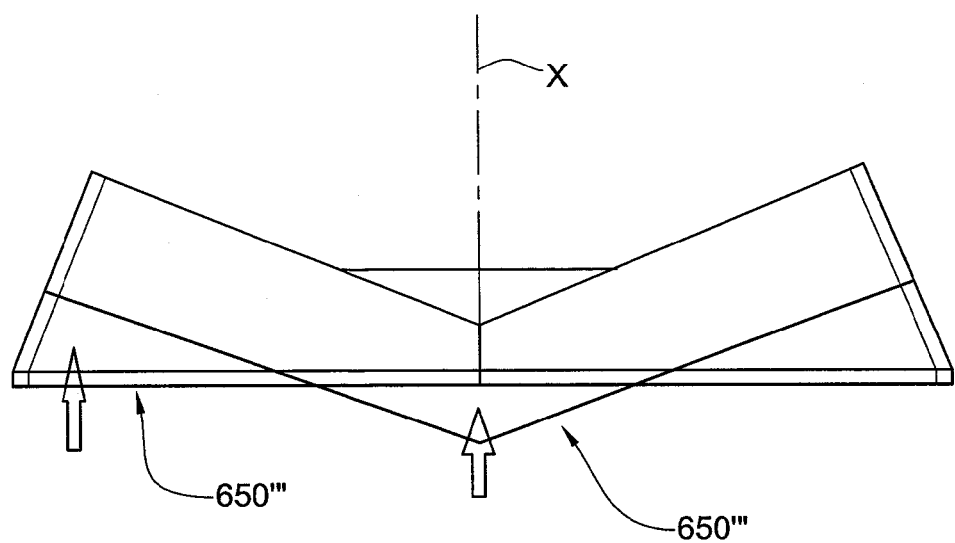
FIG. 29B is a schematic side view of a turning insert, demonstrating the differences between the turning insert shown in FIGS. 26B and 29A.
Figure 30B:
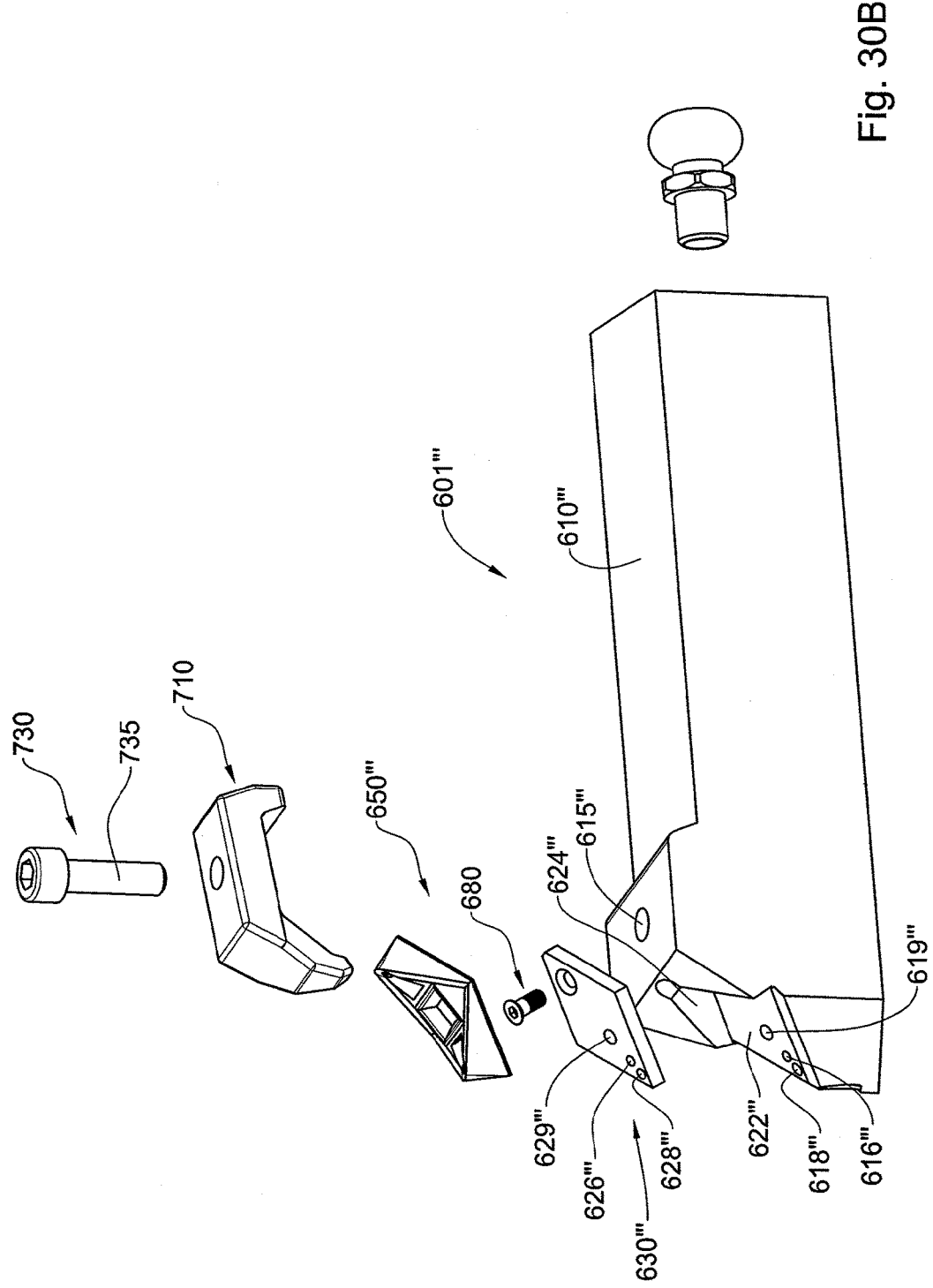
FIG. 30B is a schematic exploded isometric view of the turning tool shown in FIG. 30A.
Figure 31A:
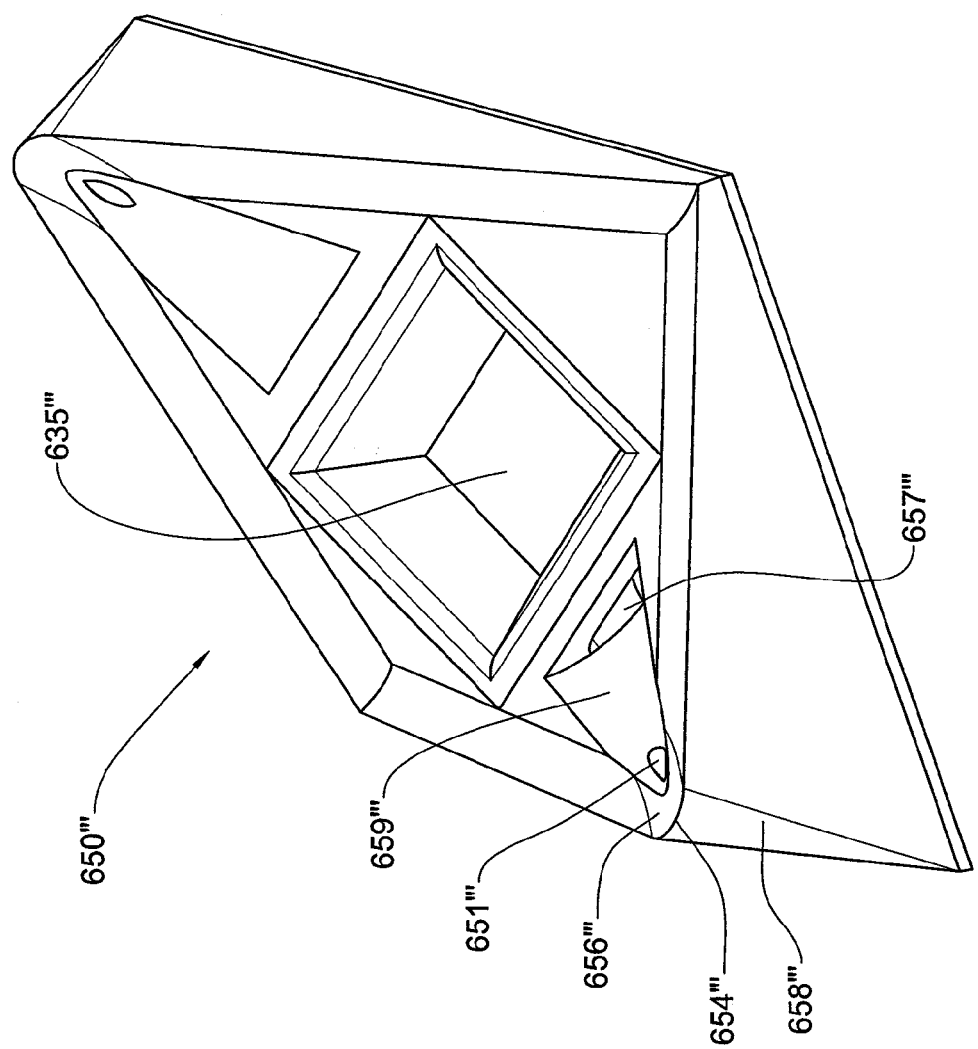
FIG. 31A is a schematic isometric view of a turning insert used in the turning tool shown in FIG. 30A.
Figure 31B:
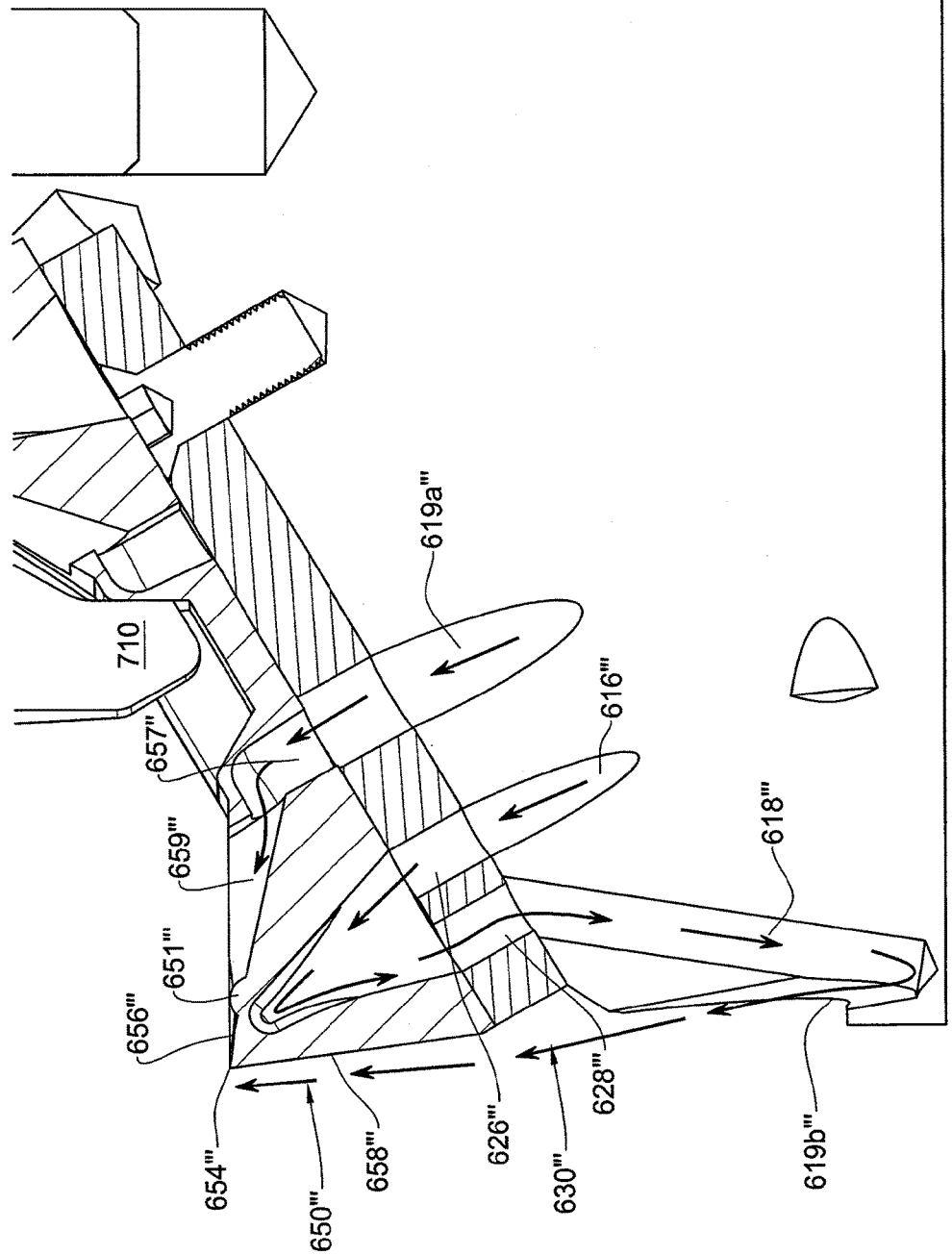
FIG. 31B is a schematic isometric section view of the turning tool shown in FIG. 30A, demonstrating the flow of cooling fluid.
Figure 31C:
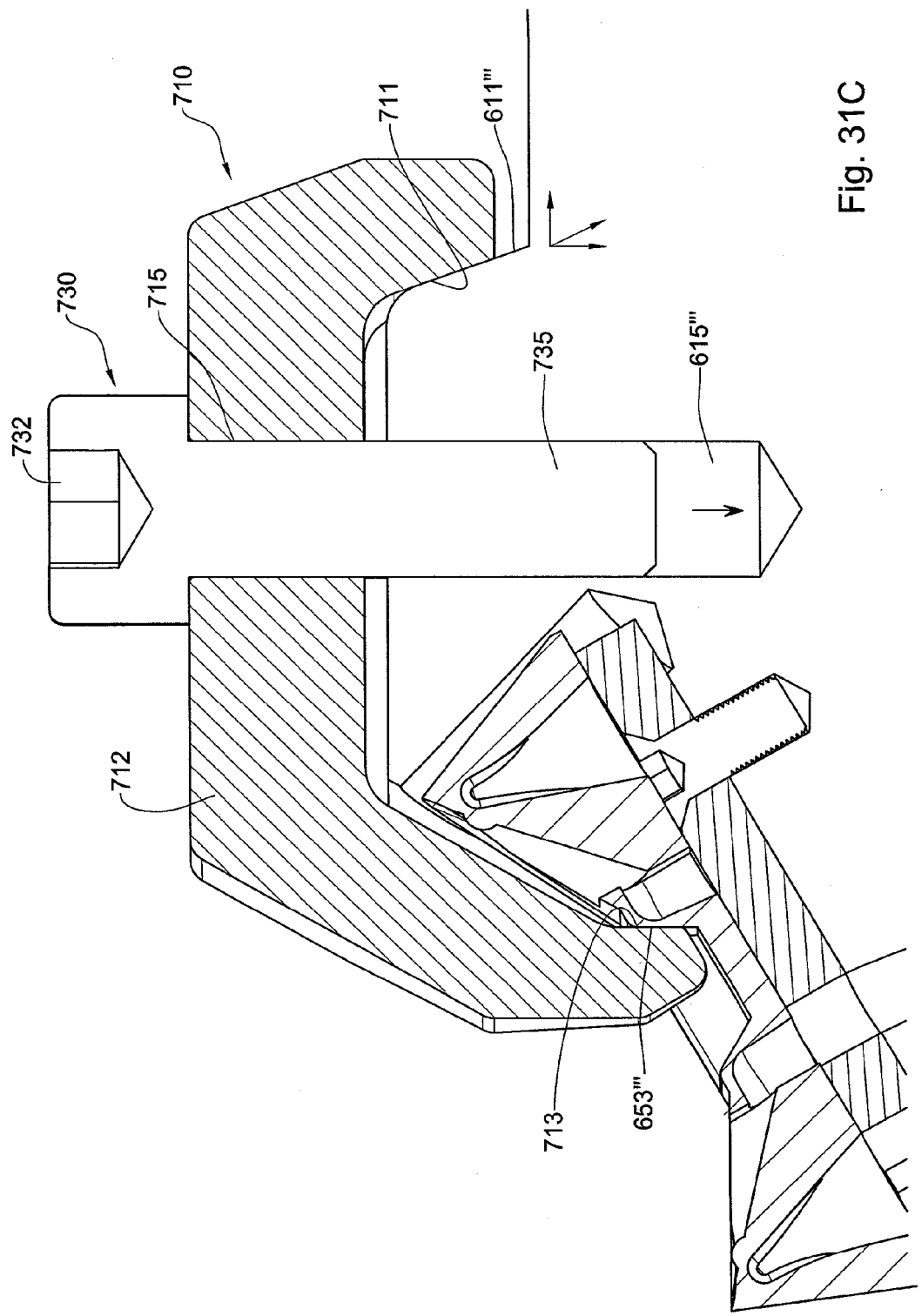
FIG. 31C is a schematic section view of the turning tool shown in FIG. 30A, demonstrating the turning insert's fastening mechanism.

Attention is now drawn to FIGS. 28 to 29B, in which yet another example of a turning tool is shown, generally designated 601". Similar elements have been designated with similar reference numbers, with the addition of a double prime (i.e. cutting insert 650 uses a similar reference number as cutting insert 650", both having cutting edge 654, 654" etc.).

The main difference between the cutting insert 650" and the previously described cutting insert 650' lies in the design of the bottom surface of the cutting insert, 652B". Whereas the previous cutting insert 650' was shown to has a see-saw configuration, the cutting insert 650" has a flat bottom surface 652B".

With particular reference being made to FIG. 29B, it is noted that when comparing the geometry of the cutting insert 650' and 650", the material removed from the tip of the see-saw of cutting insert 650', is compensated by addition of material at the sides in cutting insert 650".

Attention is now drawn to FIGS. 30A to 31C, in which still another example of a cutting tool is shown, generally designated 610'''. Similar elements have been designated with similar reference numbers, with the addition of a double prime (i.e. cutting insert 650 uses a similar reference number as cutting insert 650''', both having cutting edge 654, 654''' etc.).

The main difference between the cutting tool 601''' and the cutting tool 601" lies in the fastening mechanism used to secure the cutting insert 650''' to the tool holder 610'''. In particular, a clamping mechanism 700 is used, which operates in conjunction with a recess 635''' of the cutting insert 650''', contrary to an insert bore as described with respect to the previous examples.

Figure 32:
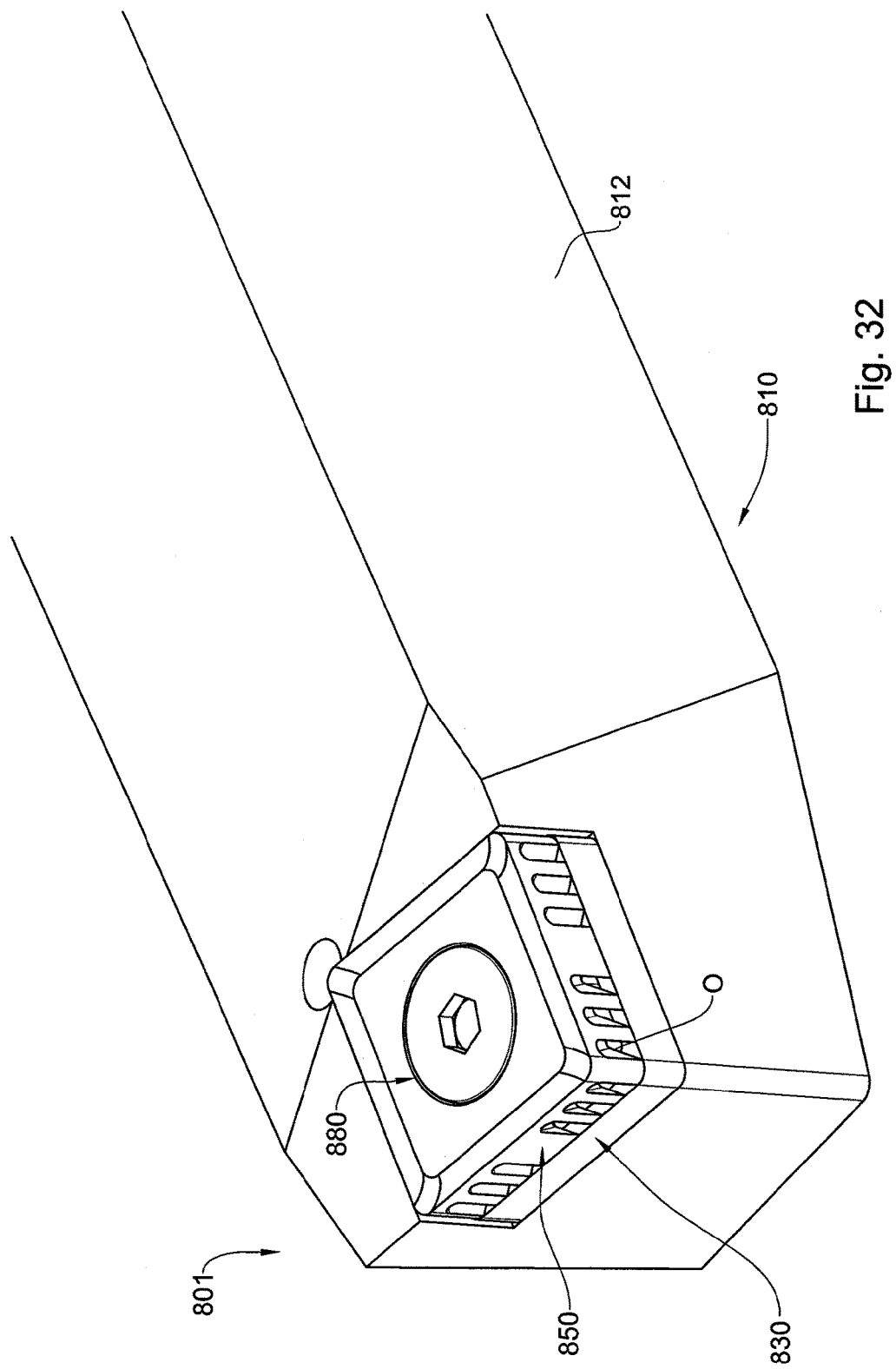
FIG. 32 is a schematic isometric view of a turning tool according to still another example of the subject matter of the present application.
Figure 33A:
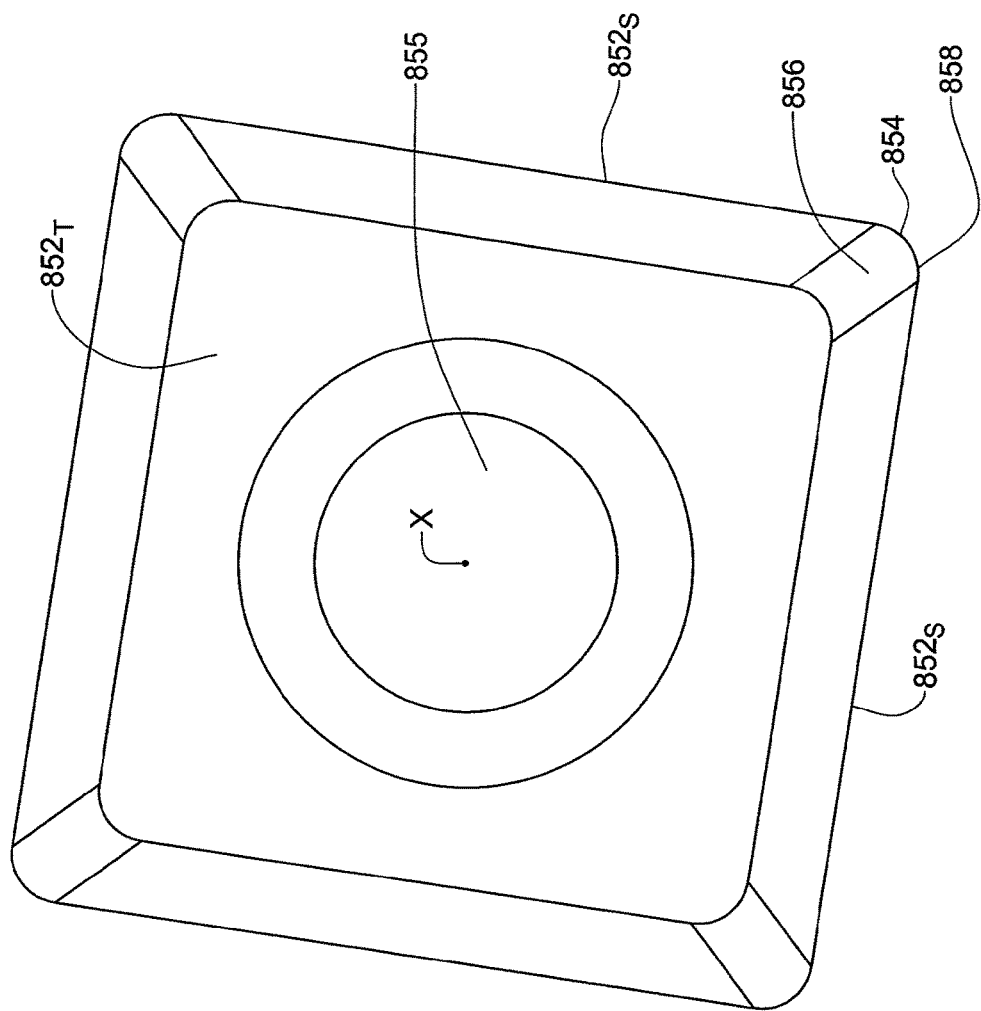
FIG. 33A is a schematic top view of a turning insert used in the turning tool shown in FIG. 32.
Figure 33B:
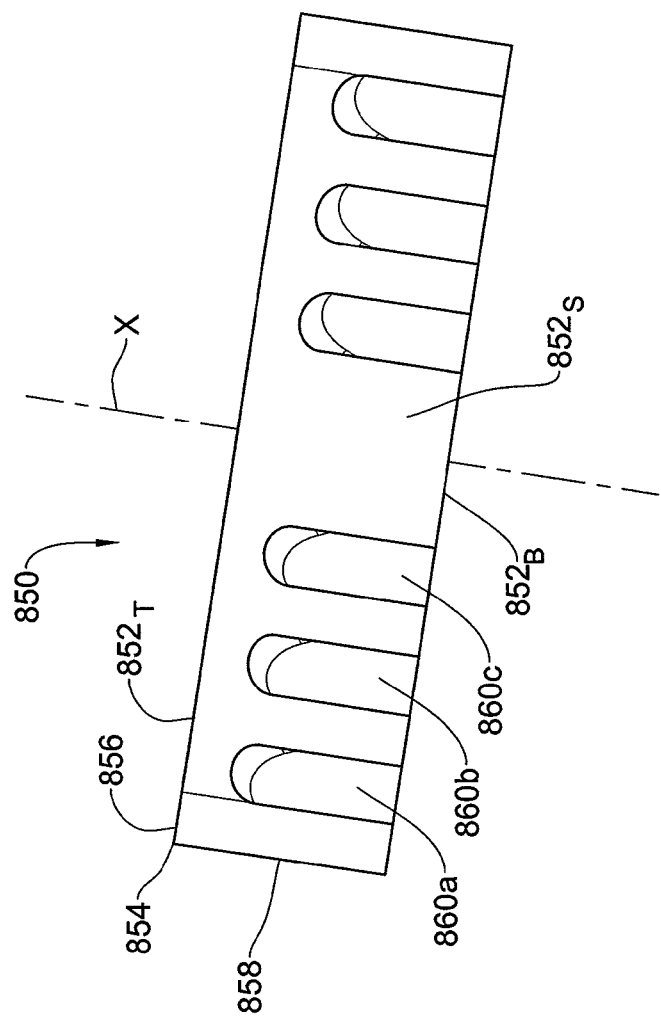
FIG. 33B is a schematic side view of a turning insert used in the turning tool shown in FIG. 32.
Figure 33C:
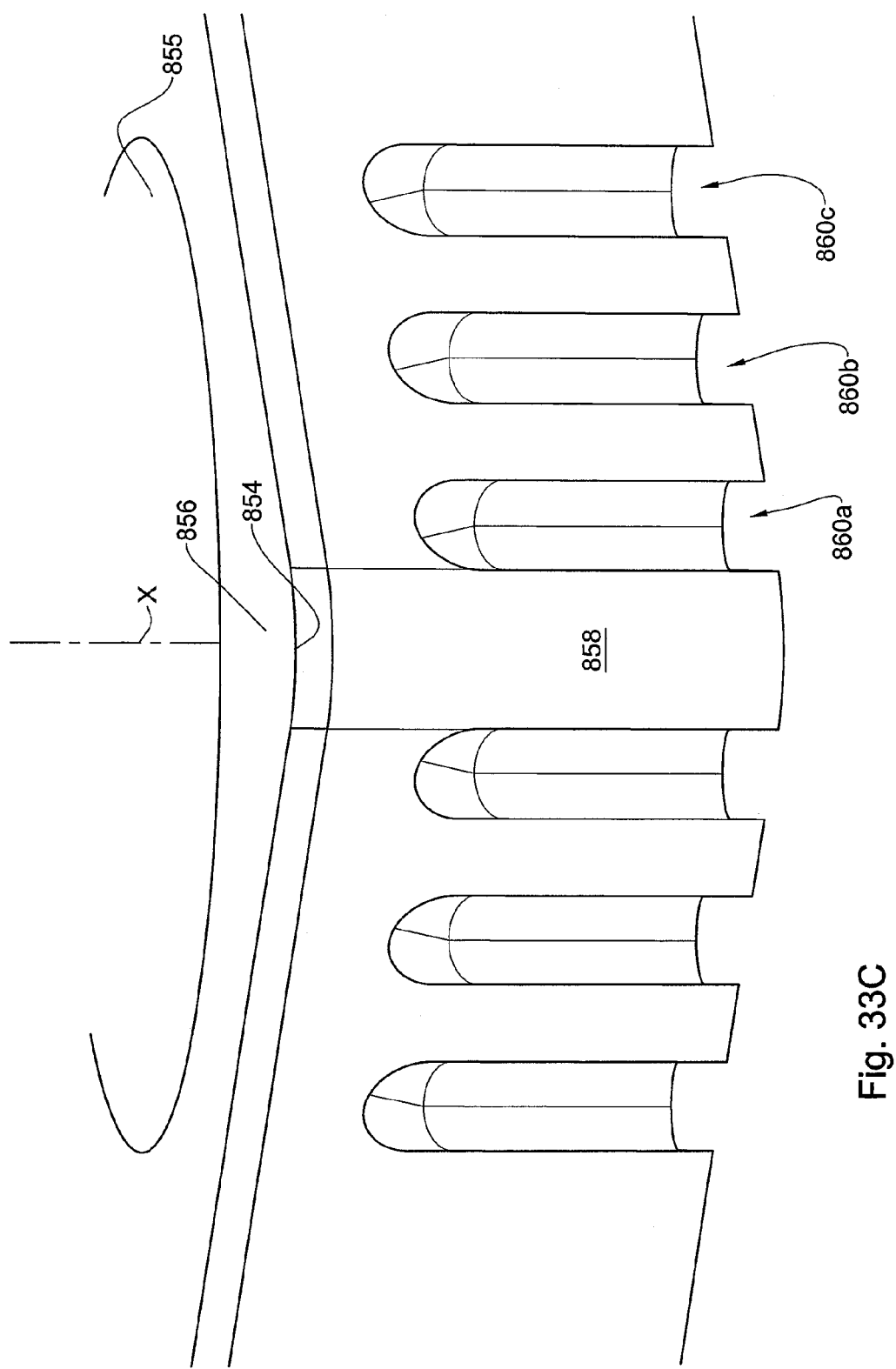
FIG. 33C is a schematic isometric enlarged view of a turning insert used in the turning tool shown in FIG. 32.

Turning now to FIGS. 32 to 33C, another example of a cutting tool is shown, generally designated 801, and comprising a cutting insert 850 mounted onto a cutting tool holder 810.

Similar elements have been designated with similar reference numbers, with the addition of 800 (i.e. cutting insert 850 uses a similar reference number as cutting insert 650, both having cutting edge 654, 854 etc.).

The cutting insert 850 is formed with openings along the circumference thereof configured for allowing cooling fluid to flow therein and reach the entire length of the cutting edge 854 of the cutting insert 850.

Cooling fluid is provided through the cutting tool holder 810 and intermediate plate 830, and emitted from outlets O (see FIG. 32). The cooling fluid emitted therefrom spreads along the hollow bottom of cutting insert 850 and is later emitted therefrom through the arcuate openings 860a, 860b, 860c.

It is noted that the wall of the openings are arrange so as to face the cutting corner of the cutting insert (rather than being perpendicular to the side surfaces 852S of the cutting insert 850).

Turning now to FIGS. 34A to 36E, a milling tool is shown, generally designated 901 and comprising a cutting tool holder 910 and a plurality of cutting inserts 950. The cutting inserts 950 are similar to cutting inserts 650" previously described, i.e. having a see-saw configuration (see FIG. 36E).

Figure 34A:
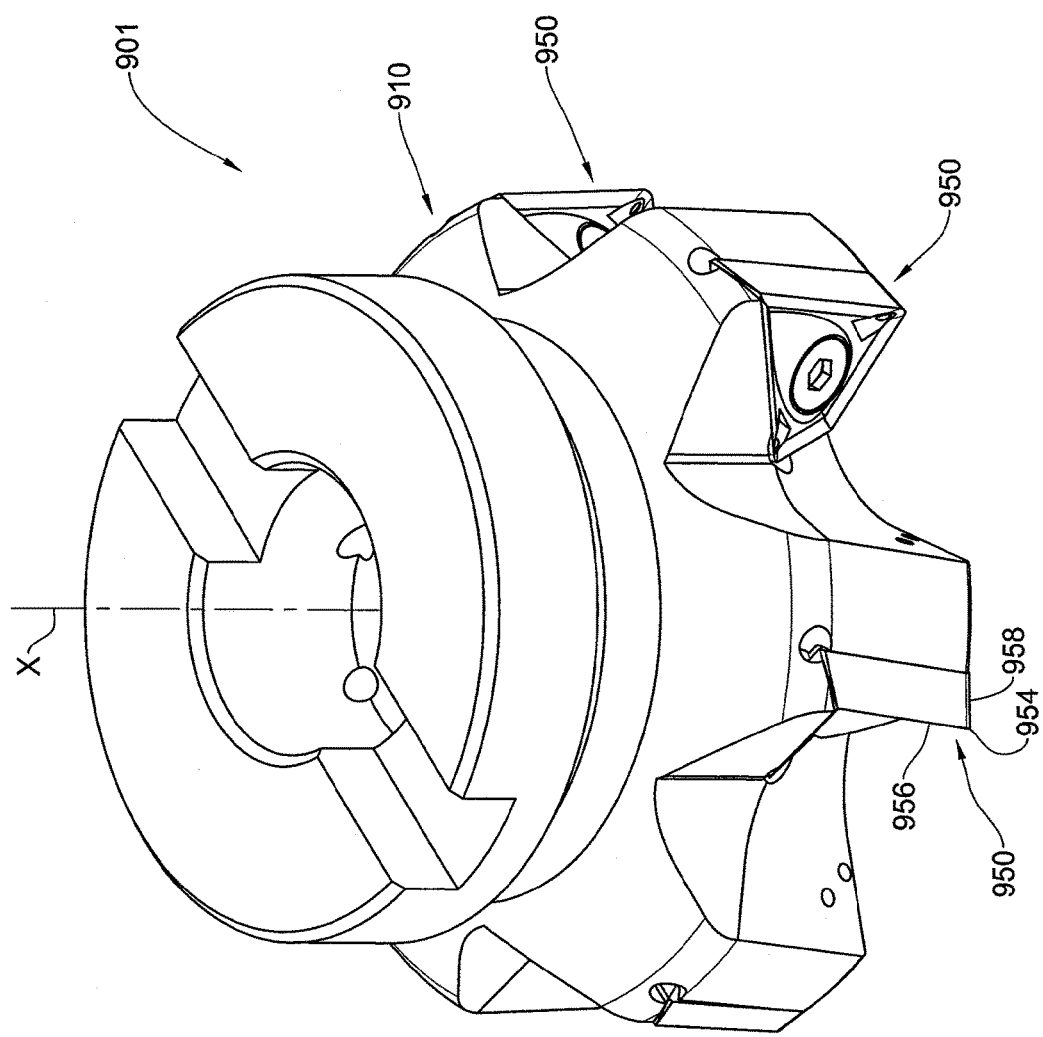
FIG. 34A is a schematic isometric view of a milling tool according to still another example of the subject matter of the present application.
Figure 34B:
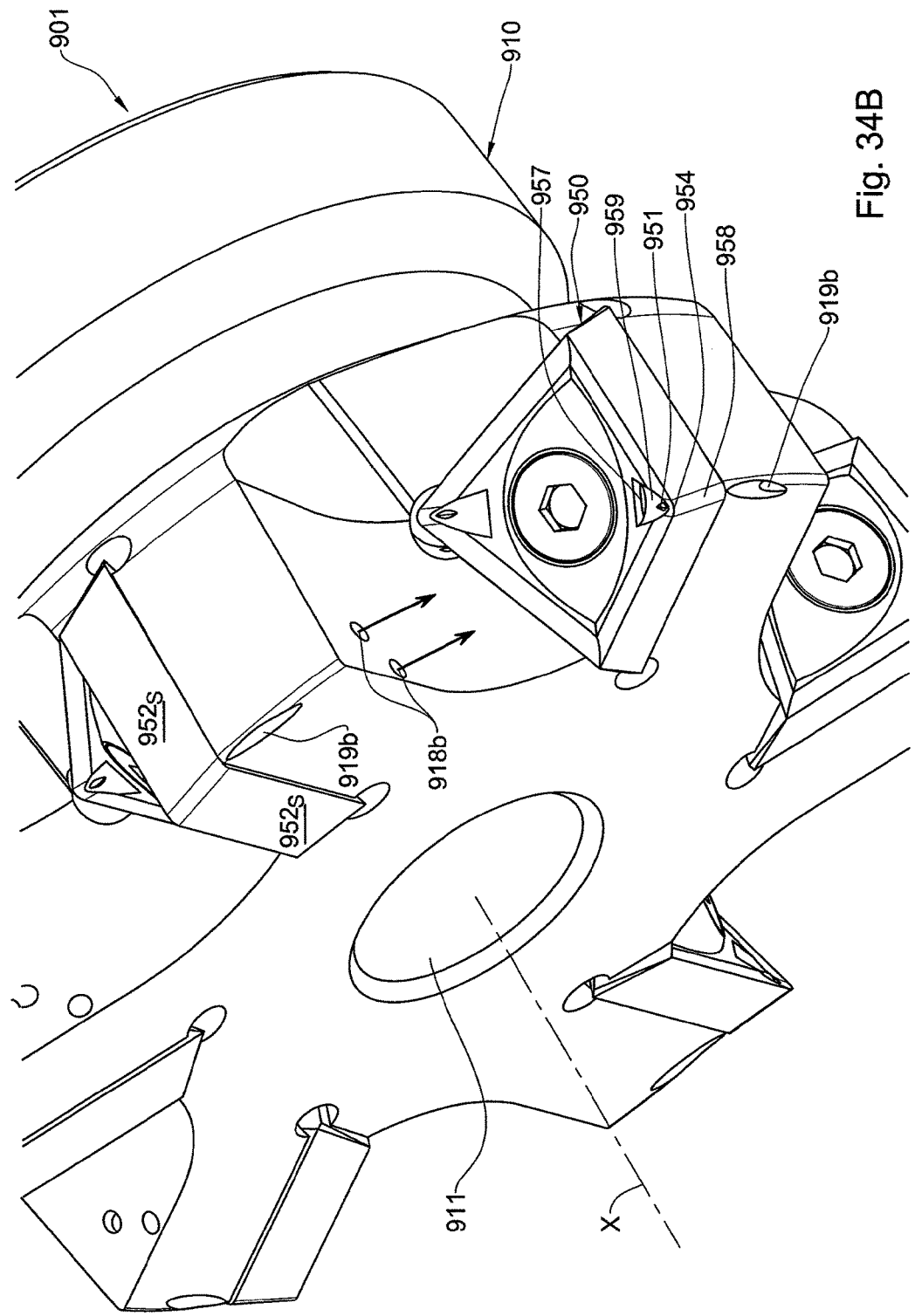
FIG. 34B is a schematic enlarged view of the milling tool shown in FIG. 34A.
Figure 35A:
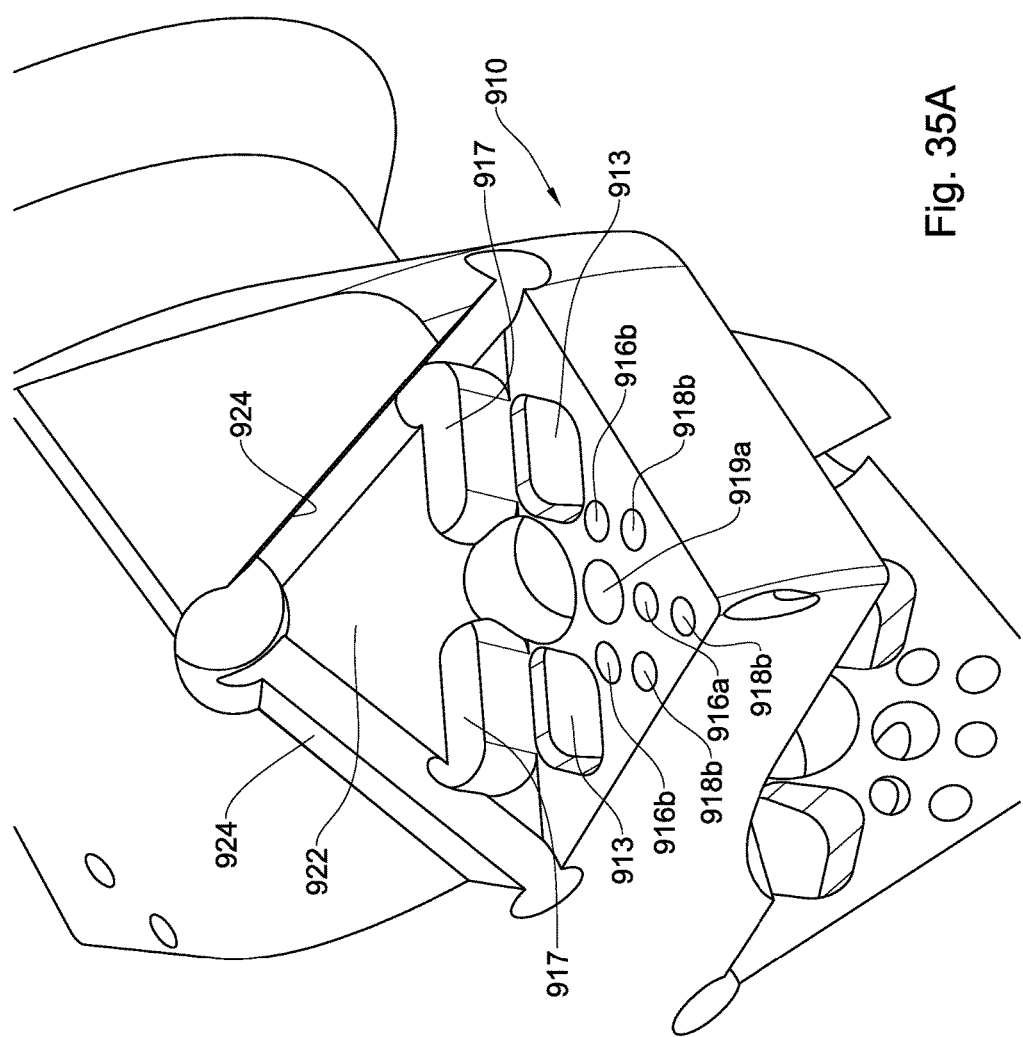
FIG. 35A is a schematic enlarged view of an insert seat of the milling tool shown in FIG. 34A.
Figure 36A:
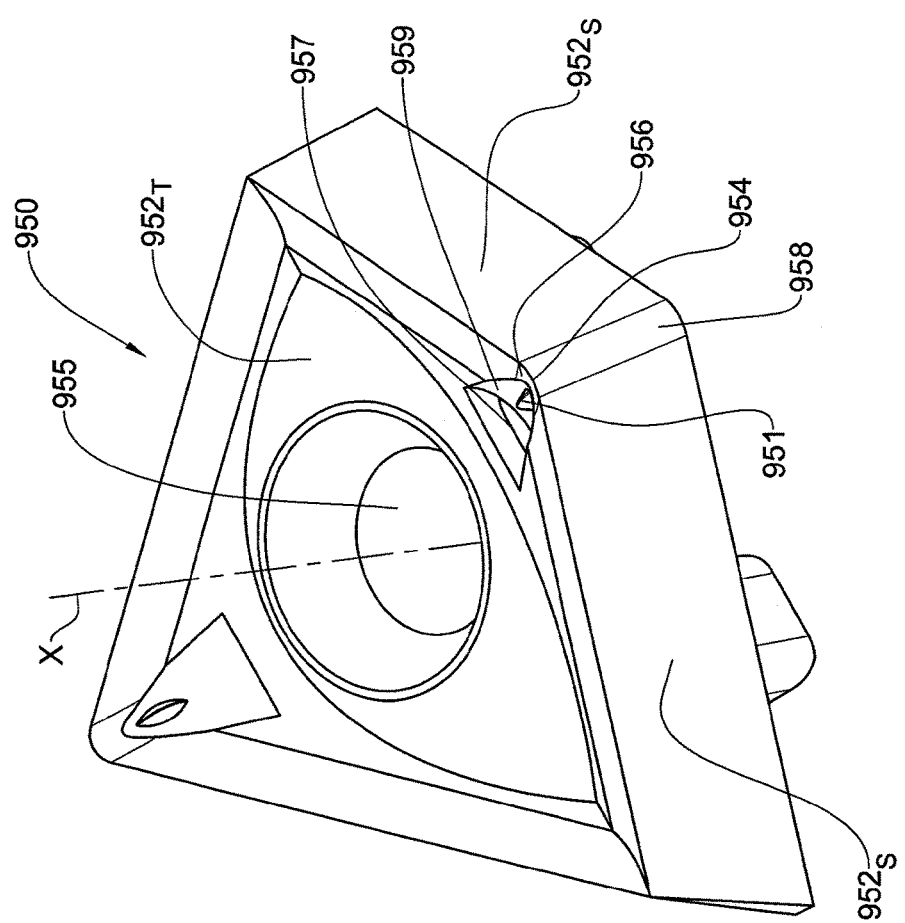
FIG. 36A is a schematic isometric view of a milling insert used in the milling tool shown in FIG. 34A.
Figure 36B:
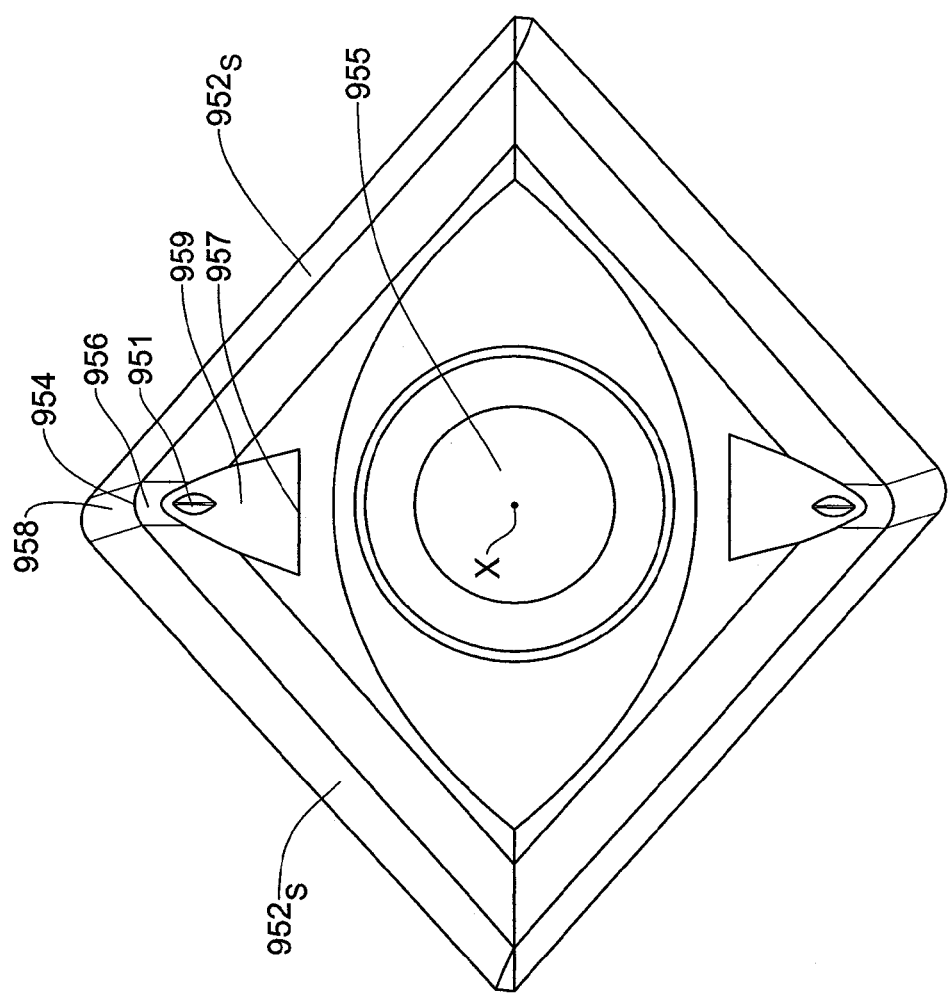
FIG. 36B is a schematic top view of the milling insert shown in FIG. 36A.
Figure 36C:
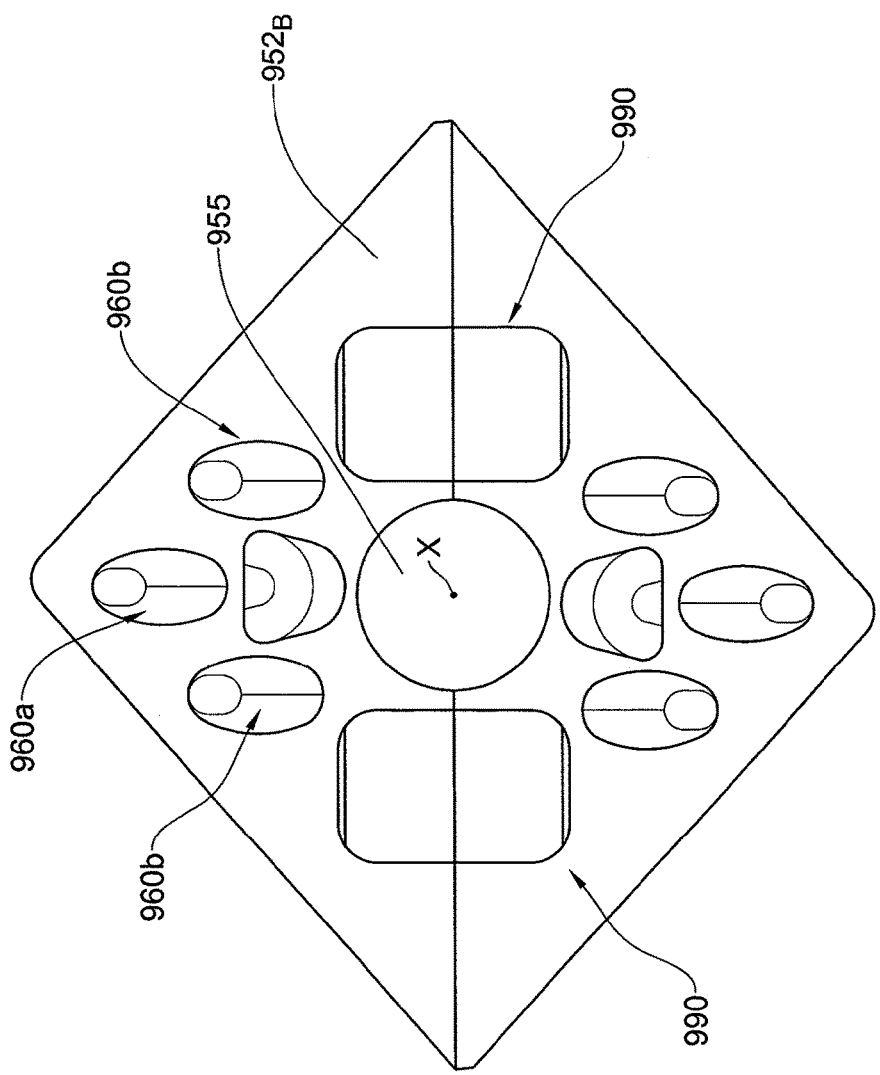
FIG. 36C is a schematic bottom view of the milling insert shown in FIG. 36A.
Figure 36D:
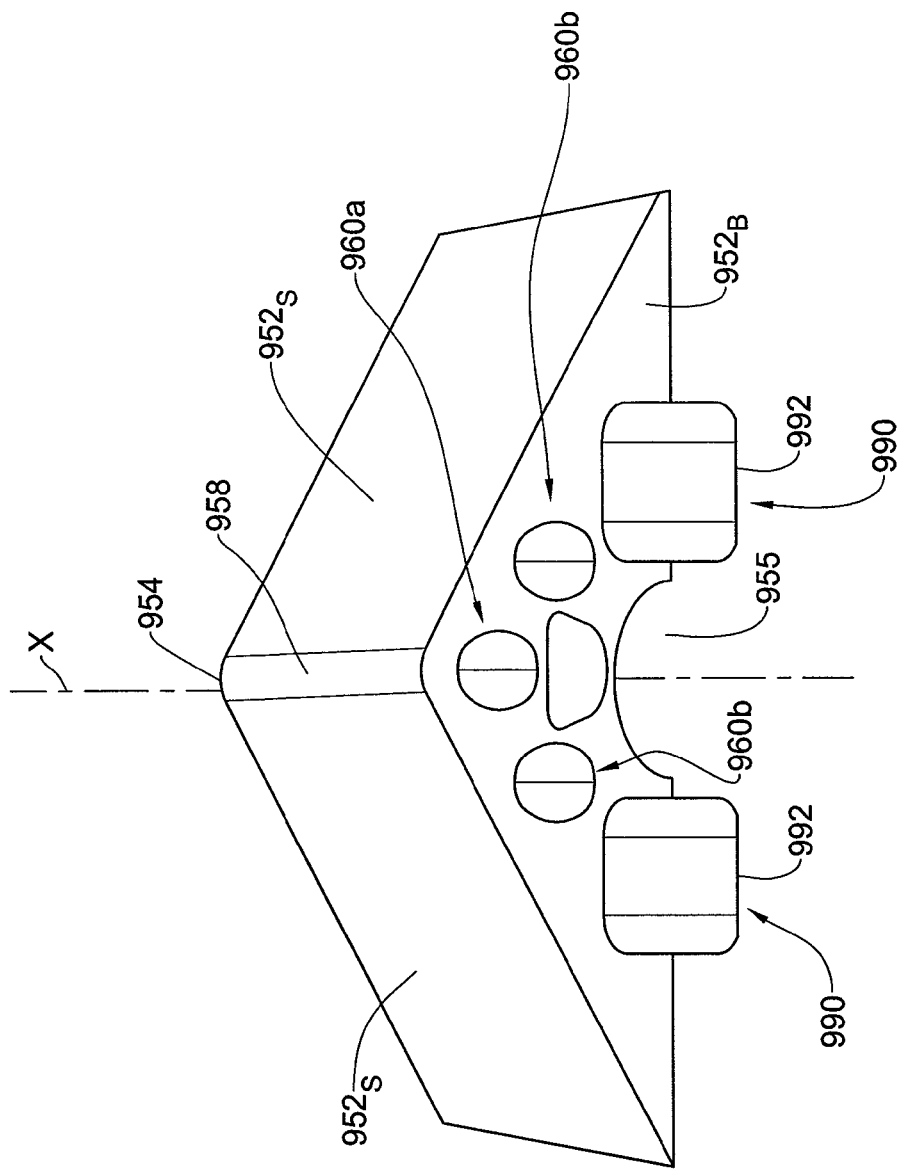
FIG. 36D is a schematic front view of the milling insert shown in FIG. 36A.
Figure 36E:
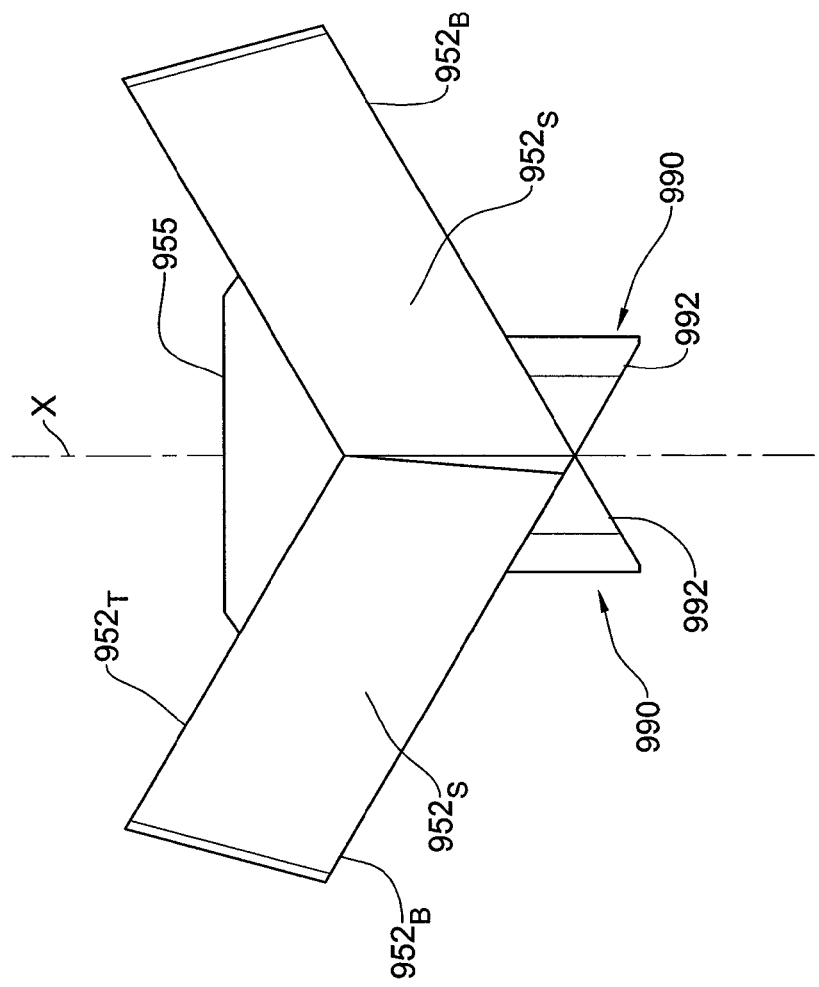
FIG. 36E is a schematic side view of the milling insert shown in FIG. 36A.

In addition, as shown in FIG. 34B, cooling fluid used for internal cooling of the milling inserts 950 is redirected, after removing heat from the internal side opposite the cutting edge, to two directions:

A first portion of the cooling fluid is directed, similar to cutting tool 601', back towards the relief surface of the cutting insert 950 via outlet 919b.

A second portion of the cooling fluid is directed backwards to impact the cutting edge of the subsequent milling insert 950, via outlets 918*b*.

In this manner, cooling fluid usage is somewhat optimized to remove heat not only from the cutting insert to which it is originally directed but from a subsequent cutting insert as well. It is appreciated that the subsequent cutting insert has a cooling mechanism of its own and that a portion of the cooling fluid used therein is directed to a cutting insert subsequent thereto and so on, and so forth.

Figure 37A:
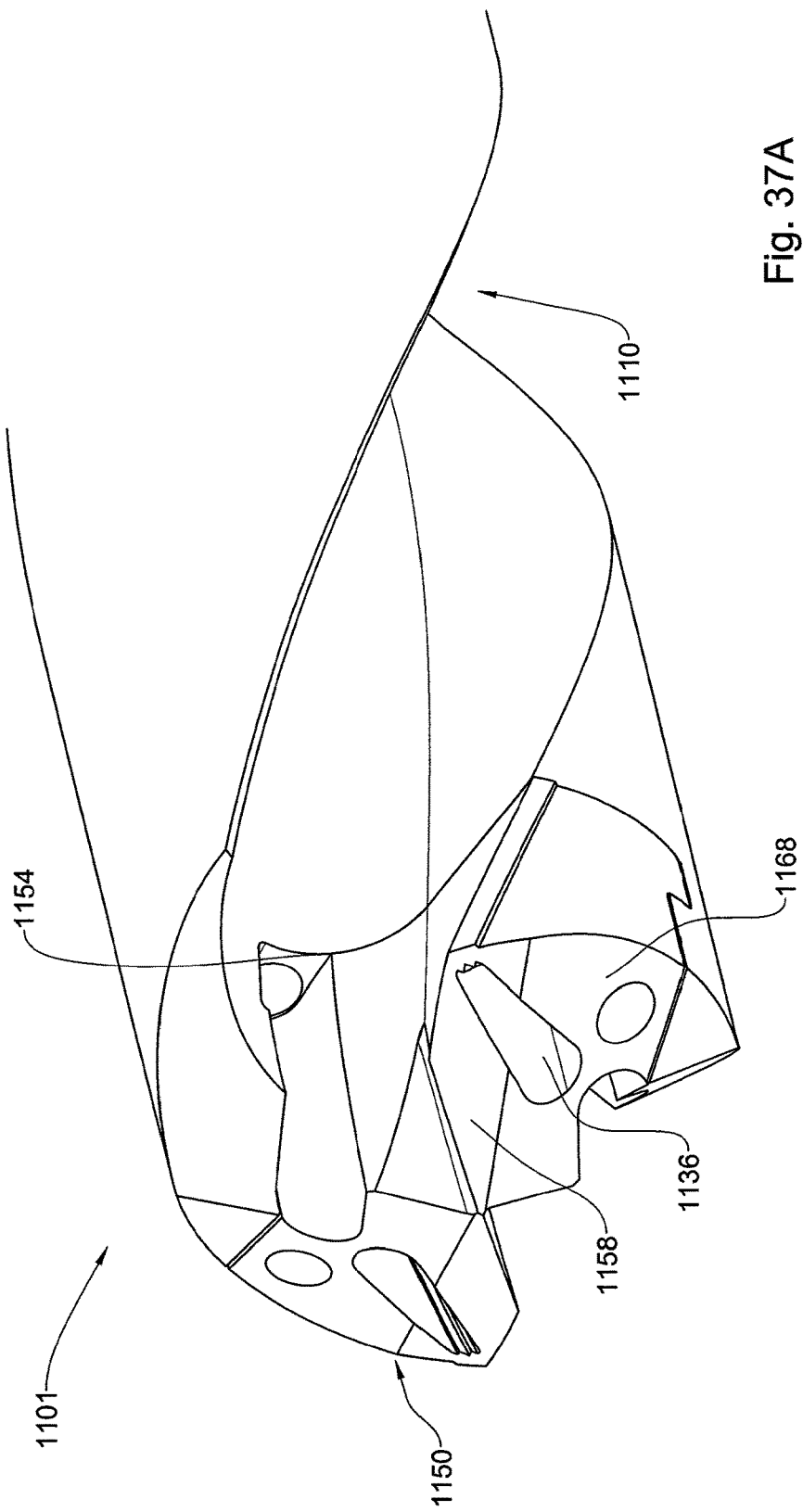
FIG. 37A is a schematic isometric view of a drilling tool according to the subject matter of the present application.
Figure 37B:
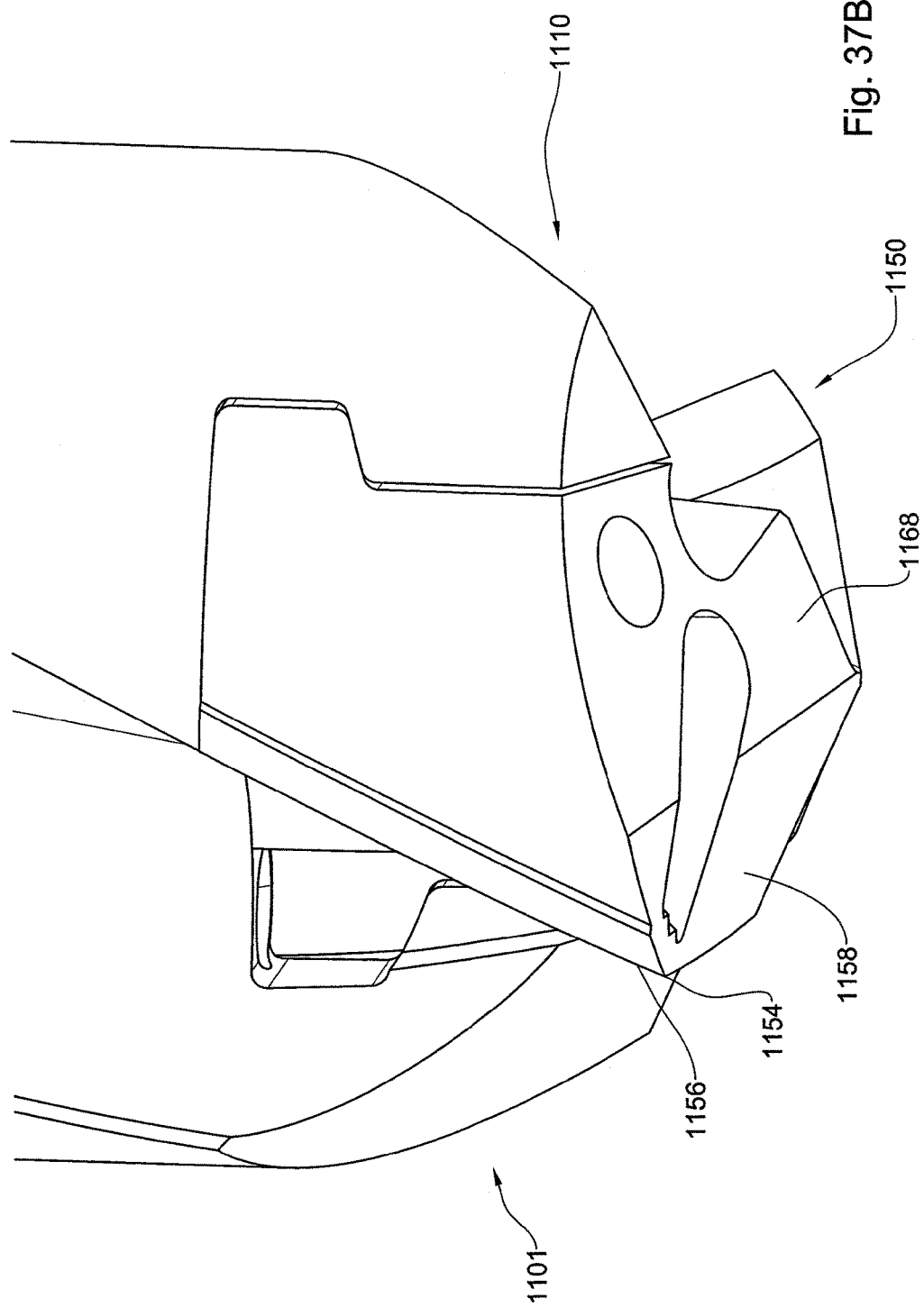
FIG. 37B is a schematic enlarged view of the drilling tool shown in FIG. 37A.

Attention is now brought to FIGS. 37A to 38, in which a drilling tool is shown, generally designated 1101, an comprising a tool holder 1110 and a drilling insert 1150. Similar elements have been designated with similar reference numbers, with the addition of 1000 (i.e. cutting insert 1150 uses a similar reference number as cutting insert 650, both having cutting edge 654, 1154 etc.).

In the example described herein, as in previous examples, the cooling cavity 1136 almost reaches the cutting edge of the drilling tool, allowing to provide cooling fluid directly to the cutting edge.

However, due to the geometry of the drilling tool (see FIG. 38, the cooling fluid provided thereto ends up at a 'dead-end' in terms of flow. In order to remove cooling fluid from such a dead-end and allowing new cooling fluid to flow in and replace it, the drilling tool makes use of its own spinning and interaction with the workpiece.

In particular, when the drilling tool revolves with respect to the workpiece, the bottom surface of the bore formed in the workpiece constantly carries away with it, during respective turning of the drilling tool, the cooling fluid 'stuck' at the dead-end and removes it from the area. This also allows breaking up the boundary layers at the front surface of the drill, allowing for more efficient cooling and fluid flow.

With particular reference to FIG. 38, the chamfered surface indicated by arrow R does not come into contact with the workpiece, allowing cooling fluid to flow away from the cutting edge as it is removed from the cutting area.

Those skilled in the art to which this invention pertains will readily appreciate that numerous changes, variations, and modifications can be made without departing from the scope of the invention, mutatis mutandis.

The invention claimed is:

1. A cutting element, comprising:
   a front face;
   a rear face generally opposite the front face;
   at least one side face extending between the front face and the rear face;
   a cooling cavity defined by a cavity surface; and
   at least one shell-like cutting zone defined by an external surface and an internal surface, the external surface being constituted by a cutting edge defined at the intersection between the front face and the at least one side face and corresponding rake and relief surfaces constituted by portions of the front fact and at least one side face respectively, and the internal surface being constituted by a portion of the cavity surface;
   wherein a maximal distance between the cavity surface and the external surface at the cutting zone is considerably smaller than the distance between the front face and the rear face and said cavity surface being formed with a rib array extending along the cutting zone;
   said cooling cavity being configured for receiving therein a cooling fluid for cooling said inner surface and thereby withdrawing heat from the cutting edge.

2. The cutting element according to claim 1, wherein a ratio between the maximal distance between the cavity surface and the external surface and the distance between the front face and the rear face is in a range of 1:5 to 1:10.

3. The cutting element according to claim 1, wherein the cavity surface is sloped towards the cutting zone in order to direct cooling fluid entering the cavity towards the cutting zone.

4. The cutting element according to claim 1, wherein said rib array comprises rake ribs extending generally parallel to the rake surface and relief ribs extending generally parallel to the relief surface.

5. The cutting element according to claim 1, wherein the ribs of the rib array are configured for providing at least one of the following:
   mechanical integrity to the cutting zone despite its shell-like configuration; or
   increase in surface area for increased cooling of the cutting edge.

6. The cutting element according to claim 1, wherein cooling fluid provided into the cooling cavity is configured, by virtue of the geometry of the cavity, not to come into direct contact with the cutting edge.

7. The cutting element according to claim 1, wherein each cutting edge of the cutting element has a corresponding cooling cavity.

8. The cutting element according to claim 1, wherein said cutting element is entirely hollow, comprising a single cooling cavity facilitating cooling for all cutting edges of the cutting element.

9. The cutting element according to claim 1, wherein said front face is formed with at least one drainage outlet being in fluid communication with the cooling cavity, and wherein the discharge outlet is arranged such that cooling fluid discharged therethrough does not come in contact with the cutting edge.

10. The cutting element according to claim 1, wherein the insert bore is angled to top and bottom surfaces thereof and configured for receiving therein a fastening member in a direction generally perpendicular to the top and bottom surfaces.

11. The cutting element according to claim 1, wherein said cutting insert has a first portion and a second portion, angled at about 135° with respect to each other.

12. The cutting element according to claim 11, wherein a top surface of the cutting element is of angled configuration while a bottom surface thereof is generally flat.

13. The cutting element according to claim 1, wherein the cutting element is configured for performing a drilling operation or mounting onto a tool holder to form a drilling tool configured for performing a drilling operation.

14. The cutting element according to claim 13, wherein the drilling tool comprises an outlet configured for emitting a cooling fluid to cool the cutting edge, wherein cooling is aided by centrifugal forces caused by rotation of the drilling tool itself.

15. The cutting element according to claim 14, wherein centrifugal forces facilitate emission of the cooling fluid towards the cutting edge while rotation of the drilling tool with respect to a bottom surface of the workpiece allows the workpiece to remove cooling fluid away from the cutting edge.

16. A cutting tool, comprising:
   a cutting tool holder comprising:
       a seat portion having a base surface provided with a fluid inlet for providing cooling fluid to the seat portion; and
       a fluid outlet configured for removing cooling fluid from the seat portion; and a cutting element according to claim 1 positioned within the seat portion of the cutting tool holder, over the base surface;

wherein, a cooling cavity of the cutting element is aligned with said inlet and said outlets, whereby cooling fluid is configured for being provided into the cooling cavity via said inlet and be withdrawn therefrom via said outlet.

17. The cutting tool according to claim 16, wherein said base surface is provided with a ramp element configured, when the cutting tool is assembled and the cutting element is mounted onto the base surface, to protrude into the cavity of the cutting element to thereby define a fluid path.

18. The cutting tool according to claim 17, wherein said fluid path is configured for receiving cooling fluid through said inlet, directing the cooling fluid towards the portion of the cavity surface at the cutting zone and then towards said outlet.

19. The cutting tool according to claim 18, wherein the fluid path has a cross-sectional area that decreases towards the cutting zone.

20. The cutting tool according to claim 16, wherein said cutting tool holder comprises an intermediate base plate formed with said base surface, said intermediate base plate is provided with an inlet bore aligned with the inlet of the cutting tool holder and the cooling cavity of the cutting element and an outlet bore aligned with the outlet of the cutting tool holder and the cooling cavity of the cutting element, to allow passage of cooling fluid therethrough.

21. The cutting tool according to claim 16, wherein said cutting tool is a milling tool comprising a plurality of cutting elements mounted thereto, and wherein said outlet has an open end at a rear portion of the seat so as to direct cooling fluid discharged from the outlet towards a subsequent cutting element of the milling tool.

22. A cutting tool holder for mounting thereon a cutting element to form a cutting tool, said cutting tool holder comprising:

a seat portion comprising a base surface onto which said cutting element is to be mounted, said base surface being provided with a fluid inlet for providing cooling fluid to the seat portion and a fluid outlet configured for removing cooling fluid from the seat portion.

23. The cutting tool holder according to claim 22, wherein said base surface is provided with a ramp element configured, when the cutting tool is assembled and the cutting element is mounted onto the base surface, to protrude into a cavity formed in the cutting element to thereby define a fluid path.

24. The cutting tool holder according to claim 23, wherein said fluid path is configured for receiving cooling fluid through said inlet, directing it towards the portion of the cavity surface at a cutting zone of the cutting element and then towards said outlet.

25. The cutting tool holder according to claim 24, wherein the fluid path has a cross-sectional area that decreases towards the cutting zone.

26. The cutting tool holder according to claim 22, wherein said cutting tool holder comprises an intermediate base plate formed with said base surface, said intermediate base plate is provided with an inlet bore aligned with the inlet of the cutting tool holder and the cooling cavity of the cutting element and an outlet bore aligned with the outlet of the cutting tool holder and the cooling cavity of the cutting element, to allow passage of cooling fluid therethrough.

27. The cutting tool holder according to claim 22, wherein said cutting tool is a milling tool comprising a plurality of cutting elements mounted thereto, and wherein said outlet has an open end at a rear portion of the seat so as to direct cooling fluid discharged from the outlet towards a subsequent cutting element of the milling tool.

* * * * *